(12) United States Patent
Wang et al.

(10) Patent No.: US 12,398,325 B2
(45) Date of Patent: Aug. 26, 2025

(54) LIQUID-CRYSTAL DISPLAY

(71) Applicant: MERCK PATENT GMBH, Darmstadt (DE)

(72) Inventors: Shih-Hung Wang, Taipei (TW); Chi-Shun Huang, Taoyuan (TW); Jer-Lin Chen, Taoyuan (TW); Kuang-Ting Chou, Hsinchu (TW)

(73) Assignee: MERCK PATENT GMBH, Darmstadt (DE)

( * ) Notice: Subject to any disclaimer, the term of this patent is extended or adjusted under 35 U.S.C. 154(b) by 903 days.

(21) Appl. No.: 16/937,081

(22) Filed: Jul. 23, 2020

(65) Prior Publication Data

US 2021/0024826 A1 Jan. 28, 2021

(30) Foreign Application Priority Data

Jul. 23, 2019 (EP) .................................... 19187808

(51) Int. Cl.
| | |
|---|---|
| *C09K 19/46* | (2006.01) |
| *C09K 19/02* | (2006.01) |
| *C09K 19/44* | (2006.01) |
| *C09K 19/56* | (2006.01) |
| *C09K 19/58* | (2006.01) |
| *G02F 1/139* | (2006.01) |
| *C09K 19/04* | (2006.01) |
| *G02F 1/1337* | (2006.01) |

(52) U.S. Cl.
CPC .......... *C09K 19/44* (2013.01); *C09K 19/0208* (2013.01); *C09K 19/46* (2013.01); *C09K 19/56* (2013.01); *C09K 19/586* (2013.01); *G02F 1/1396* (2013.01); *C09K 2019/0448* (2013.01); *C09K 2019/0466* (2013.01); *C09K 2323/00* (2020.08); *C09K 2323/02* (2020.08); *G02F 1/133711* (2013.01); *G02F 1/133749* (2021.01)

(58) Field of Classification Search
CPC ........ C09K 19/56; C09K 19/44; C09K 19/46; C09K 19/586; C09K 19/0208; C09K 2019/0448; C09K 2019/0466; C09K 2323/00; C09K 2323/02; G02F 1/1396; G02F 1/133749; G02F 1/133711
USPC .................... 428/1.1, 1.2; 349/115, 179, 191
See application file for complete search history.

(56) References Cited

U.S. PATENT DOCUMENTS

| | | | |
|---|---|---|---|
| 8,551,358 B2 | 10/2013 | Lee et al. | |
| 2019/0177618 A1* | 6/2019 | Song | .................. C09K 19/3402 |

FOREIGN PATENT DOCUMENTS

| | | |
|---|---|---|
| EP | 2399972 A2 | 12/2011 |
| WO | 2018036989 A1 | 3/2018 |
| WO | WO-2019180060 A1 * 9/2019 | ........... C09K 19/586 |

OTHER PUBLICATIONS

M. Akimoto et al., ‚Polymer-Wall Stabilization of Ultra-Short-Pitch TN-LCDs', 2014; IDW'14 pp. 14-17 ISSN-L 1883-2490/21/0014.
K. Takatoh et al., 'Fast response twisted nematic liquid crystal displays with ultrashort pitch liquid crystalline materials', 2012, Liquid Crystals,39:6, 715-720.
Search Report for corresponding EP application 20186835.3 dated Dec. 18, 2020 (pp. 1-7).

* cited by examiner

*Primary Examiner* — Ruiyun Zhang
(74) *Attorney, Agent, or Firm* — MILLEN WHITE ZELANO & BRANIGAN, PC; Brion P. Heaney

(57) ABSTRACT

The present invention relates to a method of manufacturing a liquid crystal display (LCD) of the polymer stabilized ultra fast (PS-UF) twisted nematic (TN) mode, to an LCD obtained by this method and to an LC medium used therein.

19 Claims, No Drawings

LIQUID-CRYSTAL DISPLAY

The present invention relates to a method of manufacturing a liquid crystal display (LCD) of the polymer stabilized (PS) twisted nematic (TN) mode, to an LCD obtained by this method and to an LC medium used therein.

BACKGROUND OF THE INVENTION

Currently used LCDs provide many good properties such as low weight, flatness, and wide viewing angle. However, the response time of state-of-the-art LCDs is often not fast enough, and therefore constitutes a barrier for their implementation in various novel applications such as gaming and virtual reality (VR). In order to enable color sequential technology a response time is required which is around 1 ms. If such fast response times could be realized, LCDs could become a low power consumption technology to enlarge the battery life time for mobile devices. LCD manufacturers of LCD are therefore investing high effort to reduce the response time of LCDs.

However, up to date, no viable solution could be developed for an LCD mode with ultra fast response time that is also suitable for mass production. For example, currently used LCD modes such as TN, multidomain vertically aligned (MVA), in-plane switching (IPS), and fringe-field switching (FFS) mode could not fully meet the requirements of both fast response time and high transmittance due to their cell configuration. In order to reach this target, a new LCD mode is therefore necessary.

Recently, a solution to this problem has been proposed by using a short pitch TN LCD to achieve a fast response time. The TN LCD is doped with a chiral nematic LC material such that a shorter helical pitch (p) of the twisted nematic LC molecules is achieved, thereby enabling a faster decay response time ($t_d$).

However, when the ratio d/p of cell gap (d) over helical pitch (p) is larger than 0.5, the 270° super-twisted nematic (STN) LC director configuration is energetically more stable than the 90° TN LC director configuration of the short pitch length design, while the 90° TN configuration becomes unstable and transforms into the 270° STN configuration. Therefore, it is desired to keep a short pitch with d/p>0.5, but at the same time maintain the TN LC configuration which is needed to realize fast switching times.

In the literature it was reported that the 270° STN configuration can be changed to the 90° TN configuration by applying an electric voltage, and the 90° TN configuration can then be stabilized by photopolymerization, e.g. by formation of a polymer network in the LC medium, see K. Takatoh et al., "Fast-response twisted nematic liquid crystals with ultrashort pitch liquid crystalline materials", *Liq. Cryst.* 2012, 39, 715-720. It was also reported that the 90° TN configuration can be stabilized by the formation of polymer walls in the LC medium, see IDW 2014, LCT1-2, "Polymer-Wall Stabilization of Ultra-Short-Pitch TN-LCDs". However, the stabilized TN LCDs as described therein have lower transmittance and/or lower contrast ratio and require higher driving voltage compared to a conventional, unstabilized TN LCD.

It was therefore an aim of the present invention to provide a method of manufacturing a TN LCD with fast response times, especially fast switch-off or decay time ($t_d$), while still maintaining a 90° TN LC director configuration, and at the same time achieve one or more of a low driving voltage, a high contrast ratio and a high transmittance. Another aim of the invention is to provide a TN LCD, especially a polymer stabilized (PS) TN LCD, obtained by this method which allows to achieve a fast response time and overcome the disadvantages of the TN LCDs and PS-TN LCDs of prior art, like high driving voltage, low contrast ratio and low transmission. Other aims of the invention are immediately evident to the skilled person from the following description.

It was found that these aims can be achieved by providing a method of manufacturing a TN LCD as disclosed and claimed hereinafter. In particular it was found that it is possible to achieve a fast response time while maintaining a 90° TN LC director configuration, and still enable low driving voltage, high contrast ratio and high transmittance, by polymer stabilization of a TN LCD according to the method as described hereinafter even when using only a small amount of polymer. The display obtained by this method according to the invention is hereinafter also referred to as "polymer stabilized (ultra fast) twisted nematic LCD" or "PS(-UF)-TN LCD".

SUMMARY OF THE INVENTION

The invention relates to a liquid crystal display (LCD) of the polymer-stabilized twisted-nematic (PS-TN) mode comprising
a) a first substrate and a second substrate, the first substrate being equipped with a first electrode layer and optionally a first alignment layer, the second substrate being equipped with a second electrode layer and optionally a second alignment layer,
b) a layer of a nematic LC medium containing a chiral additive and having positive dielectric anisotropy being dispensed between the first and the second substrate,
c) optionally a first polarizer on the side of the first substrate facing away from the LC layer and a second polarizer on the side of the second substrate facing away from the LC layer, said polarizers preferably being oriented such that their transmission planes for plane-polarized light are at right angles (crossed nicols),
wherein the longitudinal axes of the LC molecules are oriented parallel or tilted relative to the planes of the substrates, and the chiral additives induce in the LC molecules of the LC medium a helical twist along an axis perpendicular to the substrates with a given pitch p, and
wherein layer of the LC medium has a thickness d, and the ratio d/p is ≥0.5, preferably >0.5, very preferably from 0.6 to 0.8, and
wherein the twist angle of the helical twist of the LC molecules is from 60 to 120°, preferably from 80 to 100°, very preferably 90°, and
wherein the display further comprises a polymer layer deposited on one or both of said first and second electrode or, if present, on one or both of said first and second alignment layer,
wherein said polymer layers are formed from one or more polymerizable mesogenic compounds, which are contained in the LC medium at a concentration from 1 to <3%, preferably from 2 to <3%, and which are polymerized in situ after the LC medium has been dispensed between the two substrates.

The invention further relates to a method of manufacturing an LCD of the PS-TN mode comprising the steps of
a) providing a first substrate and a second substrate, the first substrate being equipped with a first electrode layer and optionally with a first alignment layer, the second substrate being equipped with a second electrode layer and optionally with a second alignment layer, wherein the first and/or the second substrate are preferably equipped with fixing means, preferably a sealant material and/or spacers, fixing the first and second substrate at a constant distance relative to each other and with their planes parallel to each other, b) dispensing a layer of a nematic LC medium having positive dielectric anisotropy between the first and the second substrate, such that the LC medium is in contact with the first and second alignment layer if these layers are present,
wherein the LC medium comprises, preferably consists of,
- A) a liquid crystal component A (hereinafter also referred to as "LC host mixture") comprising, preferably consisting of, mesogenic or liquid-crystalline molecules,
- B) a polymerizable component B comprising, preferably consisting of, one or more polymerizable mesogenic compounds (hereinafter also referred to as "reactive mesogens"),
- C) one or more chiral additives, preferably selected from chiral dopants,
- D) optionally one or more further additives, preferably selected from polymerization initiators, stabilizers and self-aligning additives, wherein the concentration of the polymerizable mesogenic compounds in the LC medium is from 1 to <3%, preferably from 2 to <3%, and
wherein the longitudinal axes of the LC molecules are oriented parallel or tilted relative to the planes of the substrates, and the chiral additive induces in the LC molecules of the LC medium a helical twist along an axis perpendicular to the substrates with a given pitch p, and
wherein layer of the LC medium has a thickness d, and the ratio d/p is ≥0.5, preferably >0.5, very preferably from 0.6 to 0.8, and
wherein the twist angle of the helical twist of the LC molecules induced by the chiral additive is >210°, preferably from 210 to 330°, more preferably from 240 to 300°, very preferably 270°, c) applying a voltage to the first and second electrodes such that the twist angle of the helical twist of the LC molecules is reduced to <150°, preferably to a range from 60 to 120°, more preferably from 80 to 100°, very preferably to 90°, d) after applying the voltage or while applying the voltage, polymerizing the polymerizable mesogenic compounds of the polymerizable component B of the LC medium between the first and second substrate, preferably by exposure to UV radiation, thereby stabilizing the twisted nematic configuration of the LC medium with the reduced twist angle of step c), and e) optionally subjecting the LC medium to a second polymerization step, preferably by exposure to UV radiation, without applying a voltage to the first and second electrodes, thereby polymerizing any polymerizable compounds which have not reacted in step d), f) optionally providing a first polarizer on the side of the first substrate facing away from the LC layer, and a second polarizer on the side of the second substrate facing away from the LC layer, wherein said polarizers are preferably oriented such that their transmission planes for plane-polarized light are at right angles (crossed nicols).

The invention further relates to an LC display obtained by the method as described above and below.

The invention further relates to an LC medium contained in an LC display as described above and below wherein the polymerizable mesogenic compounds are unpolymerized.

The invention further relates to an LC medium contained in an LC display as described above and below wherein the polymerizable mesogenic compounds are polymerized.

Terms and Definitions

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "twist" and "twist angle" are understood to refer to an orientation where the longitudinal axis of the LC molecules of the LC medium are substantially parallel to the plane of the nearest substrate of the display cell, and are twisted along a helical axis that is perpendicular to the plane of the substrate.

As used herein, the terms "tilt" and "tilt angle" are understood to refer to an orientation where the longitudinal axis of the LC molecules of the LC medium form an angle with the plane of the nearest substrate of the display cell.

As used herein, the term "director" or "LC director" is understood to mean the average direction of the long molecular axes of the LC molecules.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

The wording as used above and below that the LC medium comprises "a polymer obtained by polymerizing a polymerizable component B" or "a polymer obtained by polymerizing one or more polymerizable compounds" is to be understood to cover both the embodiment where the polymer remains partially or completely dispersed in the LC medium, and the embodiment where the polymer precipitates from the LC medium and forms a polymer layer on one or both of the substrates, or on one or both of the alignment layers or electrode structures deposited thereon.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behavior only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

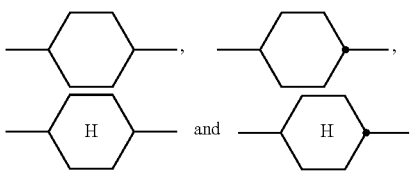

denote a trans-1,4-cyclohexylene ring, and

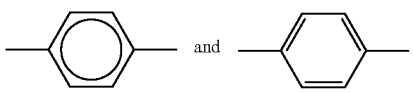

denote a 1,4-phenylene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having up to 40, preferably up to 20, very preferably up to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, or —O—CO—O— in such a way that O and/or S atoms are not linked directly to one another.

$R^x$ preferably denotes H, F, Cl, CN, a straight-chain, branched or cyclic alkyl chain having up to 25 C atoms, in which, in addition, one or more non-adjacent C atoms may each be replaced by —O—, —S—, —CO—, —CO—O—, —O—CO—, or —O—CO—O— in such a manner that O- and/or S-atoms are not directly connected with each other, and in which one or more H atoms may each be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may each be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may each be replaced by Si and/or one or more CH groups may each be replaced by N and/or one or more non-adjacent CH$_2$ groups may each be replaced by —O— or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "L", are F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, straight-chain or branched alkyl, alkoxy, alkylcarbonyl, alkoxycarbonyl, alkylcarbonyloxy or alkoxycarbonyloxy each having up to 25 C atoms, in which one or more H atoms may each optionally be replaced by F or Cl, optionally substituted silyl having 1 to 20 Si atoms, or optionally substituted aryl having 6 to 25, preferably 6 to 15, C atoms, wherein R$^x$ denotes H, F, Cl, CN, or straight chain, branched or cyclic alkyl having up to 25 C atoms, wherein one or more non-adjacent CH$_2$-groups are each optionally replaced by —O—, —S—, —CO—, —CO—O—, —O—CO—, or —O—CO—O— in such a manner that C- and/or S-atoms are not directly connected with each other, and wherein one or more H atoms are each optionally replaced by F, Cl, P— or P-Sp-, and Y$^1$ denotes halogen.

"Substituted silyl or aryl" preferably means substituted by halogen, —CN, R$^0$, —OR$^0$, —CO—R$^0$, —CO—O—R$^0$, —O—CO—R$^0$ or —O—CO—O—R$^0$, wherein R$^0$ denotes H or alkyl with 1 to 20 C atoms.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, and furthermore phenyl.

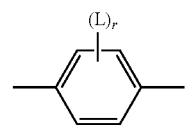

is preferably

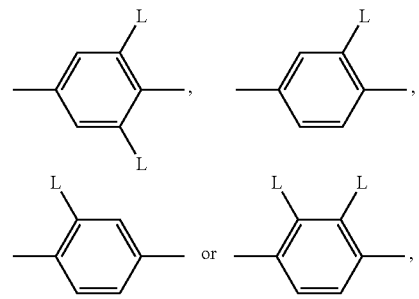

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from the group consisting of $CH_2=CW^1$—CO—O—, $CH_2=CW^1$—CO—,

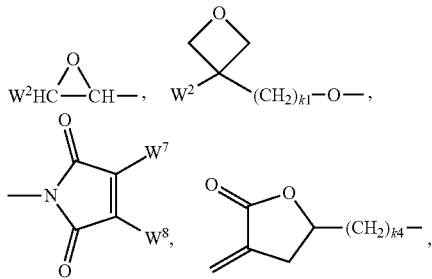

$CH_2=CW^2$—$(O)_{k3}$—, $CW^1=CH$—CO—$(O)_{k3}$—, $CW^1=CH$—CO—NH—, $CH_2=CW^1$—CO—NH—, $CH_3$—CH=CH—O—, $(CH_2=CH)_2CH$—OCO—, $(CH_2=CH$—$CH_2)_2CH$—OCO—, $(CH_2=CH)_2CH$—O—, $(CH_2=CH$—$CH_2)_2N$—, $(CH_2=CH$—$CH_2)_2N$—CO—, HO—$CW^2W^3$—, HS—$CW^2W^3$—, $HW^2N$—, HO—$CW^2W^3$—NH—, $CH_2=CW^1$—CO—NH—, $CH_2=CH$—$(COO)_{k1}$-Phe-$(O)_{k2}$—, $CH_2=CH$—$(CO)_{k1}$-Phe-$(O)_{k2}$—, Phe-CH=CH—, HOOC—, OCN— and $W^4W^5W^6Si$—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having up to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2=CW^1$—CO—O—, $CH_2=CW^1$—CO—,

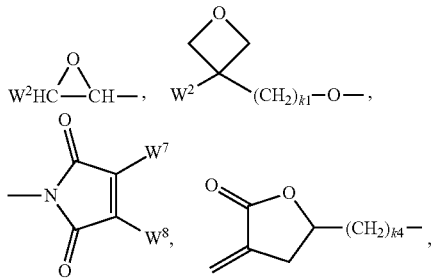

$CH_2=CW^2$—O—, $CH_2=CW^2$—, $CW^1=CH$—CO—$(O)_{k3}$—, $CW^1=CH$—CO—NH—, $CH_2=CW^1$—CO—NH—, $(CH_2=CH)_2CH$—OCO—, $(CH_2=CH$—$CH_2)_2$CH—OCO—, $(CH_2=CH)_2CH$—O—, $(CH_2=CH$—$CH_2)_2$N—, $(CH_2=CH$—$CH_2)_2N$—CO—, $CH_2=CW^1$—CO—NH—, $CH_2=CH$—$(COO)_{k1}$-Phe-$(O)_{k2}$—, $CH_2=CH$—$(CO)_{k1}$-Phe-$(O)_{k2}$—, Phe-CH=CH— and $W^4W^5W^6Si$—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having up to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1$—CO—O—, in particular $CH_2=CH$—CO—O—, $CH_2=C(CH_3)$—CO—O— and $CH_2=CF$—CO—O—, and furthermore $CH_2=CH$—O—, $(CH_2=CH)_2CH$—O—CO—, $(CH_2=CH)_2CH$—O—,

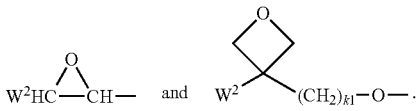

Further preferred polymerizable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—C—, —O—CO—, —O—CO—O—, —S—CO—, —CO—S—, —N($R^{00}$)—CO—O—, —C—CO—N($R^0$)—, —N($R^0$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and $R^0$ and RO have the meanings indicated above.

Particularly preferred groups Sp and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

DETAILED DESCRIPTION OF THE INVENTION

In the method according to the present invention, a twisted nematic LC configuration is provided with an initially short pitch corresponding to an STN configuration, where d/p is >0.5 and the twist angle is in the range from 210 to 330°, preferably 270°.

This is achieved by adding a chiral dopant to the LC medium, which has a certain twisting power.

The helical twisting power or HTP of a chiral dopant is a measure of its ability to induce a helical twist in a specific nematic LC medium. The HTP of a chiral dopant is an intrinsic property and can be defined by equation (1)

$$HTP = (p \cdot c)^{-1} \quad (1)$$

wherein p is the pitch of the induced helical twist, and c is the concentration c of the chiral dopant in the LC medium.

It is also possible to use two or more chiral dopants, for example in order to compensate for the temperature dependence of the HTP of the individual dopants and thus to reduce temperature dependence of the helical pitch.

During the manufacturing process, a defined voltage is then applied to the electrodes of the display. As a result, the twist angle is reduced to a value corresponding to a TN configuration, like 90°.

According to K. Takatoh et al., *Liq. Cryst.* 2012, 39, 715-720, the change of the twist angle from 270° to 90° can be explained by the LC molecules changing from a twisted splay state (as in a STN configuration) to a twisted bend state (as in a TN configuration).

This voltage-induced TN configuration is metastable and would normally relax to the initial STN configuration after a certain time when the voltage is switched off.

In the method according to the present invention, relaxation of the twist angle from the TN-LC to the STN-LC configuration is prevented by polymerizing the polymerizable compounds of component B, preferably by UV-photo-polymerization. Thereby the metastable TN configuration with the "unnaturally" low twist angle is preserved, despite the short pitch induced by the chiral dopant. The LC molecules in the LC medium are thus forced into a state where the twist is lower than the natural pitch of the LC medium as given by equation (1) above. In other words, the actual twist angle of the LC molecules does no longer correspond to the "natural" pitch of the helical twist induced by the chiral dopant and the d/p value of the display cell.

As a result of this method, a significant reduction of the response times can be achieved, compared to a display which is made from similar materials but wherein the amount of the chiral dopant is reduced so that the pitch is longer and the d/p value is lower and both are matching the reduced twist angle.

It was found that polymer stabilization of the low twist and advantageous effects of the PS-TN LCD according to the present invention, like fast rise and decay times, high transmittance and good contrast, can be achieved already by adding only a low amount of <3% of polymerizable mesogenic compounds to the LC medium.

It was also found that in the PS-TN LCD according to the present invention a substantial part of the polymer which is formed by the polymerizable mesogenic compounds will phase-separate or precipitate from the LC medium and form a polymer layer on the substrates or electrodes, or the alignment layer provided thereon. This could be confirmed by microscopic measurements (like SEM or AFM) which show that the formed polymer mainly accumulates at the LC layer/substrate interface. Thereby especially the loss of transmittance LCDs compared to unstabilized TN LCDs could be reduced and high transmittance could be realized.

These are significant advantages that could not be expected from prior art like the publications cited above, where it is reported that certain minimum amounts of monomer are needed for the formation of either a polymer network or polymer walls in the LC medium, and that the polymer network or polymer walls in the LC medium cause a lower transmittance.

Preferably the LC medium used in the display according to the present invention comprises A) a liquid crystal component A comprising mesogenic or liquid-crystalline molecules,
B) a polymerizable component B comprising one or more polymerizable mesogenic compounds,
C) one or more chiral additives, preferably selected from chiral dopants,
D) optionally one or more further additives, preferably selected from stabilizers and polymerization initiators, wherein the concentration of the polymerizable mesogenic compounds of component B in the LC medium is from 1 to <3% by weight, preferably from 2 to <3% by weight.

The liquid-crystalline component A) of an LC medium as used in the display according to the present invention is hereinafter also referred to as "LC host mixture", and preferably contains only LC compounds that are selected from low-molecular-weight compounds which are unpolymerizable.

Preferably the component A or LC host mixture of the LC medium comprises one or more compounds selected from formula A and B

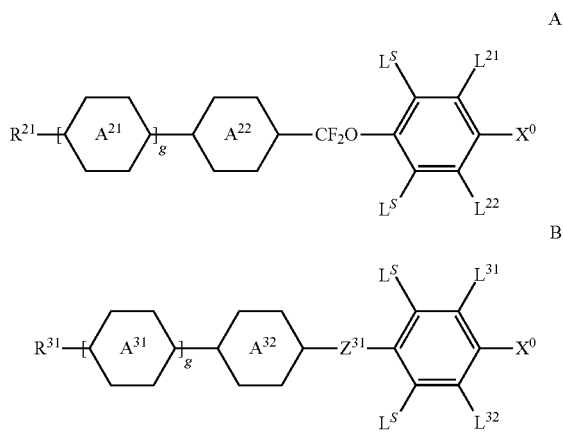

in which the individual radicals have, independently of each other and on each occurrence identically or differently, the following meanings:

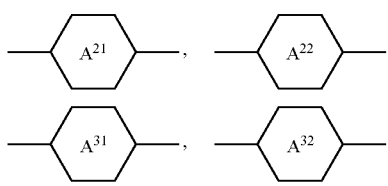

each, independently of one another, and on each occurrence, identically or differently

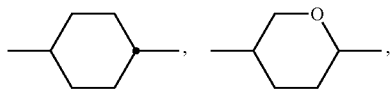

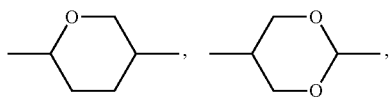

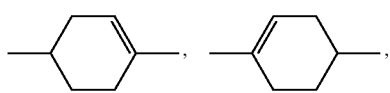

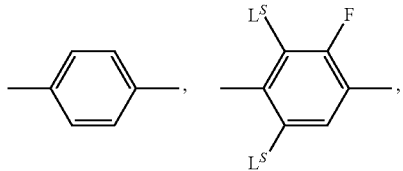

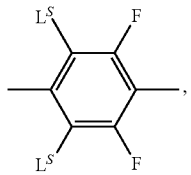

- $R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated,
- $X^0$ F, Cl, halogenated alkyl or alkoxy having 1 to 6 C atoms or halogenated alkenyl or alkenyloxy having 2 to 6 C atoms,
- $Z^{31}$ —$CH_2CH_2$—, —$CF_2CF_2$—, —COO—, trans-CH=CH—, trans-CF=CF—, —$CH_2O$— or a single bond, preferably —$CH_2CH_2$—, —COO—, trans-CH=CH— or a single bond, particularly preferably —COO—, trans-CH=CH— or a single bond,
- $L^{21}$, $L^{22}$, $L^{31}$, $L^{32}$ each, independently of one another, H or F,
- $L^S$ H or $CH_3$, wherein preferably at least one of two groups $L^S$ attached to the same benzene ring is H, and
- g 0, 1, 2 or 3.

In the compounds of formula A and B, $X^0$ is preferably F, Cl, $CF_3$, $CHF_2$, $OCF_3$, $OCHF_2$, $OCFHCF_3$, $OCFHCHF_2$, $OCF_2CH_3$, $OCF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, very preferably F or $OCF_3$, most preferably F.

In the compounds of formulae A and B and their subformulae, the rings

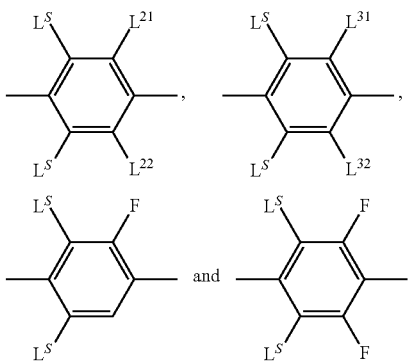

preferably denote

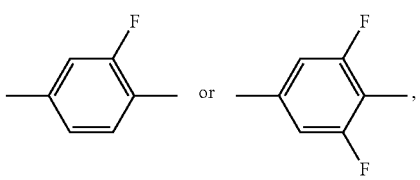

and
furthermore

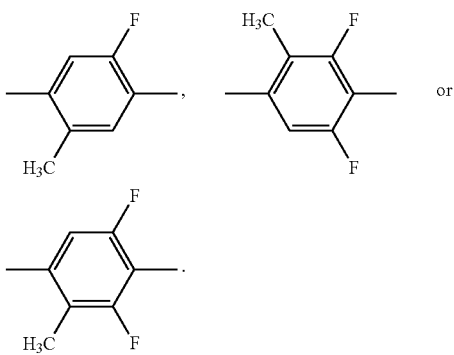

In a preferred embodiment at least one of the compounds of formula A and B or their subformulae contains at least one ring

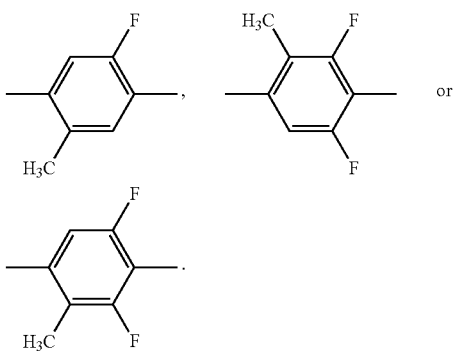

In the compounds of formulae A and B, $R^{21}$ and $R^{31}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formulae A and B, g is preferably 1 or 2.

In the compounds of formula B, $Z^{31}$ is preferably COO, trans-CH=CH or a single bond, very preferably COO or a single bond.

Preferably component A) of the LC medium comprises one or more compounds of formula A selected from the group consisting of the following formulae:

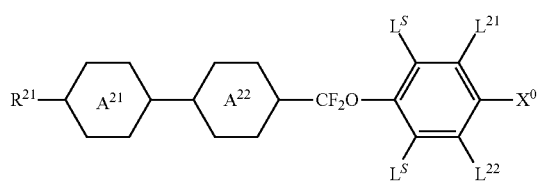

A1

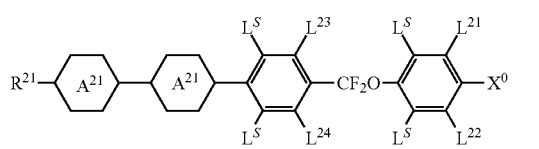

A2

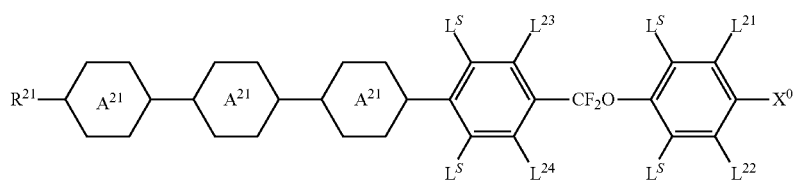

A3 A4 in which $A^{21}$, $R^{21}$, $X^0$, $L^{21}$, $L^{22}$ and $L^S$ have the meanings given in formula A, $L^{23}$ and $L^{24}$ each, independently of one another, are H or F, and $X^0$ is preferably F. Particularly preferred are compounds of formulae A1 and A2.

Particularly preferred compounds of formula A1 are selected from the group consisting of the following subformulae:

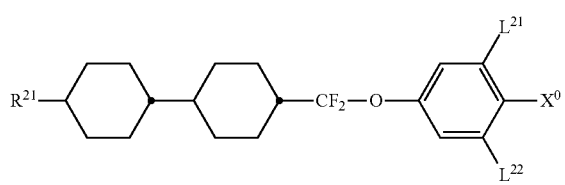

A1a

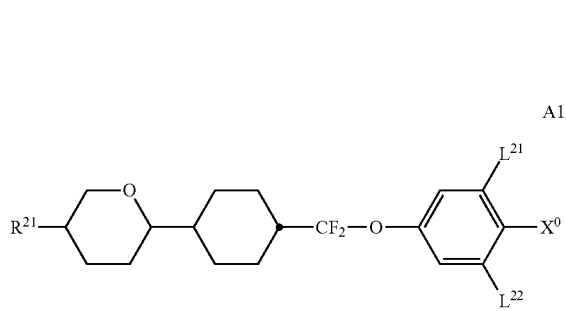

A1b

-continued

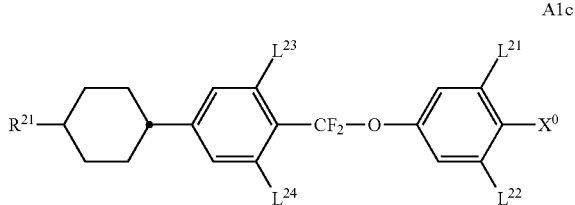

A1c

-continued

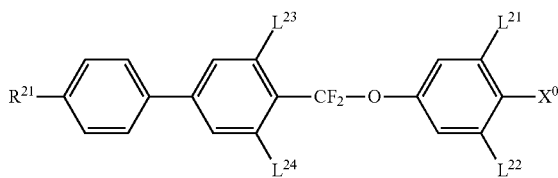

A1d

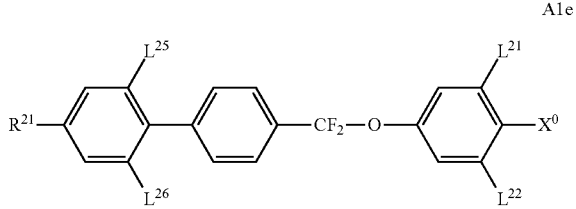

A1e

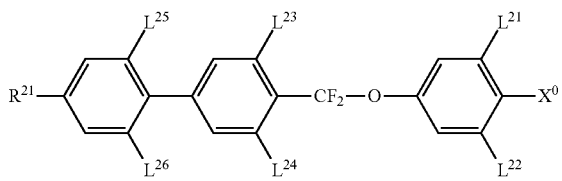

A1f

-continued

A1g
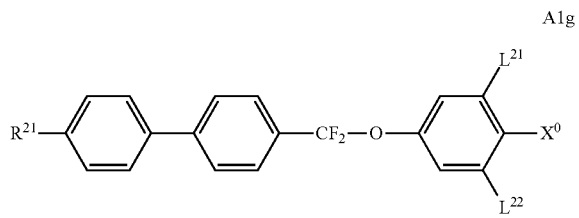

in which $R^{21}$, $X^0$, $L^{21}$ and $L^{22}$ have the meaning given in formula A1, $L^{23}$, $L^{24}$, $L^{25}$ and $L^{26}$ are each, independently of one another, H or F, and $X^0$ is preferably F.

Further preferred are compounds of formula A1a-A1g wherein at least one of the fluorine-substituted benzene rings is additionally substituted by a methyl group in para-position to a fluorine atom.

Very particularly preferred compounds of formula A1 are selected from the group consisting of the following subformulae:

A1a1
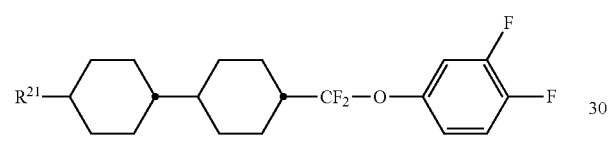

A1a2
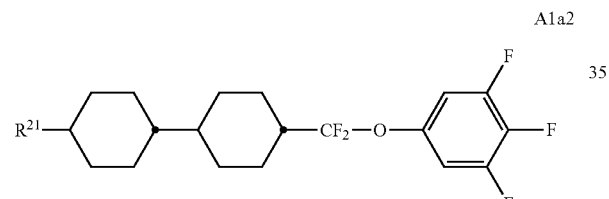

A1b1
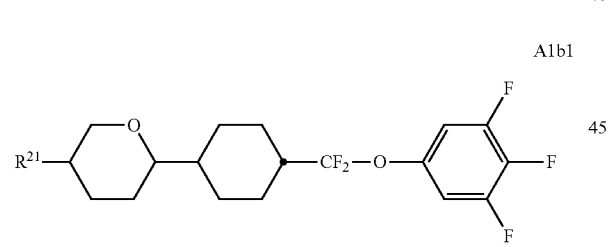

A1b2
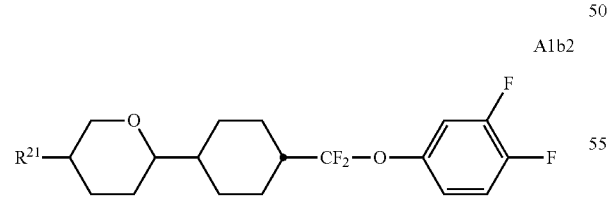

A1d1
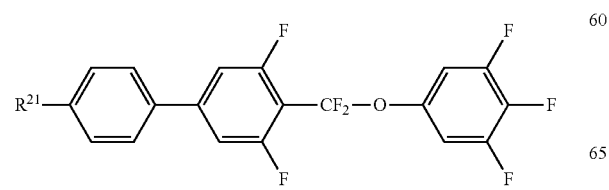

-continued

A1d2
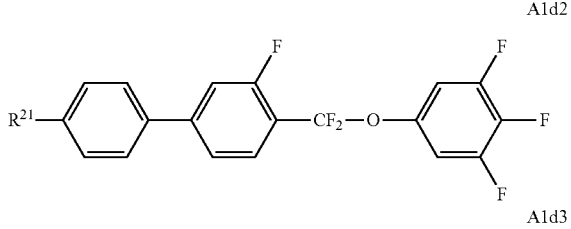

A1d3
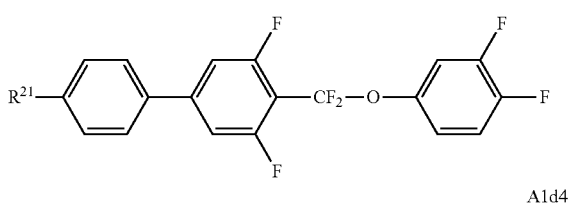

A1d4
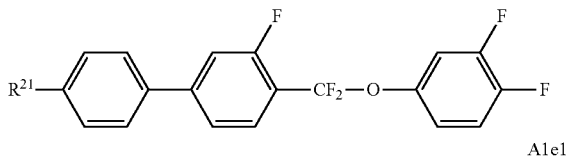

A1e1
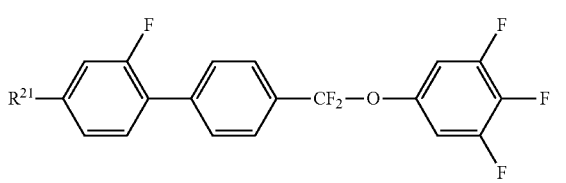

A1f1
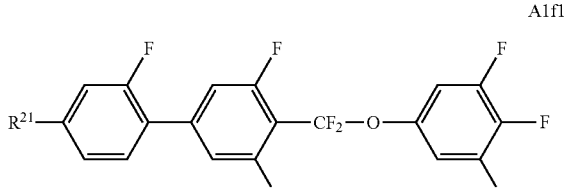

A1g1
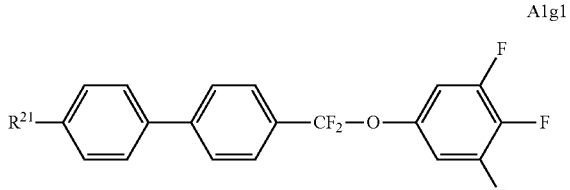

in which $R^{21}$ is as defined in formula A1.

Further preferred are compounds of formula A1a1-A1g1 wherein at least one of the fluorine-substituted benzene rings is additionally substituted by a methyl group in para-position to a fluorine atom.

Particularly preferred compounds of formula A2 are selected from the group consisting of the following subformulae:

A2a
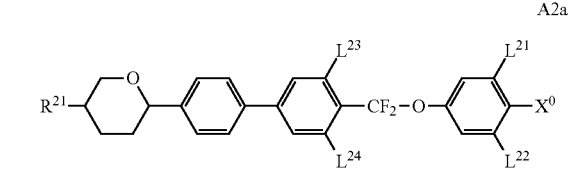

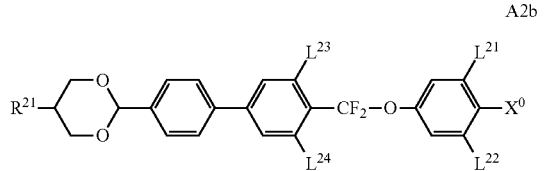
A2b

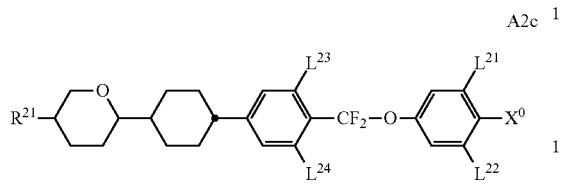
A2c

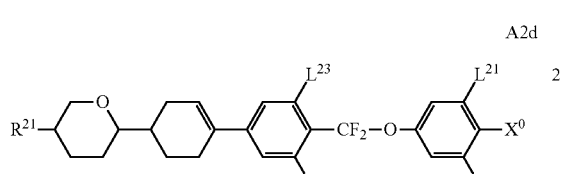
A2d

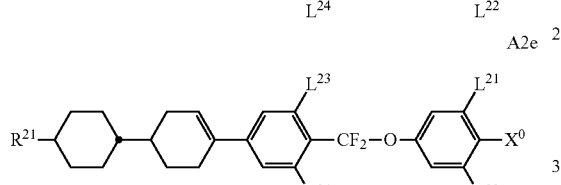
A2e

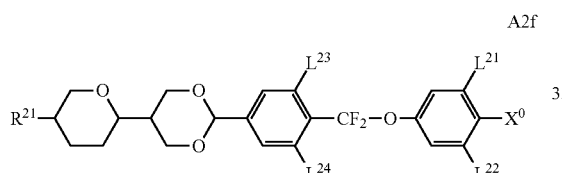
A2f

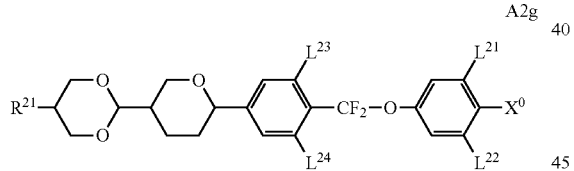
A2g

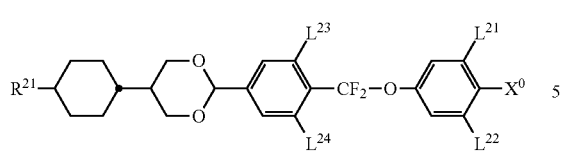
A2h

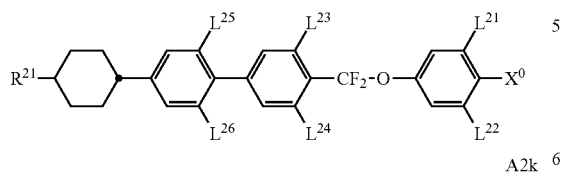
A2i

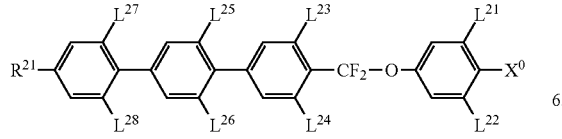
A2k

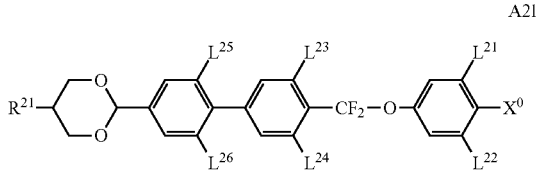
A2l in which $R^{21}$, $X^0$, $L^{21}$ and $L^{22}$ have the meaning given in formula A2, $L^{23}$, $L^{24}$, $L^{25}$ and $L^{26}$ each, independently of one another, are H or F, and $X^0$ is preferably F.

Further preferred are compounds of formula A2a-A2l wherein at least one of the fluorine-substituted benzene rings is additionally substituted by a methyl group in para-position to a fluorine atom.

Very particularly preferred compounds of formula A2 are selected from the group consisting of the following subformulae:

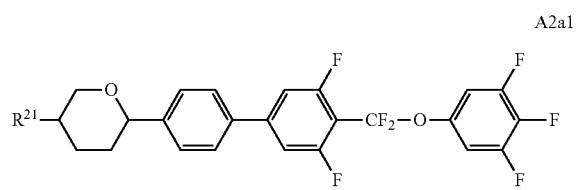
A2a1

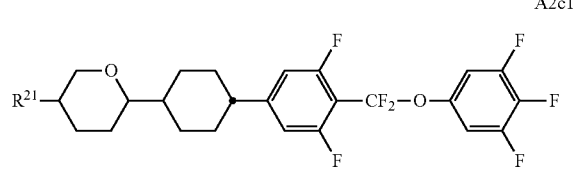
A2c1

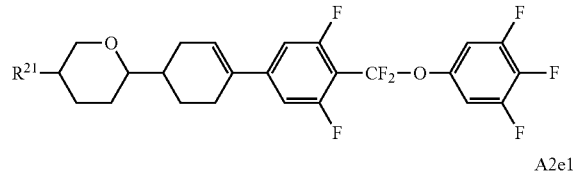
A2d1

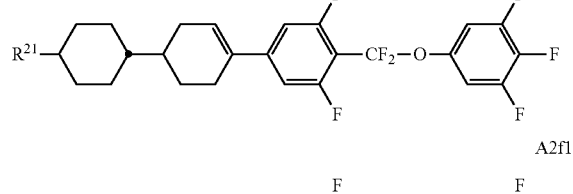
A2e1

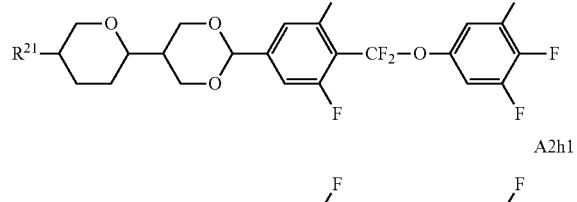
A2f1

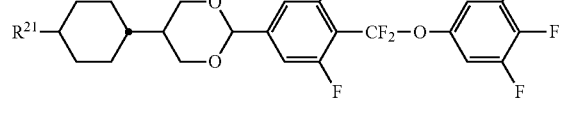
A2h1

-continued

A2i1
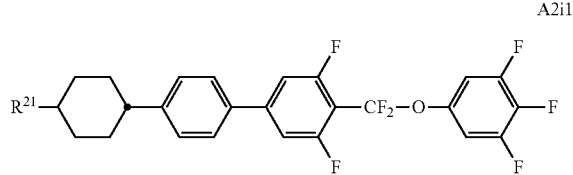

A2i2
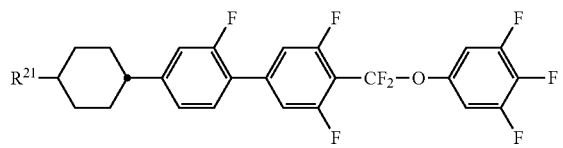

A2k1
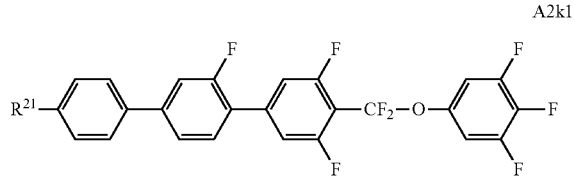

A2k2
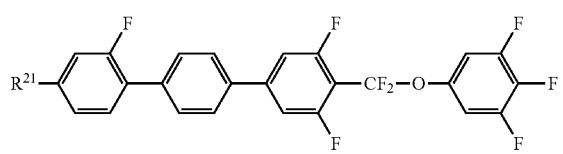

A2l1
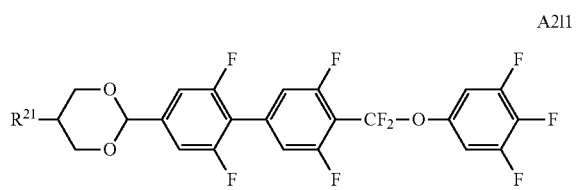

A2l2
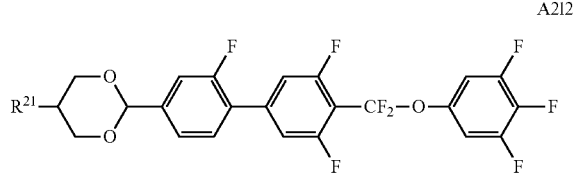

in which R²¹ and X⁰ are as defined in formula A2.

Further preferred are compounds of formula A2a1-A2l2 wherein at least one of the fluorine-substituted benzene rings is additionally substituted by a methyl group in para-position to a fluorine atom.

Particularly preferred compounds of formula A3 are selected from the group consisting of the following subformulae:

A3a
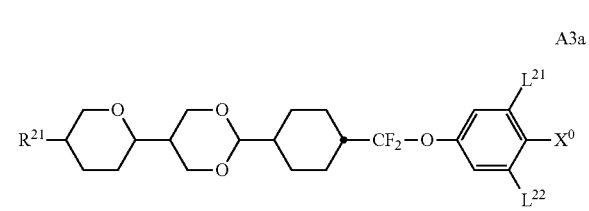

A3b
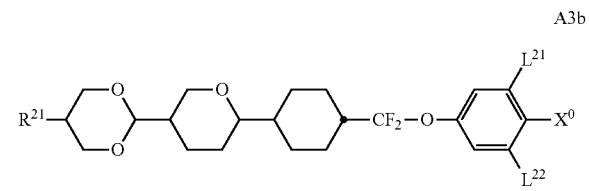

A3c
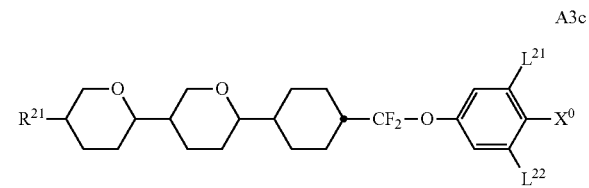

in which R²¹, X⁰, L²¹ and L²² have the meaning given in formula A3, and X⁰ is preferably F.

Further preferred are compounds of formula A3a-A3c wherein at least one of the fluorine-substituted benzene rings is additionally substituted by a methyl group in para-position to a fluorine atom.

Particularly preferred compounds of formula A4 are selected from the group consisting of the following subformulae:

A4a
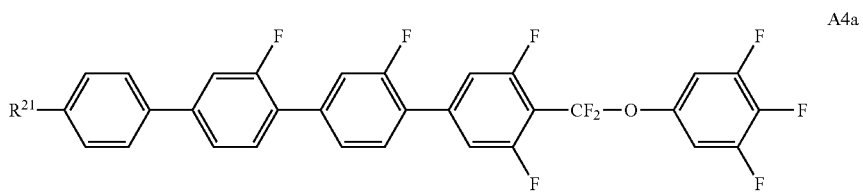

in which R²¹ is as defined in formula A4.

Further preferred are compounds of formula A4a wherein at least one of the fluorine-substituted benzene rings is additionally substituted by a methyl group in para-position to a fluorine atom.

Preferably component A) of the LC medium comprises one or more compounds of formula B selected from the group consisting of the following formulae:

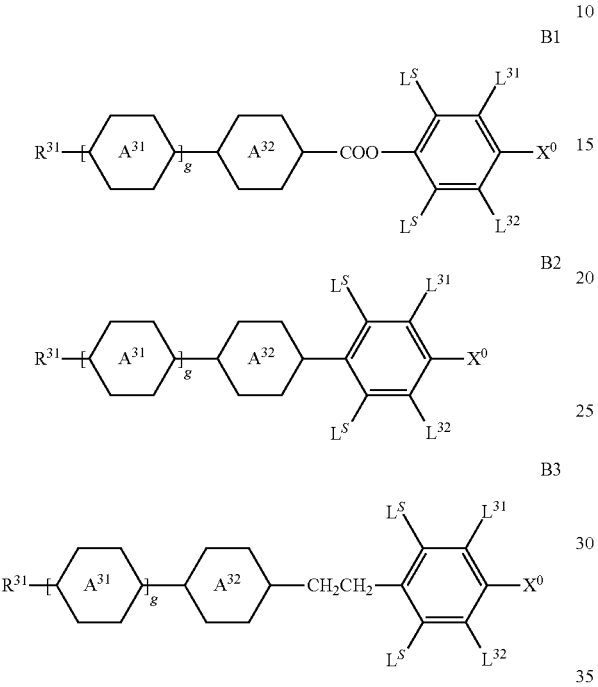

in which g, $A^{31}$, $A^{32}$, $R^{31}$, $X^0$, $L^{31}$, $L^{32}$ and $L^S$ have the meanings given in formula B, and $X^0$ is preferably F. Particularly preferred are compounds of formulae B1 and B2.

Particularly preferred compounds of formula B1 are selected from the group consisting of the following subformulae:

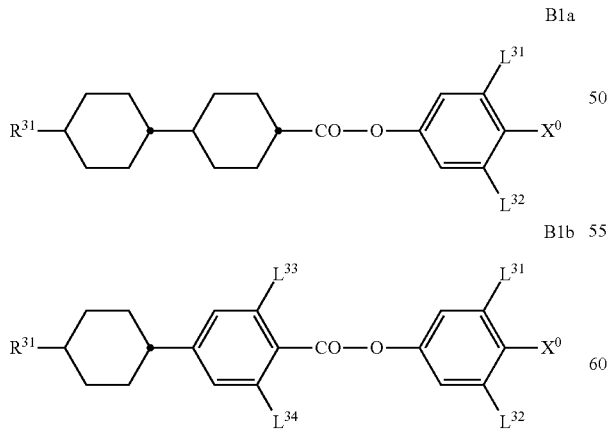

in which $R^{31}$, $X^0$, $L^{31}$ and $L^{32}$ have the meaning given in formula B1, $L^{33}$ and $L^{32}$ each, independently of one another, H or F, and $X^0$ is preferably F.

Further preferred are compounds of formula B1a-B1b wherein at least one of the fluorine-substituted benzene rings is additionally substituted by a methyl group in para-position to a fluorine atom.

Very particularly preferred compounds of formula B1a are selected from the group consisting of the following subformulae:

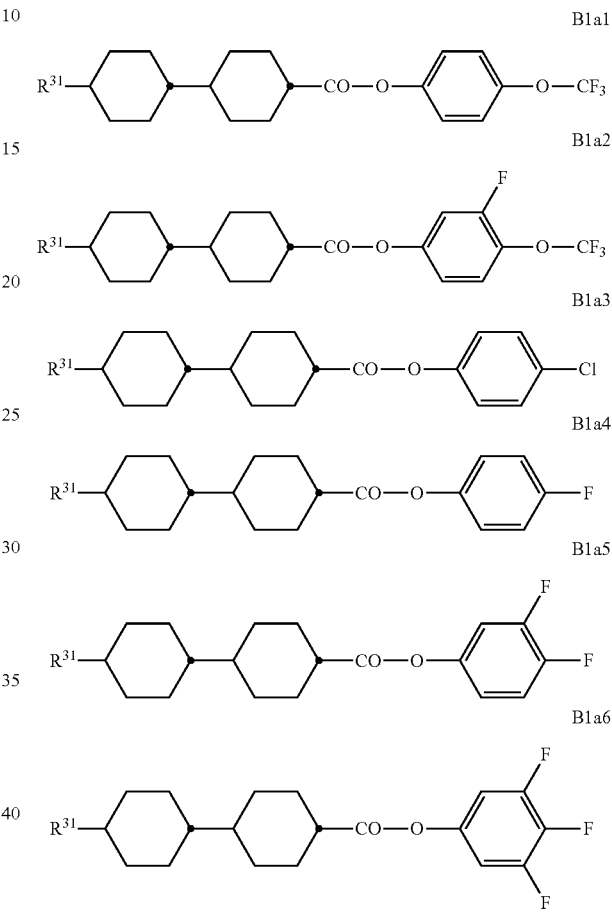

in which $R^{31}$ is as defined in formula B1.

Further preferred are compounds of formula B1a1-B1a6 wherein at least one of the fluorine-substituted benzene rings is additionally substituted by a methyl group in para-position to a fluorine atom.

Very particularly preferred compounds of formula B1b are selected from the group consisting of the following subformulae:

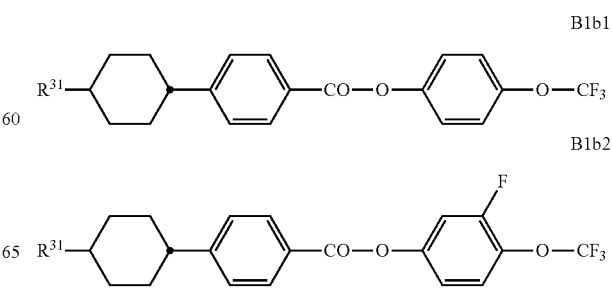

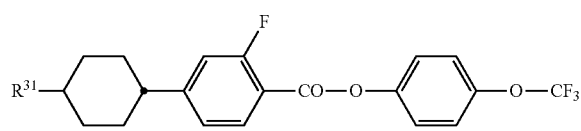
B1b3

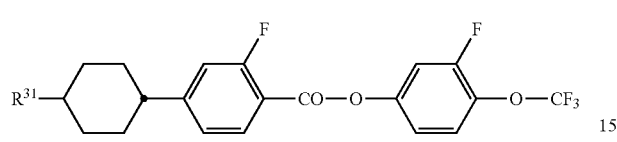
B1b4 in which R³¹ is as defined in formula B1.

Further preferred are compounds of formula B1b1-B1b4 wherein at least one of the fluorine-substituted benzene rings is additionally substituted by a methyl group in para-position to a fluorine atom.

Particularly preferred compounds of formula B2 are selected from the group consisting of the following subformulae:

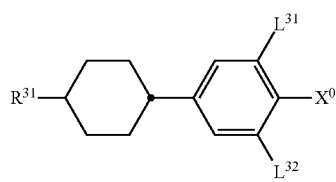
B2a

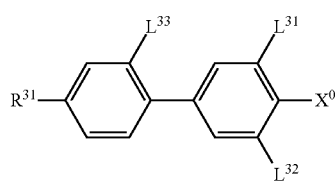
B2b

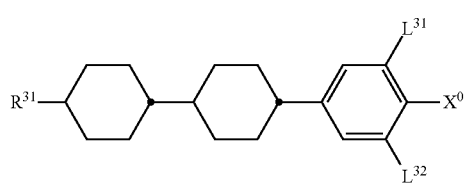
B2c

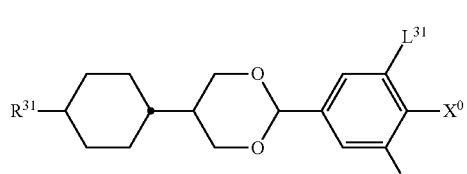
B2d

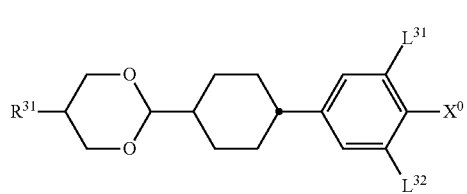
B2e

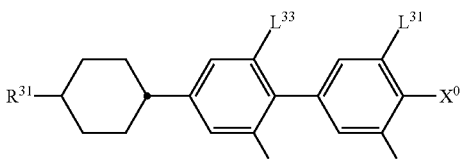
B2f

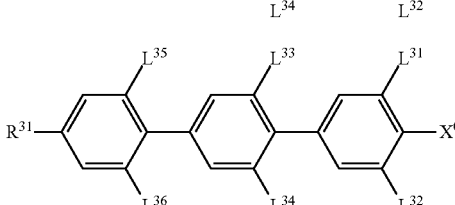
B2g

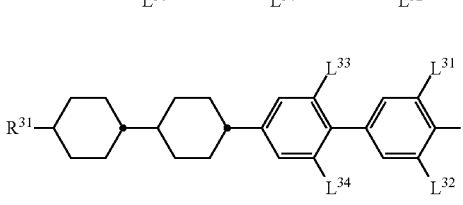
B2h

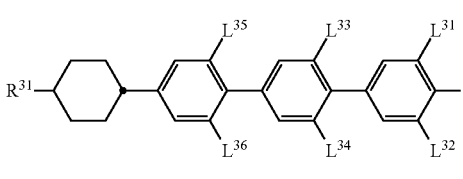
B2i

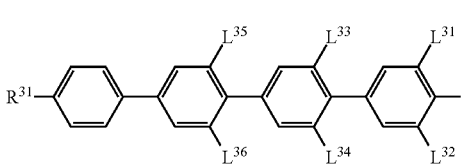
B2k

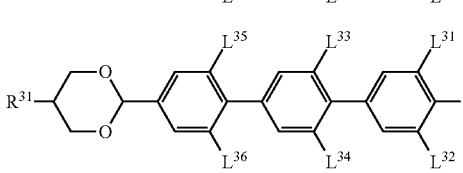
B2l in which $R^{31}$, $X^0$, $L^{31}$ and $L^{32}$ have the meaning given in formula B2, $L^{33}$, $L^{34}$, $L^{35}$ and $L^{36}$ are each, independently of one another, H or F, and $X^0$ is preferably F.

Further preferred are compounds of formula B2a-B2l wherein at least one of the fluorine-substituted benzene rings is additionally substituted by a methyl group in para-position to a fluorine atom.

Very particularly preferred compounds of formula B2 are selected from the group consisting of the following subformulae:

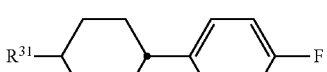
B2a1

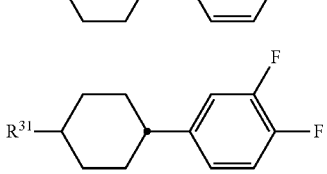
B2a2

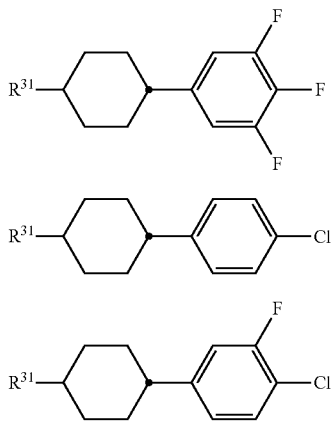

B2a3

B2a4

B2a5 in which R³¹ is as defined in formula B2.

Further preferred are compounds of formula B2a1-B2a5 wherein at least one of the fluorine-substituted benzene rings is additionally substituted by a methyl group in para-position to a fluorine atom.

Very particularly preferred compounds of formula B2b are selected from the group consisting of the following subformulae

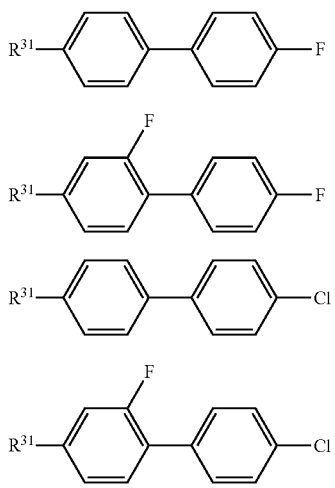

B2b1

B2b2

B2b3

B2b4 in which R³¹ is as defined in formula B2.

Further preferred are compounds of formula B2b1-B2b4 wherein at least one of the fluorine-substituted benzene rings is additionally substituted by a methyl group in para-position to a fluorine atom.

Very particularly preferred compounds of formula B2c are selected from the group consisting of the following subformulae:

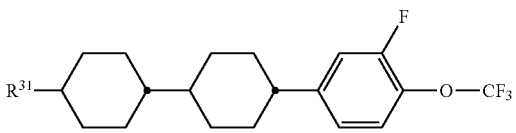

B2c1

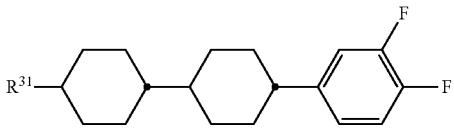

B2c2

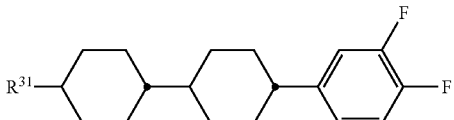

B2c3

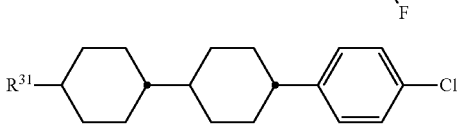

B2c4

B2c5 in which R³¹ is as defined in formula B2.

Further preferred are compounds of formula B2c1-B2c5 wherein at least one of the fluorine-substituted benzene rings is additionally substituted by a methyl group in para-position to a fluorine atom.

Very particularly preferred compounds of formula B2d and B2e are selected from the group consisting of the following subformulae:

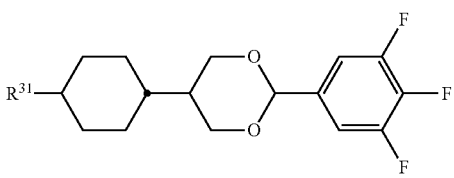

B2d1

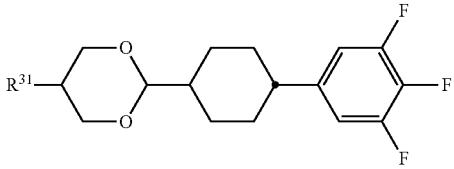

B2e1 in which R³¹ is as defined in formula B2.

Further preferred are compounds of formula B2d1 and B2e1 wherein at least one of the fluorine-substituted benzene rings is additionally substituted by a methyl group in para-position to a fluorine atom.

Very particularly preferred compounds of formula B2f are selected from the group consisting of the following subformulae:

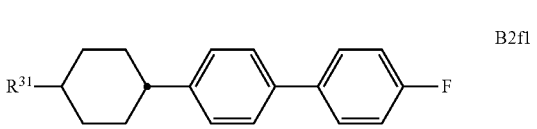

B2f1

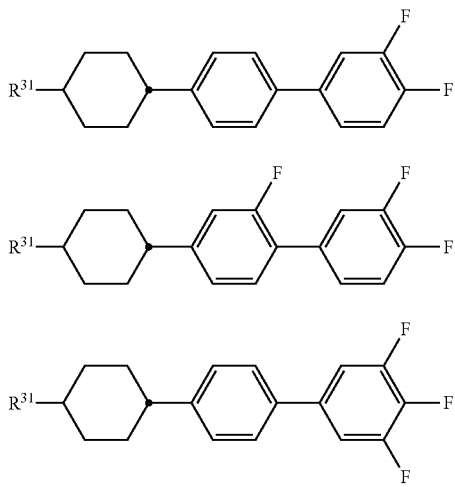

B2f2

B2f3

B2f4

B2f5 in which $R^{31}$ is as defined in formula B2.

Further preferred are compounds of formula B2f1-B2f5 wherein at least one of the fluorine-substituted benzene rings is additionally substituted by a methyl group in para-position to a fluorine atom.

Very particularly preferred compounds of formula B2g are selected from the group consisting of the following subformulae:

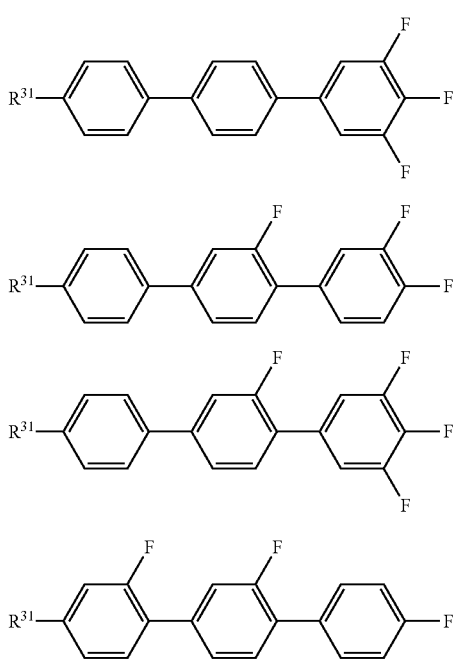

B2g1

B2g2

B2g3

B2g4

B2g5 in which $R^{31}$ is as defined in formula B2.

Further preferred are compounds of formula B2g1-B2g5 wherein at least one of the fluorine-substituted benzene rings is additionally substituted by a methyl group in para-position to a fluorine atom.

Very particularly preferred compounds of formula B2h are selected from the group consisting of the following subformulae:

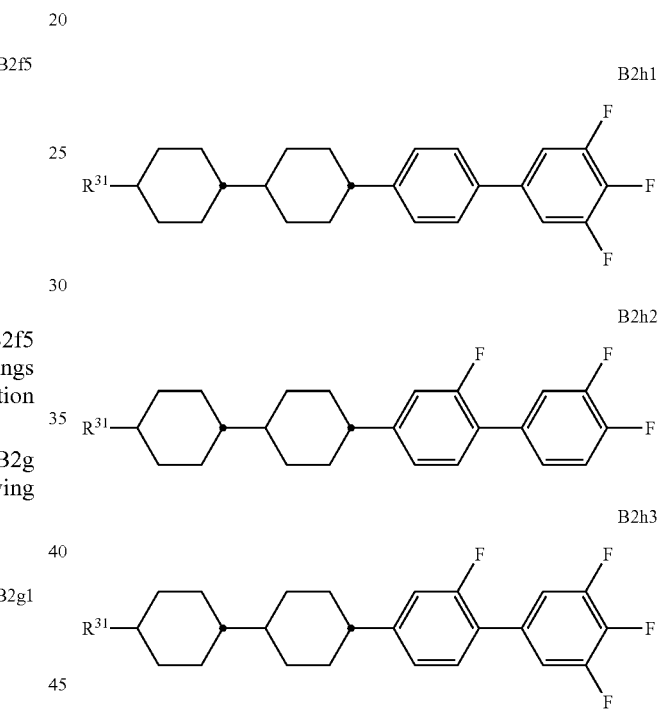

B2h1

B2h2

B2h3 in which $R^{31}$ is as defined in formula B2.

Further preferred are compounds of formula B2h1-B2h3 wherein at least one of the fluorine-substituted benzene rings is additionally substituted by a methyl group in para-position to a fluorine atom.

Very particularly preferred compounds of formula B2i are selected from the group consisting of the following subformulae:

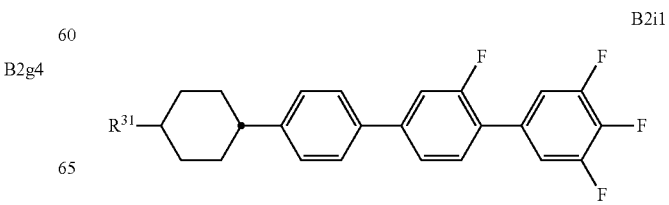

B2i1

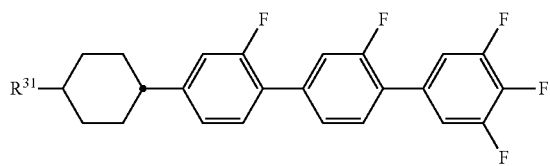

B2i2 in which R³¹ is as defined in formula B2.

Further preferred are compounds of formula B2i1 and B2i2 wherein at least one of the fluorine-substituted benzene rings is additionally substituted by a methyl group in para-position to a fluorine atom.

Very particularly preferred compounds of formula B2k are selected from the group consisting of the following subformulae:

B2k1

B2k2

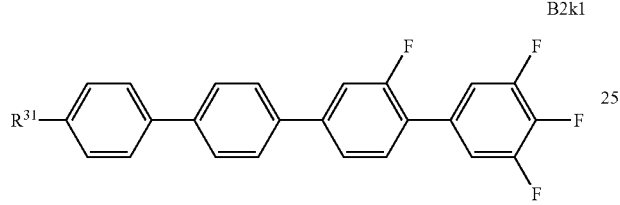

in which R³¹ is as defined in formula B2.

Further preferred are compounds of formula B2k1 and B2k2 wherein at least one of the fluorine-substituted benzene rings is additionally substituted by a methyl group in para-position to a fluorine atom.

Very particularly preferred compounds of formula B2l are selected from the group consisting of the following subformulae:

B2l1

B2l2

Further preferred are compounds of formula B2l1 and B2l2 wherein at least one of the fluorine-substituted benzene rings is additionally substituted by a methyl group in para-position to a fluorine atom.

Alternatively to, or in addition to, the compounds of formula B1 and/or B2 component A) of the LC medium may also comprise one or more compounds of formula B3 as defined above.

Particularly preferred compounds of formula B3 are selected from the group consisting of the following subformulae:

B3a

B3b in which R³¹ is as defined in formula B3.

Further preferred are compounds of formula B3a and B3b wherein at least one of the fluorine-substituted benzene rings is additionally substituted by a methyl group in para-position to a fluorine atom.

Preferably component A) of the LC medium comprises, in addition to the compounds of formula A and/or B, one or more compounds of formula C

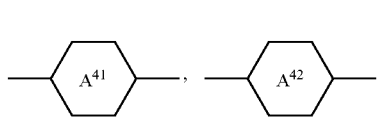

C in which the individual radicals have the following meanings:

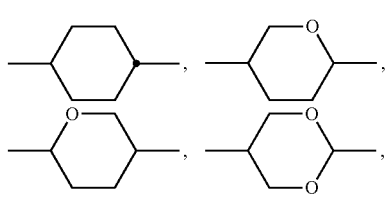

each, independently of one another, and on each occurrence, identically or differently

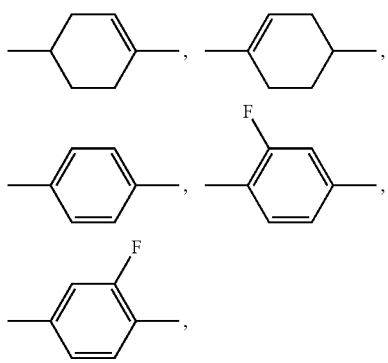

$R^{41}$, $R^{42}$ each, independently of one another, alkyl, alkoxy, oxaalkyl or alkoxyalkyl having up to 9 C atoms or alkenyl or alkenyloxy having 2 to 9 C atoms, all of which are optionally fluorinated, $Z^{41}$, $Z^{42}$ each, independently of one another, —CH$_2$CH$_2$—, —COO—, trans-CH=CH—, trans-CF=CF—, —CH$_2$O—, —CF$_2$O—, —C≡C— or a single bond, preferably a single bond, and h 0, 1, 2 or 3.

In the compounds of formula C, $R^{41}$ and $R^{42}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula C, h is preferably 0, 1 or 2.

In the compounds of formula C, $Z^{41}$ and $Z^{42}$ are preferably selected from COO, trans-CH=CH and a single bond, very preferably from COO and a single bond.

Preferred compounds of formula C are selected from the group consisting of the following subformulae:

C1
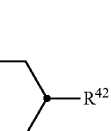

C2
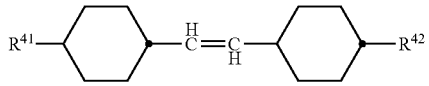

C3
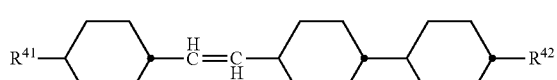

C4
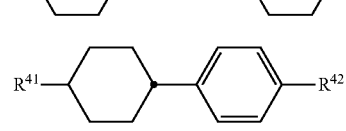

C5
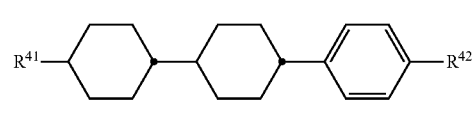

C6
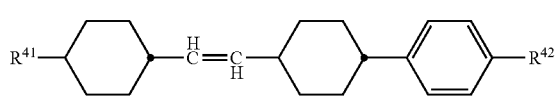

C7
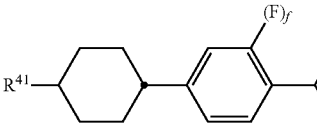

C8
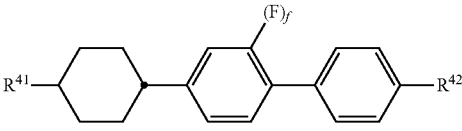

C9
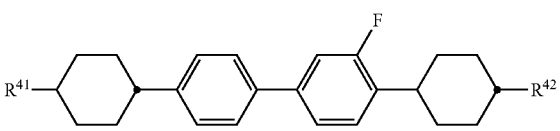

C10

C11

C12
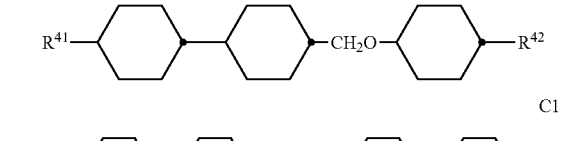

C13
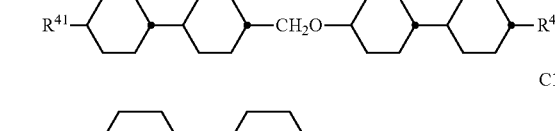

C14
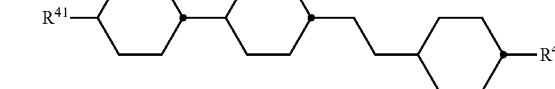

C15

C16

C17

-continued

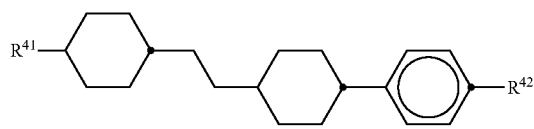
C18

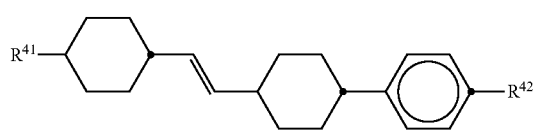
C19

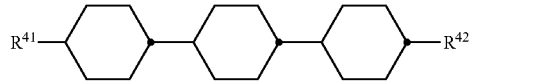
C20

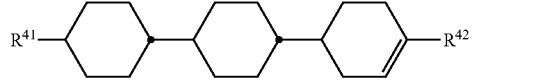
C21

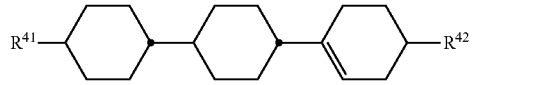
C22

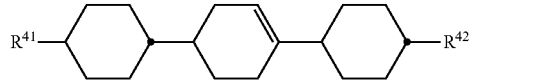
C23 wherein f is 0 or 1, and $R^{41}$ and $R^{42}$ have the meanings given in formula C, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms.

Very preferred are compounds of formula C1, C4, C5 and C9.

Preferred compounds of formula C are selected from the group consisting of the following subformulae:

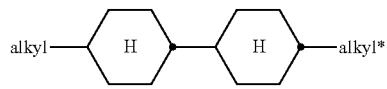
C1a

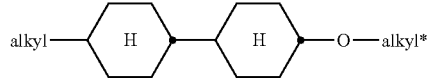
C1b

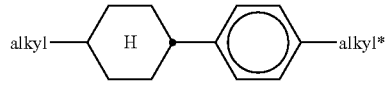
C4a

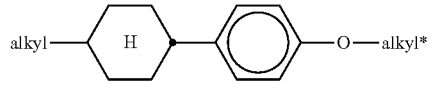
C4b

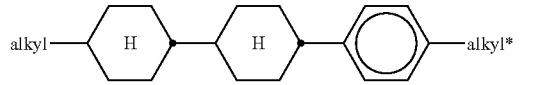
C5a

-continued

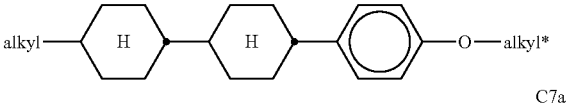
C5b

C7a

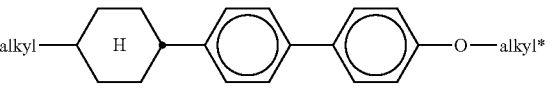
C7b

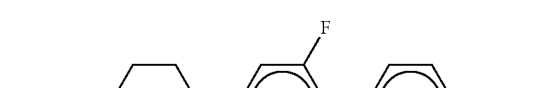
C7c

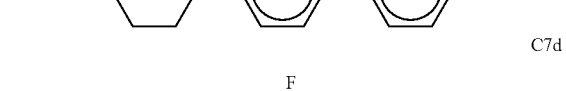
C7d

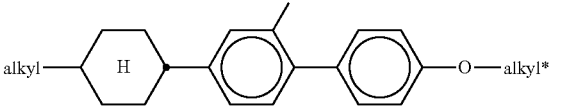
C9a

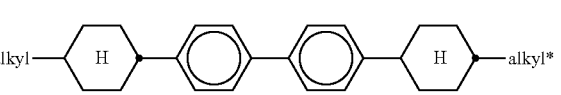
C9b

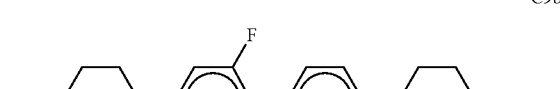
C12a

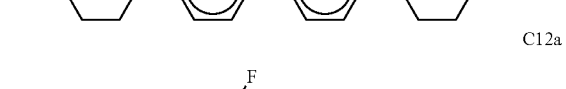
C14a in which alkyl and alkyl* each, independently of one another, denote a straight-chain alkyl radical having 1-6 C atoms.

Especially preferred are compounds of formula C1a, very preferably those selected from the following sub-formulae:

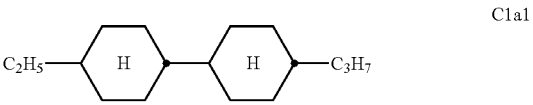
C1a1

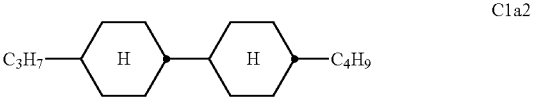
C1a2

-continued

C1a3 wherein the propyl, butyl and pentyl groups are straight-chain groups.

Most preferred are compounds of formula C1a1.

In another preferred embodiment of the present invention component A) of the LC medium comprises, in addition to the compounds of formula A and/or B and/or C, one or more compounds of formula D

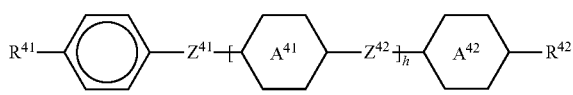
D in which $A^{41}$, $A^{42}$, $Z^{41}$, $Z^{42}$, $R^{41}$, $R^{42}$ and h have the meanings given in formula C or one of the preferred meanings given above.

Preferred compounds of formula D are selected from the group consisting of the following subformulae:

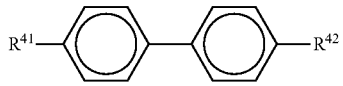
D1

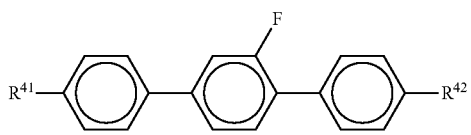
D2 in which $R^{41}$ and $R^{42}$ have the meanings given in formula D and preferably denote alkyl.

Very preferred compounds of formula D are selected from the group consisting of the following subformulae:

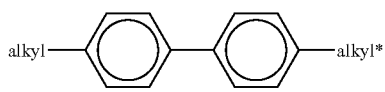
D1a

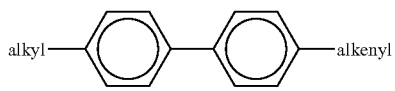
D1b

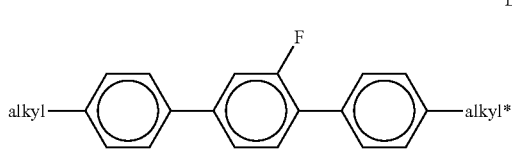
D2a

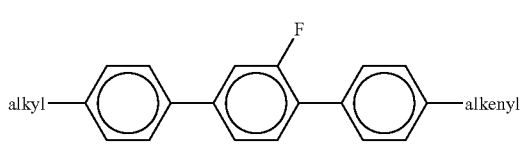
D2b in which alkyl and alkyl* each, independently of one another, denote a straight-chain alkyl radical having 1-6 C atoms, and alkenyl denotes a straight-chain alkenyl radical having 2-7 C atoms, preferably $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Most preferred compounds of formula D are selected from the group consisting of the following subformulae:

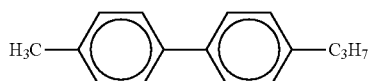
D1a1

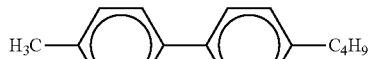
D1a2

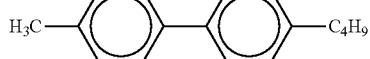
D2a1

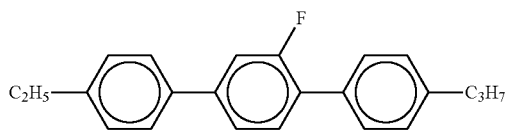
D2b1

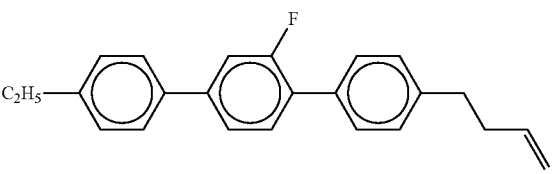

In another preferred embodiment of the present invention component A) of the LC medium comprises, in addition to the compounds of formula A and/or B, one or more compounds of formula E containing an alkenyl group

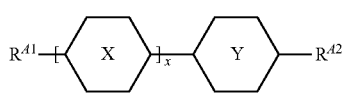
E in which the individual radicals, on each occurrence identically or differently, each, independently of one another, have the following meaning:

,
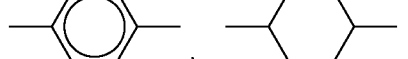
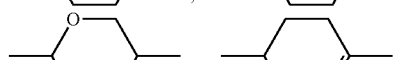
,
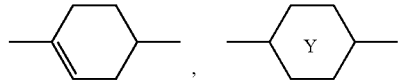
or
,

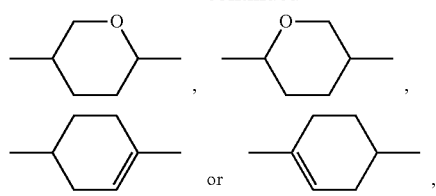

$R^{A1}$ alkenyl having 2 to 9 C atoms or, if at least one of the rings X and Y denotes cyclohexenyl, also one of the meanings of $R^{A2}$, $R^{A2}$ alkyl having 1 to 12 C atoms, in which, in addition, one or two non-adjacent CH$_2$ groups may each be replaced by —O—, —CH=CH—, —CO—, —OCO— or —COO— in such a way that O atoms are not linked directly to one another, x 1 or 2.

$R^{A2}$ is preferably straight-chain alkyl or alkoxy having 1 to 8 C atoms or straight-chain alkenyl having 2 to 7 C atoms.

Preferred compounds of formula E are selected from the following sub-formulae:

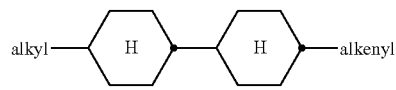
E1

E2

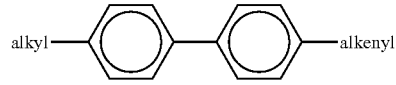
E3

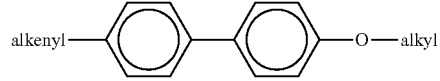
E4

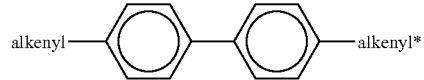
E5

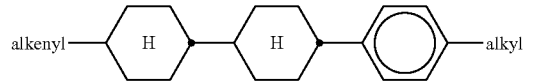
E6

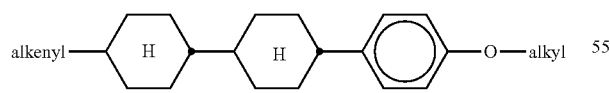
E7

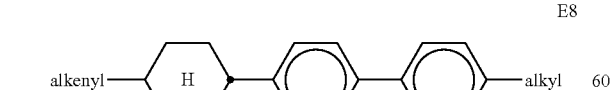
E8

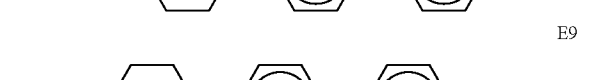
E9

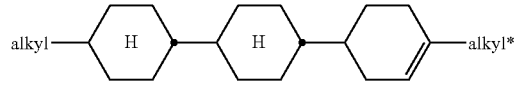
E10

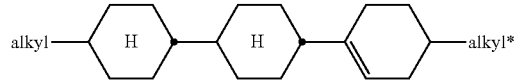
E11

E12 in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very preferred compounds of the formula E are selected from the following sub-formulae:

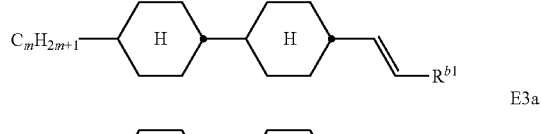
E1a

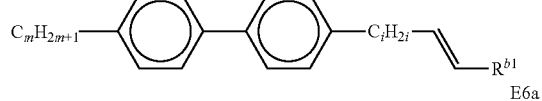
E3a

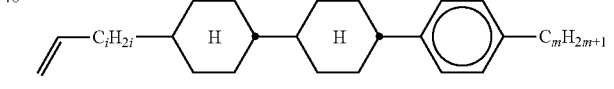
E6a in which m denotes 1, 2, 3, 4, 5 or 6, i denotes 0, 1, 2 or 3, and $R^{b1}$ denotes H, CH$_3$ or C$_2$H$_5$.

Very particularly preferred compounds of the formula E are selected from the following sub-formulae:

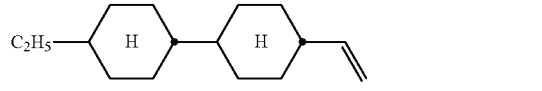
E1a1

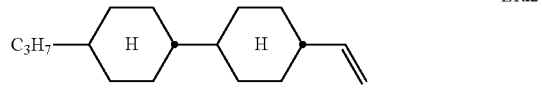
E1a2

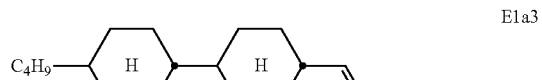
E1a3

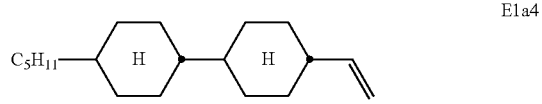
E1a4

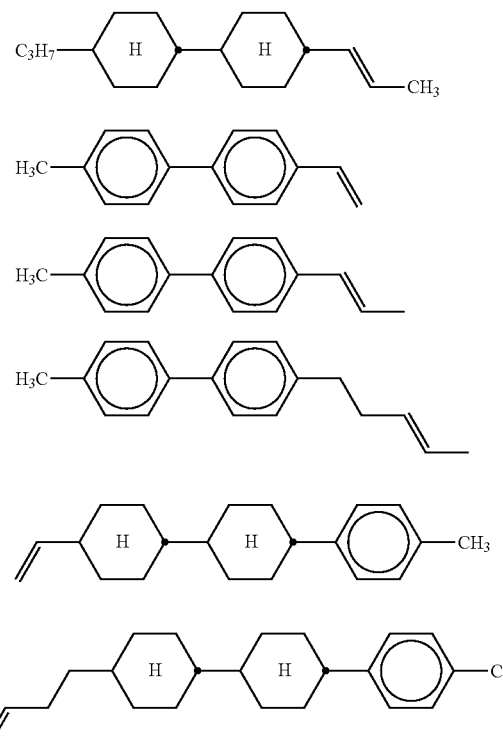

Most preferred are compounds of formula E1a2, E1a5, E6a1 and E6a2.

In another preferred embodiment of the present invention component A) of the LC medium comprises, in addition to the compounds of formula A and/or B, one or more compounds of formula F

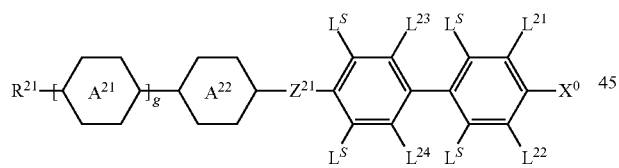

in which the individual radicals have, independently of each other and on each occurrence identically or differently, the following meanings:

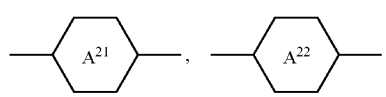

denote

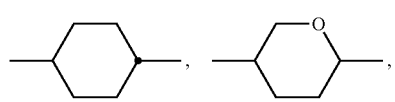

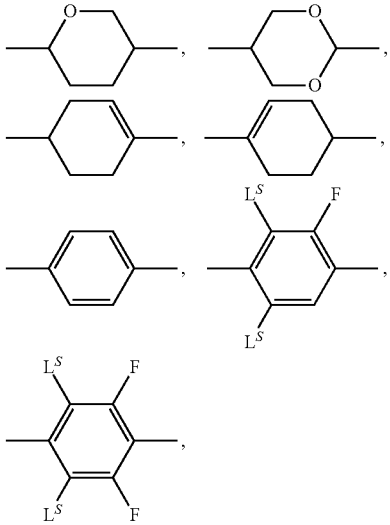

$R^{21}$ each, independently of one another, alkyl, alkoxy, oxaalkyl or alkoxyalkyl having up to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{21}$ —$CH_2CH_2$—, —$CF_2CF_2$—, —COO—, trans-CH=CH—, trans-CF=CF—, —$CH_2O$—, —$CF_2O$—, —C≡C— or a single bond, preferably —$CF_{2O}$—, $L^{21}$, $L^{22}$, $L^{23}$, $L^{24}$ each, independently of one another, H or F, $L^S$ H or $CH_3$, wherein preferably at least one of two groups $L^S$ attached to the same benzene ring is H, g 0, 1, 2 or 3.

In the compounds of formula F and its subformulae, the rings

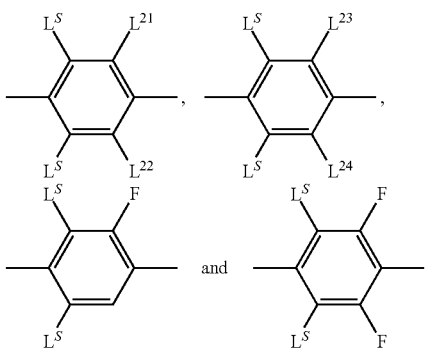

preferably denote

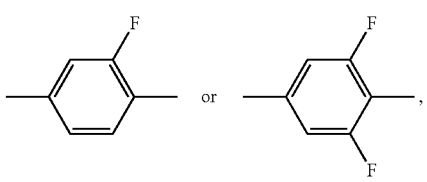

and furthermore

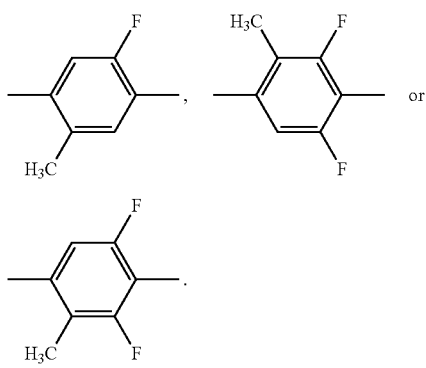

In a preferred embodiment at least one of the compounds of formula F or its subformulae contains at least one ring

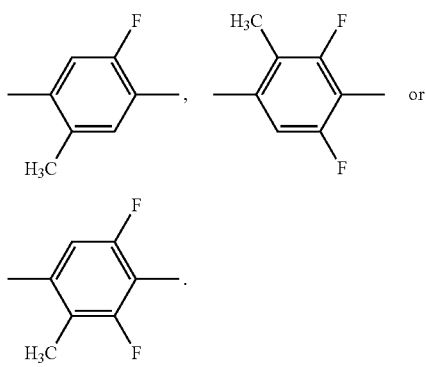

Particularly preferred compounds of formula F are selected from the group consisting of the following formulae:

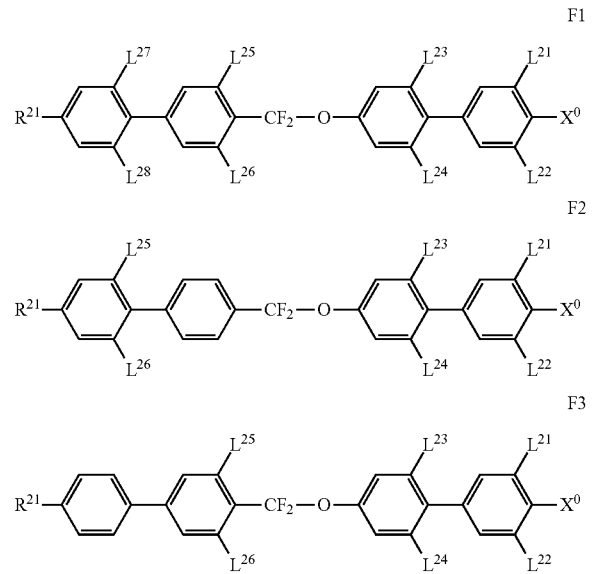

in which $R^{21}$, $X^0$, $L^{21}$, $L^{22}$, $L^{23}$ and $L^{24}$ each have the meaning given in formula F, $L^{25}$, $L^{26}$, $L^{27}$ and $L^{28}$ are each, independently of one another, H or F, and $X^0$ is preferably F.

Very particularly preferred compounds of formula F1-F3 are selected from the group consisting of the following subformulae:

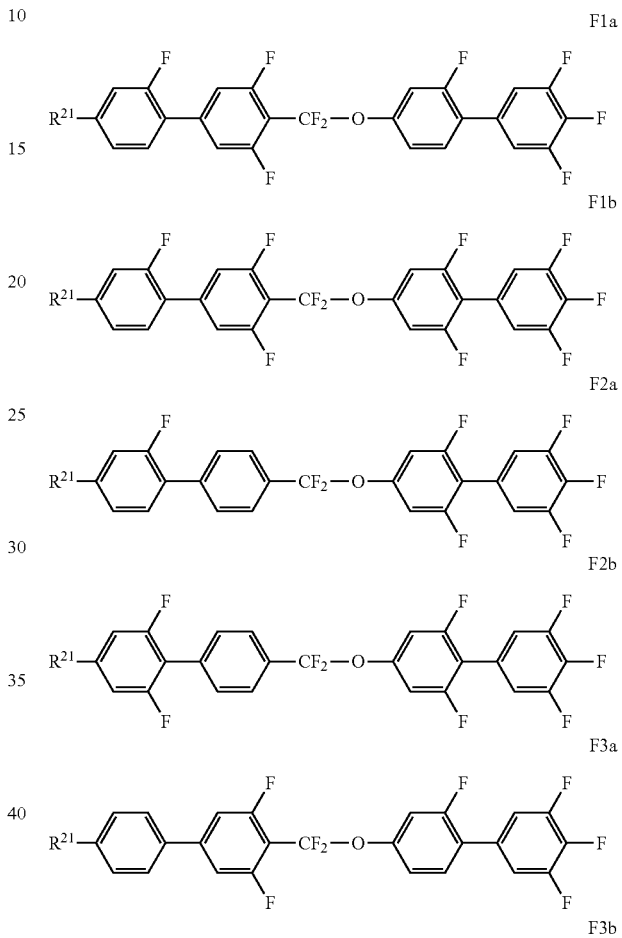

in which $R^{21}$ is as defined in formula F.

Further preferred are compounds of formula F1-F3 and F1a-F3b wherein at least one of the fluorine-substituted benzene rings is additionally substituted by a methyl group in para-position to a fluorine atom.

The proportion of the compounds of formula A and B in the LC host mixture is preferably from 2 to 60%, very preferably from 3 to 45%, most preferably from 4 to 35%.

The proportion of the compounds of formula C and D in the LC host mixture is preferably from 2 to 70%, very preferably from 5 to 65%, most preferably from 10 to 60%.

The proportion of the compounds of formula E in the LC host mixture is preferably from 5 to 50%, very preferably from 5 to 35%.

The proportion of the compounds of formula F in the LC host mixture is preferably from 2 to 30%, very preferably from 5 to 20%.

Further preferred embodiments of the present invention are listed below, including any combination thereof.
a) The component A or LC host mixture comprises one or more compounds of formula A and/or B with high positive dielectric anisotropy, preferably with $\Delta\varepsilon>15$.
b) The component A or LC host mixture comprises one or more compounds selected from the group consisting of formulae A1a2 (CCQU), A1b1 (ACQU), A1d1 (PUQU), A1f1 (GUQU), A2a1 (APUQU), A2h1 (CDUQU), A2l1 (DUUQU), A2l2 (DGUQU), A2k1 (PGUQU), B2d1 (CDU), B2g2 (PGU), B2i1 (CPGU), B2h3 (CCGU), B2k1 (PPGU), B2l1 (DPGU), F1a (GUQGU). The total proportion of these compounds in the LC host mixture is preferably from 4 to 40%, very preferably from 5 to 35%. The proportion of an individual one of these compounds in the LC host mixture is preferably from 0.5 to 10%.
c) The component A or LC host mixture comprises one or more compounds selected from the group consisting of formulae B2c1 (CCP-nOCF3), B2c4 (CCP-nF.F.F), B2f2 (BCH-nF.F) and B2f4 (BCH-nF.F.F). The total proportion of these compounds in the LC host mixture is preferably from 2 to 40%, very preferably from 5 to 35%. The proportion of an individual one of these compounds in the LC host mixture is preferably from 0.5 to 10%.
d) The component A or LC host mixture comprises one or more compounds selected from the group consisting of formulae C1 (CCH), C4 (PCH), C5 (CCP), C7 (BCH), C9 (CBC) and D2 (PGP), preferably C1a (CCH-nm), C4b (PCH-nOm), C5b (CCP-nOm), C7b (BCH-nOm), C9b (CBC-nmF), D2a (PGP-n-m) and D2b (PGP-n-mV). The total proportion of these compounds in the LC host mixture is preferably from 5 to 60%, very preferably from 8 to 50%. The proportion of an individual one of these compounds in the LC host mixture is preferably from 0.5 to 10%.
e) The LC host mixture comprises one or more compounds selected from the group consisting of formulae E1 (CC-alkenyl), E3 (PP-alkenyl) and E6 (CCP-alkenyl), preferably E1a (CC-n-Vm), E3a (PP-n-kVm) and E6a (CCP-Vn-m), very preferably E1a2 (CC-3-V), E1a5 (CC-3-V1), E3a1 (PP-3-V), E3a3 (PP-1-2V1) and E6a1 (CCP-V-1). The total proportion of these compounds in the LC host mixture is preferably from 5 to 75%, very preferably from 10 to 65%. The proportion of an individual one of these compounds in the LC host mixture is preferably from 0.5 to 10%.

Preferably the proportion of the LC component A) in the LC medium is from 95 to <100%, preferably from 95 to 97%, very preferably from 96 to 99%.

The LC component A), or LC host mixture, is preferably a nematic LC mixture.

The polymerizable mesogenic compounds of the polymerizable component B of the LC medium are preferably selected from formula I

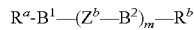
$R^a\text{-}B^1\text{---}(Z^b\text{---}B^2)_m\text{---}R^b$    I in which the individual radicals, on each occurrence identically or differently, and each, independently of one another, have the following meaning:
$R^a$ and $R^b$ P, P-Sp-, H, F, Cl, Br, I, —CN, —NO₂, —NCO, —NCS, —OCN, —SCN, SF₅ or straight-chain or branched alkyl having 1 to 25 C atoms, in which, in addition, one or more non-adjacent CH₂ groups may each be replaced, independently of one another, by —C(R⁰)=C(R⁰⁰)—, —C≡C—, —N(R⁰⁰)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-,
P a polymerizable group,
Sp a spacer group or a single bond,
$B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L,
$Z^b$ —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)$_{n1}$—, —CF₂CH₂—, —CH₂CF₂—, —(CF₂)$_{n1}$—, —CH=CH—, —CF=CF—, —C≡C—, —CH=CH—COO—, —OCO—CH=CH—, CR⁰R⁰⁰ or a single bond,
R⁰ and R⁰⁰ each, independently of one another, denote H or alkyl having 1 to 12 C atoms,
m denotes 0, 1, 2, 3 or 4,
n1 denotes 1, 2, 3 or 4,
L P, P-Sp-, OH, CH₂OH, F, Cl, Br, I, —CN, —NO₂, —NCO, —NCS, —OCN, —SCN, —C(=O)N(R$^x$)₂, —C(=O)Y¹, —C(=O)R$^x$, —N(R$^x$)₂, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxy-carbonyloxy having up to 25 C atoms, in which, in addition, one or more H atoms may each be replaced by F, Cl, P or P-Sp-,
P and Sp have the meanings indicated above,
Y¹ denotes halogen, and
R$^x$ denotes P, P-Sp-, H, halogen, straight-chain, branched or cyclic alkyl having up to 25 C atoms, in which, in addition, one or more non-adjacent CH₂ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may each be replaced by N, cyclohexane-1,4-diyl, in which, in addition, one or more non-adjacent CH₂ groups may each be replaced by O or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula I are those in which $B^1$ and $B^2$ each, independently of one another, denote 1,4-phenylene, 1,3-phenylene, naphthalene-1,4-diyl or naphthalene-2,6-diyl.
Very preferred compounds of formula I are selected from the following formulae:
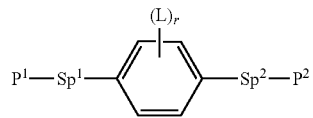
M1
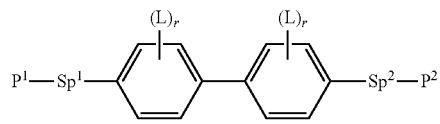
M2
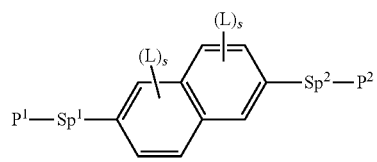
M3
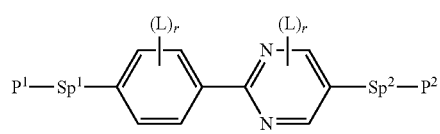
M4
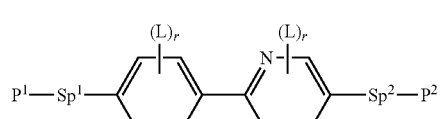
M5
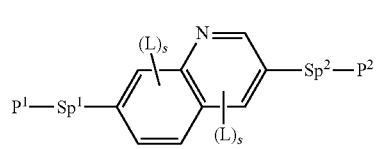
M6
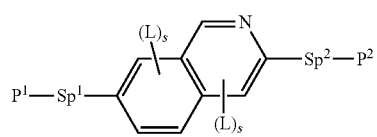
M7
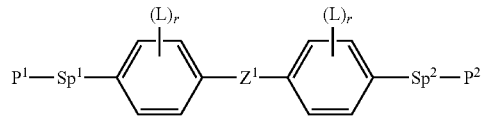
M8
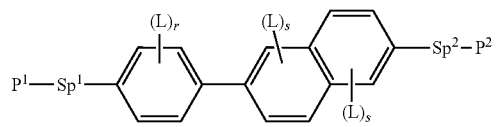
M9
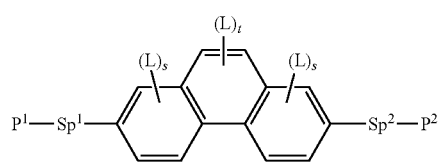
M10
-continued
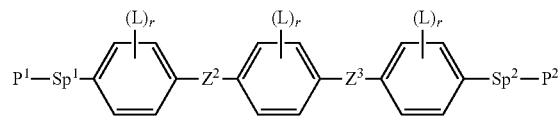
M11
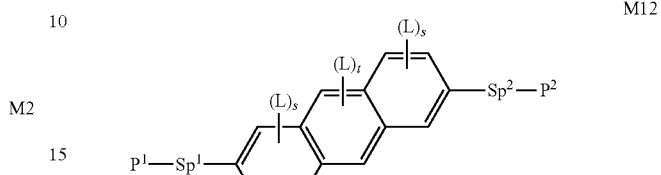
M12
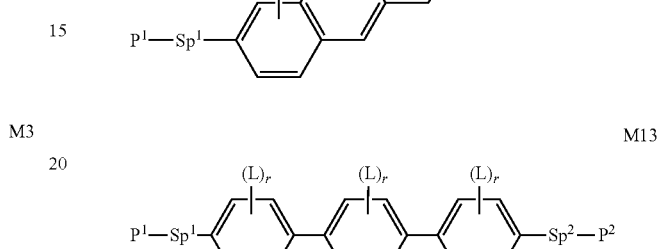
M13
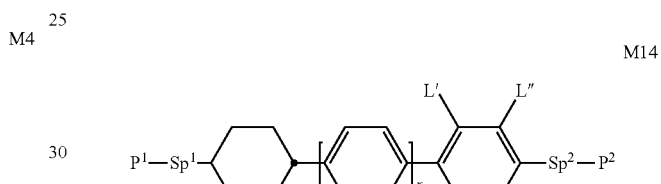
M14
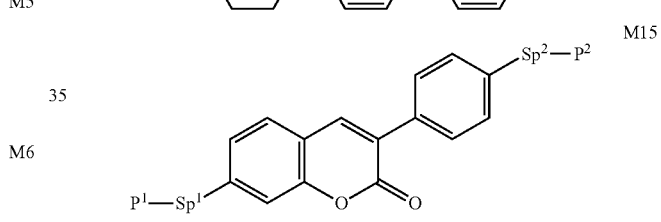
M15
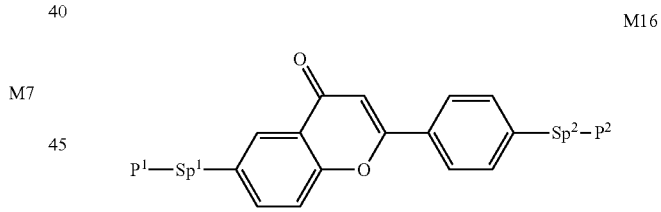
M16
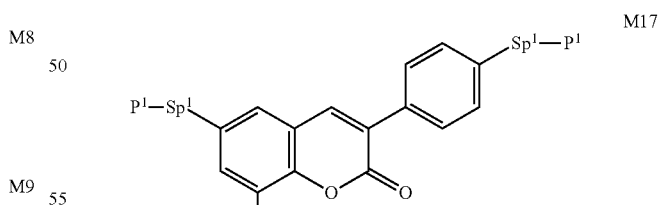
M17
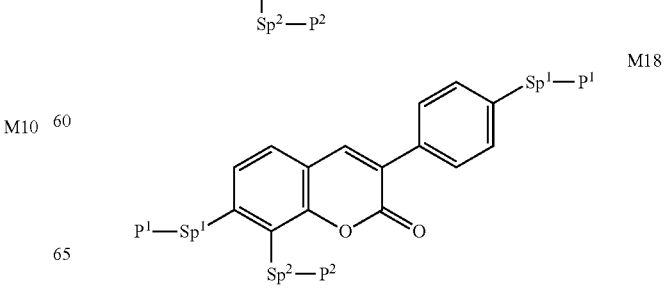
M18

-continued

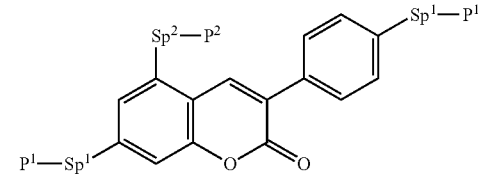
M19

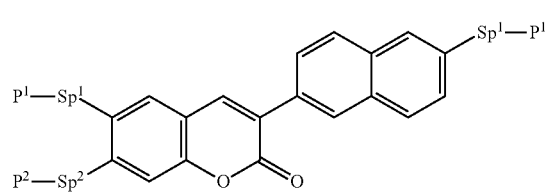
M20

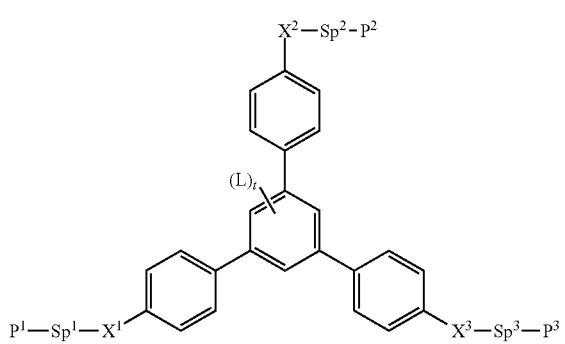
M21

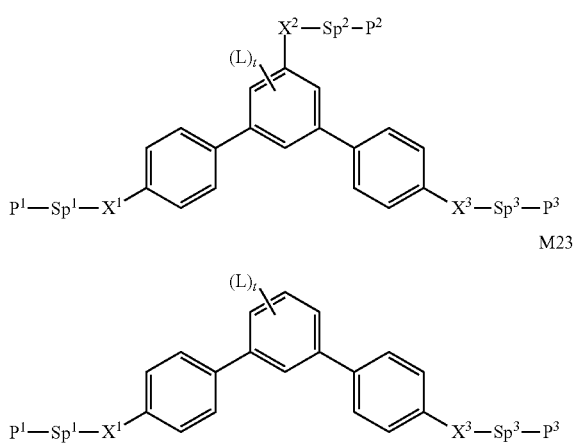
M22

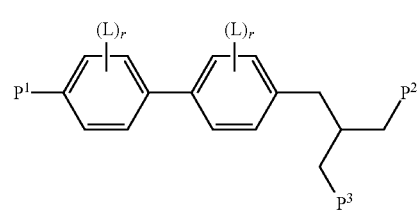
M23

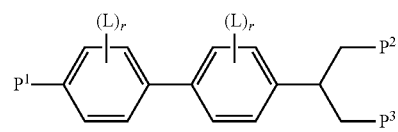
M24

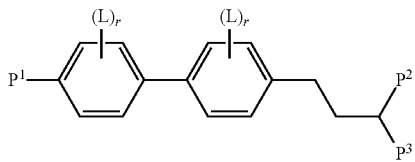
M26

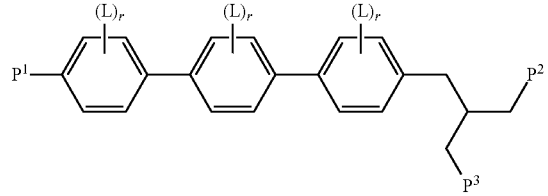
M27

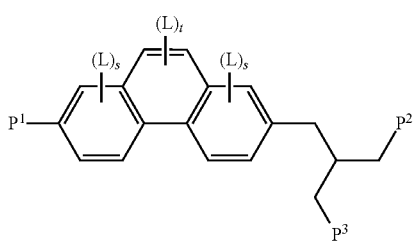
M28

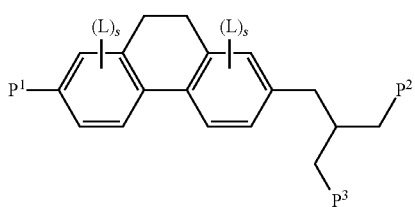
M29

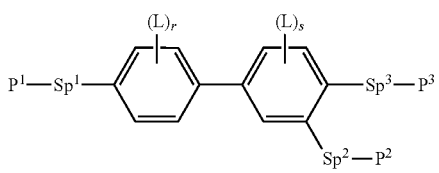
M30

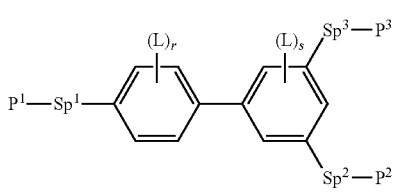
M31 in which the individual radicals, on each occurrence identically or differently, and each, independently of one another, have the following meaning:

$P^1$, $P^2$, $P^3$ a vinyloxy, acrylate, methacrylate, fluoroacrylate, chloroacrylate, oxetane or epoxy group, $Sp^1$, $Sp^2$, $Sp^3$ a single bond or a spacer group where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ H, F, Cl, CN or straight-chain or branched alkyl having 1 to 25 C atoms, in which, in addition, one or more non-adjacent $CH_2$ groups may each be replaced, independently of one another, by —(R°)═C(R°°)—, —C≡C—, —N(R°)—, —O—, —S—, —CO—, —CO—O—, —O—CO—, or —O—CO—O— in such a way that 0 and/or S atoms are not linked directly to one another, and in which, in addition, one or more H atoms may each be replaced by F, Cl, CN or P¹-Sp¹-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having up to 12 C atoms (where the alkenyl and alkynyl radicals have at least two C atoms and the branched radicals have at least three C atoms), R⁰, R⁰⁰ H or alkyl having 1 to 12 C atoms, Z¹ —O—, —CO—, —C(R$^Y$R$^Z$)— or —CF$_2$CF$_2$—, Z², Z³ —CO—O—, —O—CO—, —CH$_2$O—, —OCH$_2$—, —CF$_2$O—, —OCF$_2$— or —(CH$_2$)$_n$—, where n is 2, 3 or 4, R$^y$ and R$^z$ H, F, CH$_3$ or CF$_3$, X¹, X², X³ —CO—O—, —O—CO— or a single bond, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having up to 12 C atoms, L', L" H, F or Cl, r 0, 1, 2, 3 or 4, s 0, 1, 2 or 3, t 0, 1 or 2, and x 0 or 1.

Very preferred are compounds of formulae M2, M10 and M13, especially direactive compounds containing exactly two polymerizable groups P¹ and P².

Further preferred are compounds selected from formulae M15 to M31, in particular from formulae M17, M18, M19, M22, M23, M24, M25, M26, M30 and M31, especially trireactive compounds containing exactly three polymerizable groups P¹, P² and/or P³.

In the compounds of formulae M1 to M31 the group

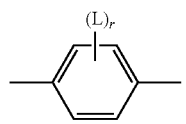

is preferably

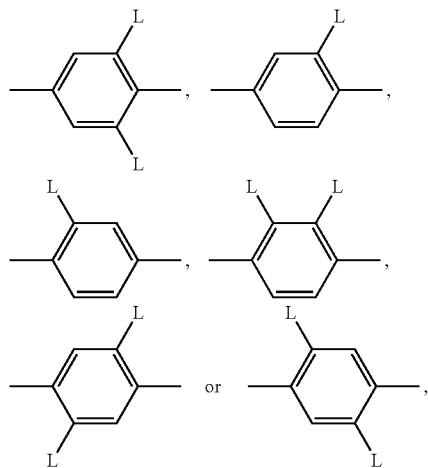

wherein L on each occurrence, identically or differently, has one of the meanings given above or below, and is preferably F, Cl, CN, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, or OCF$_3$, more preferably F, Cl, CH$_3$, OCH$_3$, COCH$_3$ or OCF$_3$, especially F or CH$_3$.

Preferred compounds of formulae M1 to M30 are those wherein P¹, P² and P³ denote an acrylate, methacrylate, oxetane or epoxy group, very preferably an acrylate or methacrylate group.

Further preferred compounds of formulae M1 to M31 are those wherein Sp¹, Sp² and Sp³ are a single bond.

Further preferred compounds of formulae M1 to M31 are those wherein one of Sp¹, Sp² and Sp³ is a single bond and another one of Sp¹, Sp² and Sp³ is different from a single bond.

Further preferred compounds of formulae M1 to M31 are those wherein those groups Sp¹, Sp² and Sp³ that are different from a single bond denote —(CH$_2$)$_{s1}$—X"—, wherein s1 is an integer from 1 to 6, preferably 2, 3, 4 or 5, and X" is the linkage to the benzene ring and is —O—, —O—CO—, —CO—O, —O—CO—O— or a single bond.

Further preferred compounds of formula I are those selected from formulae RM-1 to RM-143 in Table D below, especially those selected from the group consisting of formula RM-1, RM-4, RM-8, RM-17, RM-19, RM-35, RM-37, RM-39, RM-40, RM-41, RM-48, RM-51, RM-52, RM-54, RM-57, RM-64, RM-74, RM-76, RM-88, RM-91, RM-102, RM-103, RM-109, RM-117, RM-120, RM-121 and RM-122.

Particular preference is given to LC media comprising one, two or three polymerizable compounds of formula I.

Further preferred are polymerizable compounds, preferably selected from formula I, very preferably from formulae M1 to M31, most preferably from the group consisting of the above-mentioned formulae from Table D, which have an absorption maximum in the wavelength range from 320 to 360 nm.

Preference is further given to LC media in which the polymerizable component B) consists exclusively of polymerizable compounds of formula I.

In another preferred embodiment component B) comprises, in addition or alternatively to the polymerizable compounds of formula I according to the preferred subformulae and subgroups as described above, one or more polymerizable mesogenic compounds which contain one or more polymerizable groups and one or more polar anchor groups selected for example from hydroxy, carboxy, amino or thiol groups. These compounds can serve as self-aligning (SA) additives and are useful for SA mode displays according to the present invention. Suitable and preferred polymerizable mesogenic SA additives of this type are selected from compounds of formulae I or M1 to M31 wherein at least one group B¹, B², R$^a$, R$^b$, R$^x$, L, Sp, Sp¹, Sp², Sp³ or R$^{aa}$ is substituted by a hydroxy, carboxy, amino or thiol group, preferably a hydroxy group. Further preferred polymerizable mesogenic SA additives of this type are selected from formula SA-1 to SA-34 in Table E.

Preferably the proportion of the polymerizable compounds of component B) in the LC medium is from 1 to <3%, for example 2.0 to 2.8%, more preferably from 2 to <3%, very preferably from 2 to 2.5%, most preferably from 2 to 2.2%.

In addition to the component A and B, the LC medium preferably contains a component C comprising one or more optically active compounds, preferably selected from chiral dopants.

The helical twisting power and amount of the dopant in the LC medium are preferably selected such that the ratio d/p in the display according to the present invention is ≥0.5, very preferably from 0.5 to 1.2, more preferably from 0.55 to 1.0, most preferably from 0.6 to 0.8.

The proportion of the chiral dopants in the LC medium is preferably from 0.01 to 6%, very preferably from 0.05 to 3%, more preferably from 0.1 to 0.5%.

Suitable and preferred chiral dopants are mentioned below in Table B. Preferred chiral dopants are for example selected from R- or S-1011, R- or S-2011, R- or S-3011, R- or S-4011, or R- or S-5011.

Preferably the twist angle of the helical twist induced in the LC medium by the chiral dopants (before applying a voltage) is from 210° to 330°, more preferably from 240 to 300°, most preferably 270°.

Preferably the pitch of the helical twist induced in the LC medium by the chiral dopants is from 2 to 10 µm, very preferably from 3 to 6 µm.

Preferably the ratio d/p in a display according to the present invention is ≥0.5, very preferably from 0.5 to 1.2, more preferably from 0.55 to 1.0, most preferably from 0.6 to 0.8.

Preferably the LC medium contains one or more polymerization initiators.

Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG).

If a polymerization initiator is added to the LC medium, its proportion is preferably from 0.001 to 1% by weight, particularly preferably from 0.001 to 0.5% by weight.

In another preferred embodiment the LC medium contains one or more stabilizers. The use of stabilizers can prevent undesired spontaneous polymerization of the RMs, for example during storage or transport.

Suitable types and amounts of stabilizers are known to the person skilled in the art and are described in the literature.

The LC media according to the present invention may, for example, also comprise one or more UV stabilizers, for example from the Tinuvin© series from Ciba Chemicals, such as Tinuvin© 770, or from the Irganox® series, such as Irganox®1076 (all from BASF). Further suitable and preferred stabilizers are those selected from Table C below.

In another preferred embodiment of the present invention the LC media contain one or more further stabilizers, preferably selected from the group consisting of the following formulae

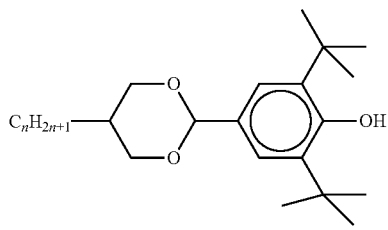

S2

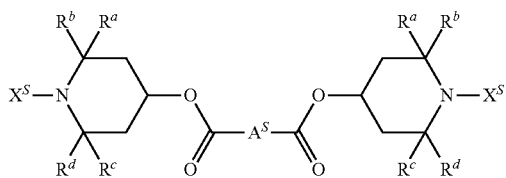

S3 wherein the individual radicals, independently of each other and on each occurrence identically or differently, have the following meanings $R^{a\text{-}d}$ straight-chain or branched alkyl with 1 to 10, preferably 1 to 6, very preferably 1 to 4 C atoms, most preferably methyl, $X^S$ H, $CH_3$, OH or O., $A^S$ straight-chain, branched or cyclic alkylene with 1 to 20 C atoms which is optionally substituted, n an integer from 1 to 6, preferably 3.

Preferred stabilizers of formula S3 are selected from formula S3A

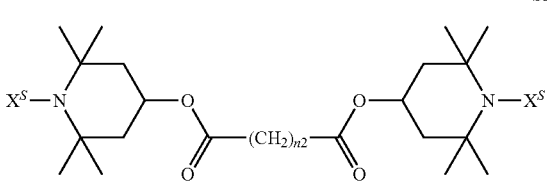

S3A wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilizers are selected from the group consisting of the following formulae

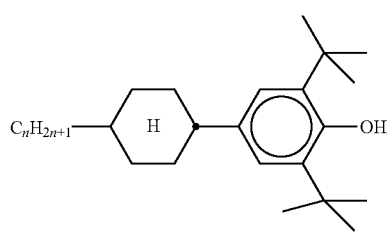

S1

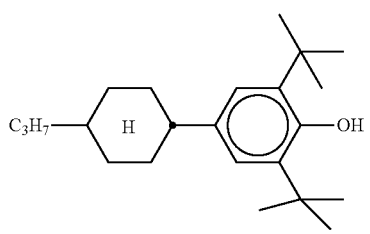

S1-1

S2-1
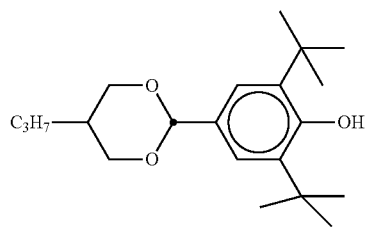
S3-1
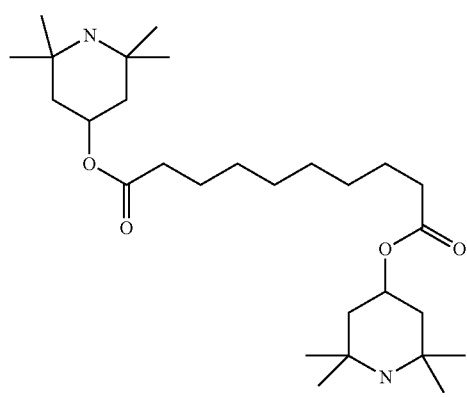
S3-2
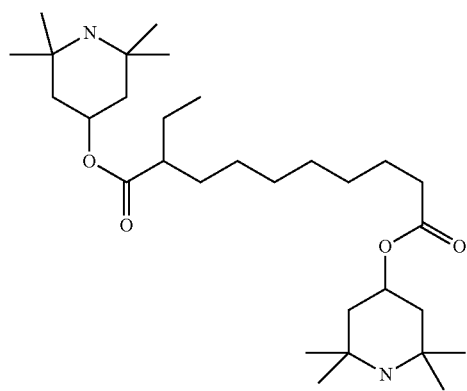
S3-3
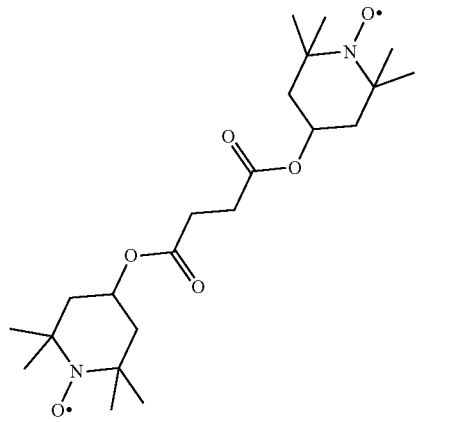
S3-4
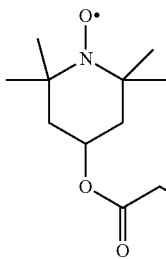
S3-5
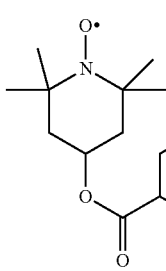
S3-6
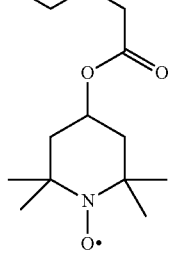

-continued

S3-7

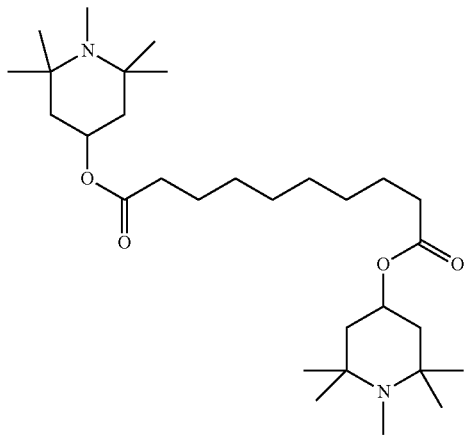

In a preferred embodiment the LC medium comprises one or more stabilizers selected from the group consisting of formulae S1-1, S2-1, S3-1, S3-1 and S3-3.

In a preferred embodiment the LC medium comprises one or more stabilizers selected from Table C.

Preferably the proportion of stabilizers, like those of formula S1-S3, in the LC medium is from 10 to 500 ppm, very preferably from 20 to 100 ppm.

In another preferred embodiment the LC medium according to the present invention contains a self-aligning (SA) additive, preferably in a concentration of 0.1 to 2.5%.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the RMs in the PSA process.

Suitable SA additives are disclosed for example in US 2013/0182202 A1, US 2014/0838581 A1, US 2015/0166890 A1 and US 2015/0252265 A1.

In another preferred embodiment an LC medium or a polymer stabilized display according to the present invention contains one or more self-aligning additives selected from Table E below.

In a preferred embodiment the display according to the present invention does not contain an alignment layer.

The LC medium according to the invention may also comprise further additives for example selected from the list including but not limited to antioxidants, free-radical scavengers, defoaming agents, wetting agents, lubricating agents, dispersing agents, hydrophobing agents, adhesive agents, flow improvers, deaerators, diluents, reactive diluents, auxiliaries, colorants, dyes, pigments and nanoparticles.

Furthermore, it is possible to add to the LC media, for example, 0 to 15% by weight of pleochroic dyes, conductive salts, preferably ethyldimethyldodecyl-ammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

In a preferred embodiment the LC medium comprises, preferably consists of,
A) a liquid crystal component A comprising one or more compounds selected from formula A and B or their subformulae as defined above, one or more compounds selected from formula C and D or their subformulae as defined above, and optionally one or more compounds of formula E or their subformulae as defined above,
B) a polymerizable component B comprising one or more polymerizable mesogenic compounds of formula I as defined above, preferably selected from formulae M1-M31, very preferably selected from Table D,
C) one or more chiral additives, preferably selected from chiral dopants, very preferably selected from Table B,
D) optionally one or more further additives, preferably selected from polymerization initiators, stabilizers, which are very preferably selected from Table C, and self-aligning additives, which are very preferably selected from Table E,
wherein the concentration of the polymerizable mesogenic compounds in the LC medium is from 0.05 to <3%, and
wherein the concentration of the chiral additives is selected such that twist angle they induce in the LC medium is >210°, preferably from 210 to 330°, more preferably from 240 to 300°, very preferably 270°.

In another preferred embodiment the LC medium comprises, preferably consists of
A) a liquid crystal component A comprising one or more compounds selected from formula A and B or their subformulae as defined above, one or more compounds selected from formula C and D or their subformulae as defined above, and optionally one or more compounds of formula E or their subformulae as defined above,
B) a polymerizable component B comprising one or more polymerizable mesogenic compounds of formula I as defined above, preferably selected from formulae M1-M31, very preferably selected from Table D,
C) one or more chiral additives, preferably selected from chiral dopants, very preferably selected from Table B,
D) optionally one or more further additives, preferably selected from polymerization initiators, stabilizers, which are very preferably selected from Table C, and self-aligning additives, which are very preferably selected from Table E,
wherein the concentration of the polymerizable mesogenic compounds in the LC medium is from 0.05 to <3%, and
wherein the concentration of the chiral additives is selected such that the helical pitch they induce in the LC medium is from 2 to 10 µm, very preferably from 3 to 6 µm.

In another preferred embodiment the polymerizable mesogenic compounds in the LC medium are unpolymerized.

In another preferred embodiment the polymerizable mesogenic compounds in the LC medium are polymerized.

In another preferred embodiment the LC medium comprises one or more compounds selected from the following groups or any combination thereof:

In another preferred embodiment the LC medium comprises one or more compounds selected from the following groups or any combination thereof:
1) One or more compounds selected from the group consisting of formula A2a1, A2k1, B2k1. These compounds can increase the dielectric anisotropy, the optical anisotropy and the operating temperature.

2) One or more compounds selected from the group consisting of formula A1d1. These compounds can increase the dielectric anisotropy and the optical anisotropy but decrease the operating temperature.

3) One or more compounds selected from the group consisting of formula A1a2. These compounds can increase the dielectric anisotropy but decrease the operating temperature.

4) One or more compounds selected from the group consisting of formula C1a, C1b, E1a. These compounds can decrease the viscosity and adjust the optical anisotropy but decrease the operating temperature.

5) Optionally one or more compounds selected from the group consisting of formula C4b. These compounds can decrease the viscosity but decrease the operating temperature.

6) One or more compounds selected from the group consisting of formula C7a, D2, E6. These compounds can decrease the dielectric anisotropy and the operating temperature.

7) One or more chiral dopants, preferably selected from Table B, very preferably from formulae R/S-1011, R/S-2011, R/S-3011, R/S-4011 and R/S-5011. These compounds induce a helically twisted structure and a twist angle in the layer with the LC molecules.

8) One or more reactive mesogens, preferably selected of formula I, very preferably from formulae M1 to M31, more preferably from formulae RM-1 to RM-143 of Table D, most preferably from the group consisting of formulae RM-1, RM-4, RM-8, RM-17, RM-19, RM-35, RM-37, RM-39, RM-40, RM-41, RM-48, RM-51, RM-52, RM-54, RM-57, RM-64, RM-74, RM-76, RM-88, RM-91, RM-102, RM-103, RM-109, RM-117, RM-120, RM-121 and RM-122. These compounds provide polymer stabilization that reduces the twist angle.

9) One or more stabilizers, preferably selected from Table C, very preferably from the following formulae

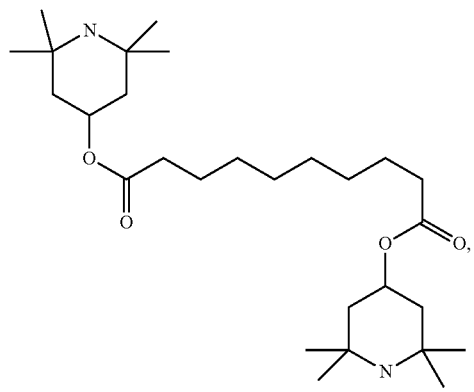

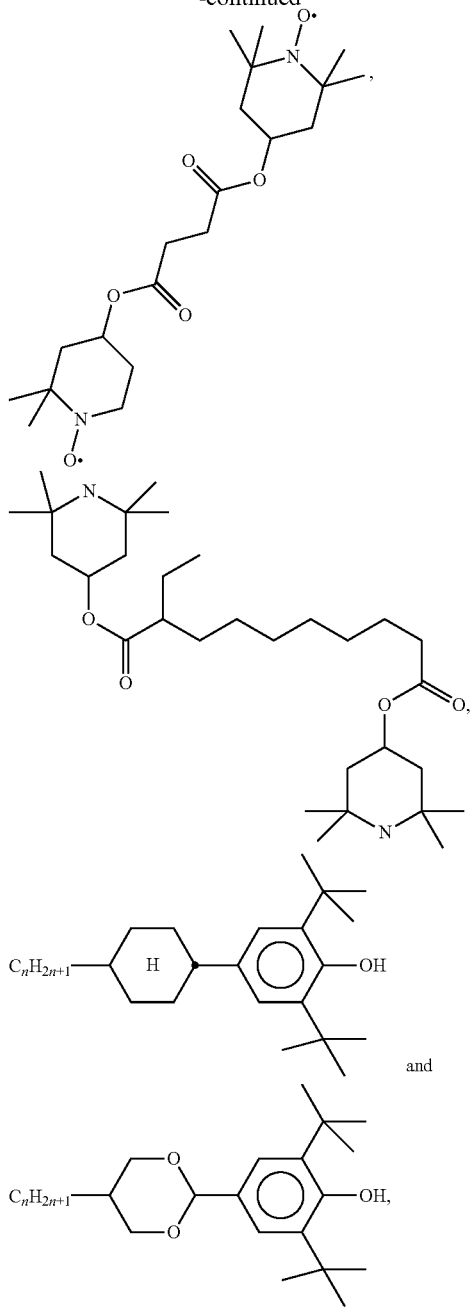

wherein n is 1, 2, 3, 4, 5, 6 or 7, preferably 3,

10) One or more photoinitiators. These compounds initiate polymerization of the polymerizable compounds of component B and group 8 above.

11) One or more self-aligning additives. These compounds enable omission of the alignment layer.

12) One or more additives selected from antioxidants, UV absorbers, coloring materials, antifoaming agents.

The individual components of the preferred embodiments of the LC media according to the invention are either known or methods for the preparation thereof can readily be derived from the prior art by the person skilled in the relevant art, since they are based on standard methods described in the literature.

It goes without saying to the person skilled in the art that the LC media according to the invention may also comprise compounds in which, for example, H, N, O, C, F have been replaced by the corresponding isotopes like deuterium etc.

The LC media which can be used in accordance with the invention are prepared in a manner conventional per se, for example by mixing one or more LC compounds selected from formulae A to F or one or more compounds of the above-mentioned preferred embodiments with each other and/or with further LC compounds and/or additives, like polymerizable compounds or RMs. In general, the desired amount of the components used in the smaller amount is dissolved in the components making up the principal constituent, advantageously at elevated temperature. It is also possible to mix solutions of the components in an organic solvent, for example in ace-tone, chloroform or methanol, and to remove the solvent again, for example by distillation, after thorough mixing.

It goes without saying that, through a suitable choice of the components of the LC mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having higher $\Delta\varepsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favorable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The LC media and LC host mixtures of the present invention preferably have a nematic phase range ≥80 K, very preferably ≥100 K, and preferably a rotational viscosity ≤250 mPa·s, very preferably ≤200 mPa·s, at 20° C.

The birefringence $\Delta n$ of LC media and LC host mixtures according to the invention is preferably from 0.07 to 0.15, particularly preferably from 0.08 to 0.15 at 20° C.

The LC medium and LC host mixture have a positive dielectric anisotropy $\Delta\varepsilon$. Preferably the LC medium and the LC host mixture have a positive dielectric anisotropy $\Delta\varepsilon$ from +2 to +30, more preferably from +3 to +20, very preferably from +4 to +15, most preferably from +4 to +8, at 20° C. and 1 kHz.

The structure of the PS-UF TN-LC displays according to the present invention corresponds to the usual geometry for TN displays as described in the prior art cited at the outset.

The construction of the PS-UF TN-LC display according to the invention from polarizers, electrode base plates and surface-treated electrodes corresponds to the usual design for displays of this type. The term usual design is broadly drawn here and also encompasses all derivatives and modifications of the LC display, in particular including matrix display elements based on poly-Si TFTs or MIM.

A preferred PS-UF TN-LC display of the present invention comprises:
  a first substrate including a pixel electrode defining pixel areas, the pixel electrode being connected to a switching element disposed in each pixel area, and optionally a first alignment layer disposed on the pixel electrode,
  a second substrate including a common electrode layer, which may be disposed on the entire portion of the second substrate facing the first substrate, and optionally a second alignment layer,
  a layer of a nematic LC medium having positive dielectric anisotropy, which is dispensed between the first and second substrates and comprises a liquid crystal component A comprising, preferably consisting of, one or more mesogenic or liquid-crystalline molecules, and further comprises a component C comprising one or more chiral additives, and optionally comprises a component D comprising one or more further additives,
  a polymer layer deposited on each of said first and second electrode or, if present, on each of said first and second alignment layer, wherein the polymer layers are formed from one or more polymerizable mesogenic compounds which are present in the LC medium at a concentration from 0.1 to <3%, and which are polymerized in situ after the LC medium has been dispensed between the two substrates,
  optionally a first polarizer on the side of the first substrate facing away from the LC layer, and a second polarizer on the side of the second substrate facing away from the LC layer, said polarizers preferably being oriented such that their transmission planes for plane-polarized light are at right angles (crossed nicols).

The invention also relates to a method of manufacturing a liquid crystal display (LCD) of the polymer-stabilized twisted-nematic (PS-TN) mode comprising the steps of
a) providing a first substrate and a second substrate, the first substrate being equipped with a first electrode layer and optionally with a first alignment layer, the second substrate being equipped with a second electrode layer and optionally with a second alignment layer, wherein the first and/or the second substrate are preferably equipped with fixing means, preferably a sealant material and/or spacers, fixing the first and second substrate at a constant distance relative to each other and with their planes parallel to each other,
b) dispensing a layer of a nematic LC medium having positive dielectric anisotropy between the first and the second substrate, such that the LC medium is in contact with the first and second alignment layer if these layers are present,
  wherein the LC medium comprises, preferably consists of,
  A) a liquid crystal component (hereinafter also referred to as "LC host mixture") comprising, preferably consisting of, mesogenic or liquid-crystalline molecules,
  B) a polymerizable component B comprising, preferably consisting of, one or more polymerizable mesogenic compounds (hereinafter also referred to as "reactive mesogens"),
  C) one or more chiral additives, preferably selected from chiral dopants,
  D) optionally one or more further additives, preferably selected from polymerization initiators, stabilizers and self-aligning additives,
  wherein the ratio of the polymerizable mesogenic compounds in the LC medium is <3%, preferably from 0.05 to <3%, and
  wherein the longitudinal axes of the LC molecules are oriented parallel or tilted relative to the planes of the substrates, and the chiral additive induces in the LC molecules of the LC medium a helical twist along an axis perpendicular to the substrates with a given pitch p, and, wherein layer of the LC medium has a thickness d, and the ratio d/p is ≥0.5, preferably >0.5, very preferably from 0.6 to 0.8, and wherein the twist angle of the helical twist of the LC molecules induced by the chiral additive is >210°, preferably in the range from 210 to 330°, more preferably from 240 to 300°, very preferably 270°, c) applying a voltage to the first and second electrodes such that the twist angle of the helical twist of the LC molecules is reduced to <150°, preferably to a range from 60 to 120°, preferably from 80 to 100°, very preferably to 90°, d) after applying the voltage or while applying the voltage, polymerizing the polymerizable mesogenic compounds of the polymerizable component B of the LC medium between the first and second substrate, preferably by exposure to UV radiation, thereby stabilizing the twisted nematic configuration of the LC medium with the reduced twist angle of step c), and e) optionally subjecting the LC medium to a second polymerization step, preferably by exposure to UV radiation, without applying a voltage to the first and second electrodes, thereby polymerizing any polymerizable compounds which have not reacted in step d), f) optionally providing a first polarizer on the side of the first substrate facing away from the LC layer, and a second polarizer on the side of the second substrate facing away from the LC layer, wherein said polarizers are preferably oriented such that their transmission planes for plane-polarized light are at right angles (crossed nicols).

The substrates used in the display according to the present invention and in step a) of its manufacturing process are preferably glass substrates. For flexible LC displays preferably plastic substrates are used. These plastic substrates preferably have a low birefringence. Examples of suitable and preferred plastic substrates are polycarbonate (PC), polyethersulfone (PES), polycyclic olefin (PCO), polyarylate (PAR), polyetheretherketone (PEEK), or colorless polyimide (CPI) substrates.

At least one substrate should be transmissive for the photoradiation used for polymerizing the polymerizable compounds used in the process according to the present invention.

In case the substrates are equipped with alignment layers that are prepared by photopolymerization and/or photoalignment, at least one substrate should be transmissive for the photoradiation used for photopolymerization or photoalignment of the alignment layer material or its precursor.

The electrode layers can be designed by the skilled person depending on the individual display type. In the LC display according to the present invention the first and second substrate are each equipped with an electrode layer.

Further preferably, one of the first and second electrode layers is a pixel electrode defining pixel areas, the pixel electrode being connected to a switching element disposed in each pixel area and optionally including a micro-slit pattern, and the other of the first and second electrode layers is a common electrode layer, which may be disposed on the entire portion of the substrate facing the other substrate.

The first and/or second substrate may carry further layers or components including but not limited to a color filter, TFT arrays, a black matrix, a polyimide coating, or other components typically found on a display substrate.

Preferably at least one of the first and second substrates, more preferably each substrate, is equipped with an alignment layer which is usually applied on the electrodes such that it contacts the LC medium.

The first and/or second alignment layer controls the alignment direction of the LC molecules of the LC layer. In the display according to the present invention the alignment layers are selected such that they impart to the LC molecules an orientation direction parallel or slightly tilted relative to the substrate.

A suitable and preferred alignment layer comprises or consist of, for example, a polyimide, which may also be rubbed or prepared by a photoalignment method. Solution processable alignment layer materials are preferred. These are preferably processed from solution in a solvent, preferably an organic solvent, like for example N-methylpyrrolidone, 2-butoxyethanol or γ-butyrolactone.

In a preferred embodiment the alignment layer is formed by depositing a solution of an alignment layer material like for example polyimide, or a precursor thereof like for example a polyimide precursor, on the substrate, and optionally curing the alignment layer material or its precursor by exposure to heat and/or actinic radiation, for example UV radiation.

The alignment layer material, or precursor thereof, can be deposited on the substrate for example by coating or printing methods.

In case a solvent is used for deposition of the alignment layer material, it is preferably dried off or evaporated off after deposition. Solvent evaporation can be supported for example by applying heat and/or reduced pressure.

Preferred methods for curing the alignment layer are thermal curing and photocuring, very preferably photocuring. Photocuring is for example carried out by exposure to UV radiation. Suitable curing conditions can be selected by the skilled person depending on the precursor material used, based on his common knowledge and as described in the literature. In case of commercially available materials suitable processing and/or curing conditions are often provided together with the sales or sampling of the material.

In the display according to the present invention the alignment layers are preferably selected such that they impart to the LC molecules planar (or parallel) alignment, i.e. wherein the longitudinal axis of the LC molecules is parallel to the surface of the nearest substrate, and wherein the longitudinal axis of the LC molecules may also be slightly tilted relative to the surface of the substrate.

Preferably the tilt angle of the longitudinal axis of the LC molecules located in proximity to the surface of a substrate relative to said substrate is from >0° to 20°, preferably from 0.1° to 20°, very preferably from 0.2° to 3.5°.

In order to impart a preferred two-dimensional alignment direction of the LC molecules within the plane of the substrate, the alignment layers for example comprise an alignment layer material, for example a polyimide, which is unidirectionally rubbed or is prepared by a photoalignment method.

Preferably the alignment direction, or the average orientation direction of the longitudinal axes of the LC molecules (also referred to as "director") in vicinity to the first and second substrates, are at right angles, i.e. at an angle of 90° relative to each other. Further preferably the alignment direction or LC director in vicinity to the first and second substrates is at an angle of 45° relative to the edges of the substrates.

This can be achieved for example by using a first and second alignment layer, for example comprising polyimide, which are both unidirectionally rubbed and which are arranged such that their rubbing directions are at right angles, and wherein the rubbing direction of the alignment layer corresponds to the alignment direction of the LC molecules. Alternatively, this can be achieved by preparing the alignment layers by photoalignment using linearly polarized light, wherein the polarization direction of the polarized light corresponds to the alignment direction of the LC molecules.

The display according to the present invention preferably comprises a first and second alignment layer, preferably comprising polyimide, which are both unidirectionally rubbed and wherein the rubbing directions are at right angles to each other.

The display according to the present invention may comprise further elements, like a color filter, a black matrix, a passivation layer, optical retardation layers, transistor elements for addressing the individual pixels, etc., all of which are well known to the person skilled in the art and can be employed without inventive skill.

In step b) a layer of a nematic LC medium having positive dielectric anisotropy, and containing components A, B, C and optionally D, and optionally E, and optionally F, as described above and below, is dispensed between the first and the second substrate, such that the LC medium is in contact with the first and second alignment layer in case such an alignment layer is present.

The LC medium can be dispensed or filled onto the substrates or into the display, respectively, by methods that are conventionally used by display manufacturers.

Preferably the LC medium is deposited onto the substrate by using one of the following deposition methods: one drop filling (ODF), ink jet printing, spin coating, slit coating, flexo printing, or a comparable method.

A preferred method is ink jet printing.

Another preferred method is ODF method, preferably comprising the following steps b1) dispensing a droplet or an array of droplets of the LC medium on the first substrate, and
b2) providing the second substrate on top of the first substrate with the dispensed droplets of the LC medium, preferably under vacuum conditions, causing the droplets of the LC medium to spread and form a continuous layer between the two substrates.

The applied LC medium forms a thin, uniform film with the thickness of the targeted final cell gap of the display.

Preferably the display according to the present invention comprises a fixing means, fixing the first and second substrate at a constant distance relative to each other and with their planes parallel to each other. Preferably the fixing means comprises a sealant material and a spacer material, in order to maintain a constant cell gap and LC layer thickness.

Preferably the first and second substrate are fixed or glued together by the fixing means, for example a sealant material, that is provided on the substrates, preferably in the region close to the edges of the substrates.

Preferably the sealant material is deposited onto the first substrate, or between the first and the second substrate, before the LC medium is dispensed between the first and the second substrate.

The sealant material is provided on the first substrate, or between the first and the second substrate, preferably in the region between the LC medium and the edges of the respective substrate. The sealant material is for example a crosslinked polymer which is formed from a curable polymer precursor. The sealant material is then cured, preferably after the first and second substrates are assembled to form an LC cell, but before photopolymerization of the polymerizable compounds contained in the LC medium. Preferably said sealant material is cured by exposure to heat and/or photoradiation.

The spacer material for example consists of transparent glass or plastic beads. In a preferred embodiment the spacer is dispensed between the substrates together with the LC medium.

In another preferred embodiment, in order to maintain a constant cell gap and LC layer thickness, the display contains a spacer material, for example a photospacer, outside the LC layer, for example above the black matrix, and the LC layer does not contain a spacer material.

Suitable sealants and spacers are known to the skilled person and are commercially available.

In step c) a voltage is applied to the first and second electrodes such that the twist angle of the helical twist of the LC molecules in the LC layer is reduced from the range of 210 to 330°, preferably from 240 to 300°, very preferably 270°, as given by the LC layer thickness and the natural helical twist induced by the chiral dopant, to a range from 60 to 120°, preferably from 80 to 100°, very preferably to 90°.

Suitable ways, conditions, parameters and driving schemes for applying a voltage to achieve the desired twist angle, which is then polymer stabilized, are well known to the person skilled in the art or described in the literature, for example in K. Takatoh et al., *Liq. Cryst.* 2012, 39(6), 715-720, and can be employed without inventive skill.

The selection of suitable voltages and driving schemes for applying a voltage also depends on the physical properties of the LC medium and the collocation between the LC medium and the alignment layer.

In a preferred embodiment the applied voltage and driving scheme are selected such that the TN orientation with reduced twist angle as described above is stable for a given period of time, for example several (>1) seconds, several (>1) minutes or several (>1) hours. This allows to carry out polymerization step d) after step c), i.e. without any overlap in time.

In step d) the polymerizable compounds of the polymerizable component B contained in the LC medium are then polymerized, or crosslinked (if a compound contains two or more polymerizable groups) by in-situ polymerization in the LC medium between the substrates of the LC display, optionally while a voltage is applied to the electrodes for at least a part of the time of the polymerization process. In optional step e) the polymerizable compounds which have not completely reacted in step d) are polymerized or crosslinked by in-situ polymerization without applying a voltage.

In step d) and e) the polymerizable compounds of the polymerizable component B are preferably polymerized by photopolymerization, very preferably by UV photopolymerization.

Upon polymerization the polymerizable compounds form a polymer or crosslinked polymer, which stabilizes the reduced twist angle of the LC molecules in the LC medium. Without wishing to be bound to a specific theory, it is believed that a significant part of the polymer which is obtained from the polymerizable compounds will phase-separate or precipitate from the LC medium and form a polymer layer on the substrates or electrodes, or the alignment layer provided thereon. Microscopic measurement data (like SEM and AFM) have confirmed that the polymer mainly accumulates at the LC layer/substrate interface.

Suitable and preferred polymerization methods are, for example, thermal or photopolymerization, preferably photopolymerization, in particular UV induced photopolymerization, which can be achieved by exposure of the polymerizable compounds to UV radiation.

The polymerization can be carried out in one step (step d) or in two or more steps (steps d and e or repetitions thereof) as described above and below. Step d) is hereinafter also referred to as "UV1" step and step e) is hereinafter also referred to as "UV2" step.

In a preferred embodiment of the present invention the process for preparing the display comprises one or more of the following features:
the polymerizable LC medium is exposed to UV light in a two-step process, including a first UV exposure step (step d or UV1) while or after, preferably after, applying a voltage to the electrodes, and further including a second UV exposure step (step e or UV2) to finish polymerization without applying a voltage to the electrodes,
the polymerizable LC medium is exposed, preferably in the UV2 step, and optionally also in the UV1 step, to UV light generated by a UV lamp in the wavelength range from 300-380 nm, preferably with an intensity of from 0.5 mW/cm$^2$ to 30 mW/cm$^2$, more preferably from 1 to 20 mW/cm$^2$,
the polymerizable LC medium is exposed to UV light having a wavelength of 340 nm or more, and preferably 400 nm or less.

The process of this preferred embodiment can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 365 nm is desired, UV exposure can be carried out using a cut-off filter being substantially transmissive for wavelengths λ>365 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

The process of this preferred embodiment enables the manufacture of displays by using longer UV wavelengths, thereby reducing or even avoiding the hazardous and damaging effects of short UV light components.

The polymer obtained by polymerization of the polymerizable compounds of component B of the LC medium preferably forms a layer on one or both of the substrates, or on one or both of the alignment layers or electrode structures deposited thereon.

Preferably the polymerizable compounds of the polymerizable component B are polymerized while the voltage is applied at least during a part of the polymerization process, preferably during step UV1 as described above, in order to stabilize the reduced twist. However, it is also possible to achieve the desired orientation with reduced twist by carrying out polymerization, preferably the UV1 process step, after applying a voltage in step c).

Thus, in a preferred embodiment of the present invention step d) (UV1) of polymerizing the polymerizable compounds of the polymerizable component B is carried out either simultaneously with step c) of applying a voltage, or step d) is carried out such that it overlaps at least partially with step c).

In another preferred embodiment of the present invention step d) (UV1) of polymerizing the polymerizable compounds of the polymerizable component B is carried after step c) of applying a voltage.

In a preferred embodiment the display according to the present invention does not contain a polyimide alignment layer. In another preferred embodiment the display according to the present invention contains a polyimide alignment layer on one or both of the substrates.

In another preferred embodiment the LC medium according to the present invention contains a self-aligning (SA) additive, preferably in a concentration of 0.1 to 2.5%. An LC medium according to this preferred embodiment is especially suitable for use in polymer stabilized SA (PS-SA) displays.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the polymerizable compounds of polymerizable component B.

In another preferred embodiment an LC medium or a polymer stabilized SA-VA or SA-FFS display according to the present invention contains one or more self-aligning additives selected from Table E below.

Above and below, any SA additives comprised in the LC medium which contain a mesogenic group and one or more polymerizable groups, like those of formula SA-9 to SA-34 in Table E, are understood to be part of the polymerizable component B. The preferred compositions and concentration ranges given above and below for polymerizable component B and its ingredients are thus understood to include both RMs which are not SA additives, and RMs which are SA additives and contain one or more polar anchor groups selected for example from hydroxy, carboxy, amino or thiol groups.

The following examples are intended to explain the invention without limiting it. Above and below, percentage data denote percent by weight; all temperatures are indicated in degrees Celsius.

TABLE A
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
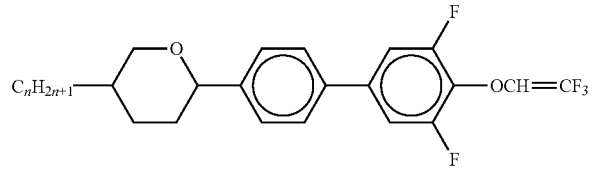
APU-n-OXF
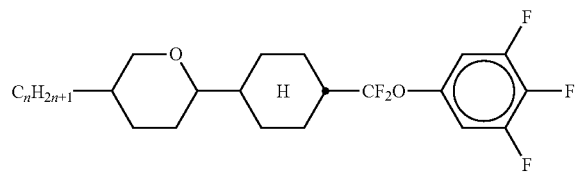
ACQU-n-F
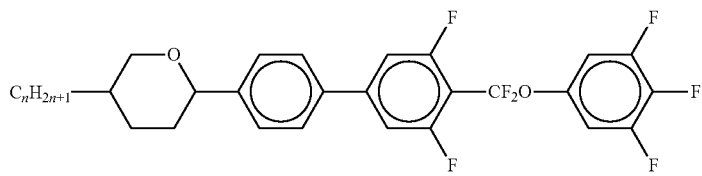
APUQU-n-F
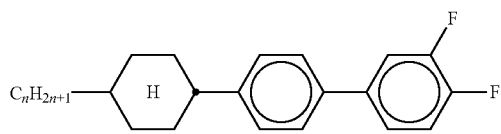
BCH-nF.F
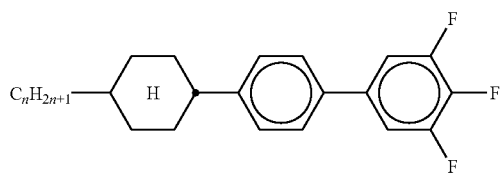
BCH-nF.F.F
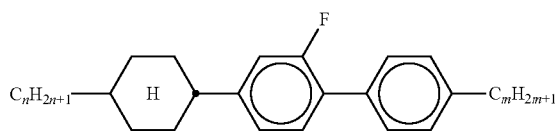
BCH-n.Fm
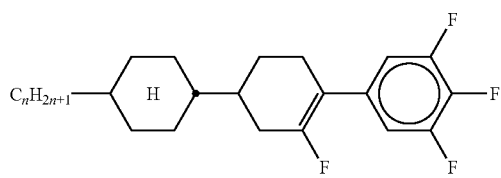
CFU-n-F TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
BCH-n-m
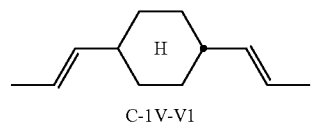
C-1V-V1
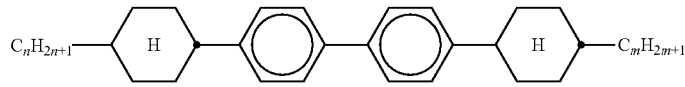
CBC-nm
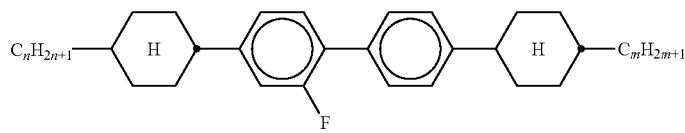
CBC-nmF
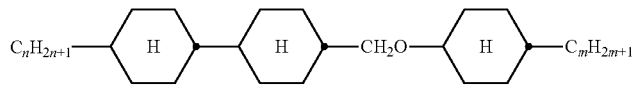
CCOC-n-m
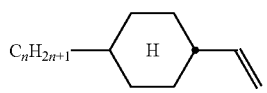
C-n-V
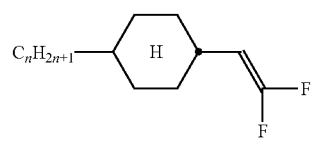
C-n-XF
C-n-m
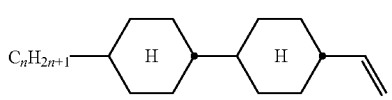
CC-n-V
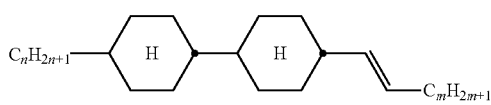
CC-n-Vm TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
CC-n-kVm
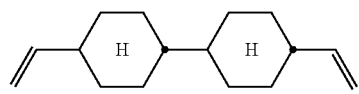
CC-V-V
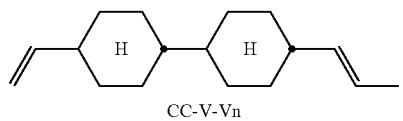
CC-V-Vn
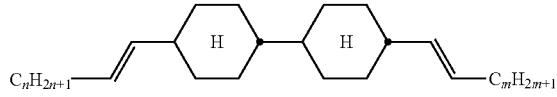
CC-nV-Vm
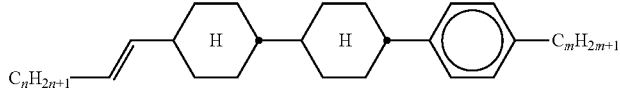
CCP-nV-m
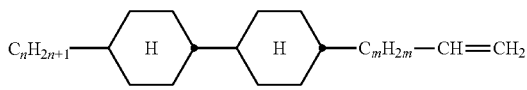
CC-n-mV
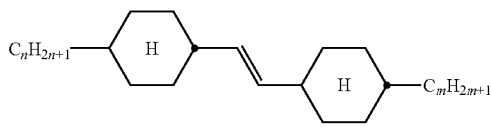
CVC-n-m
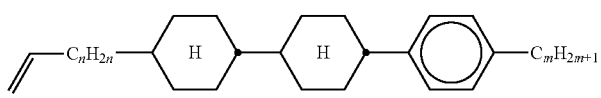
CCP-Vn-m
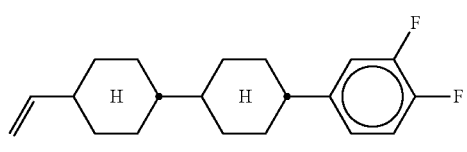
CCG-V-F
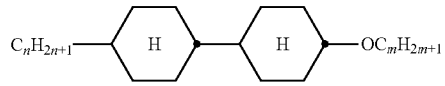
CCH-n-Om, CC-n-Om
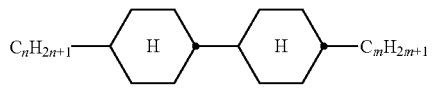
CCH-n-m, CC-n-m TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
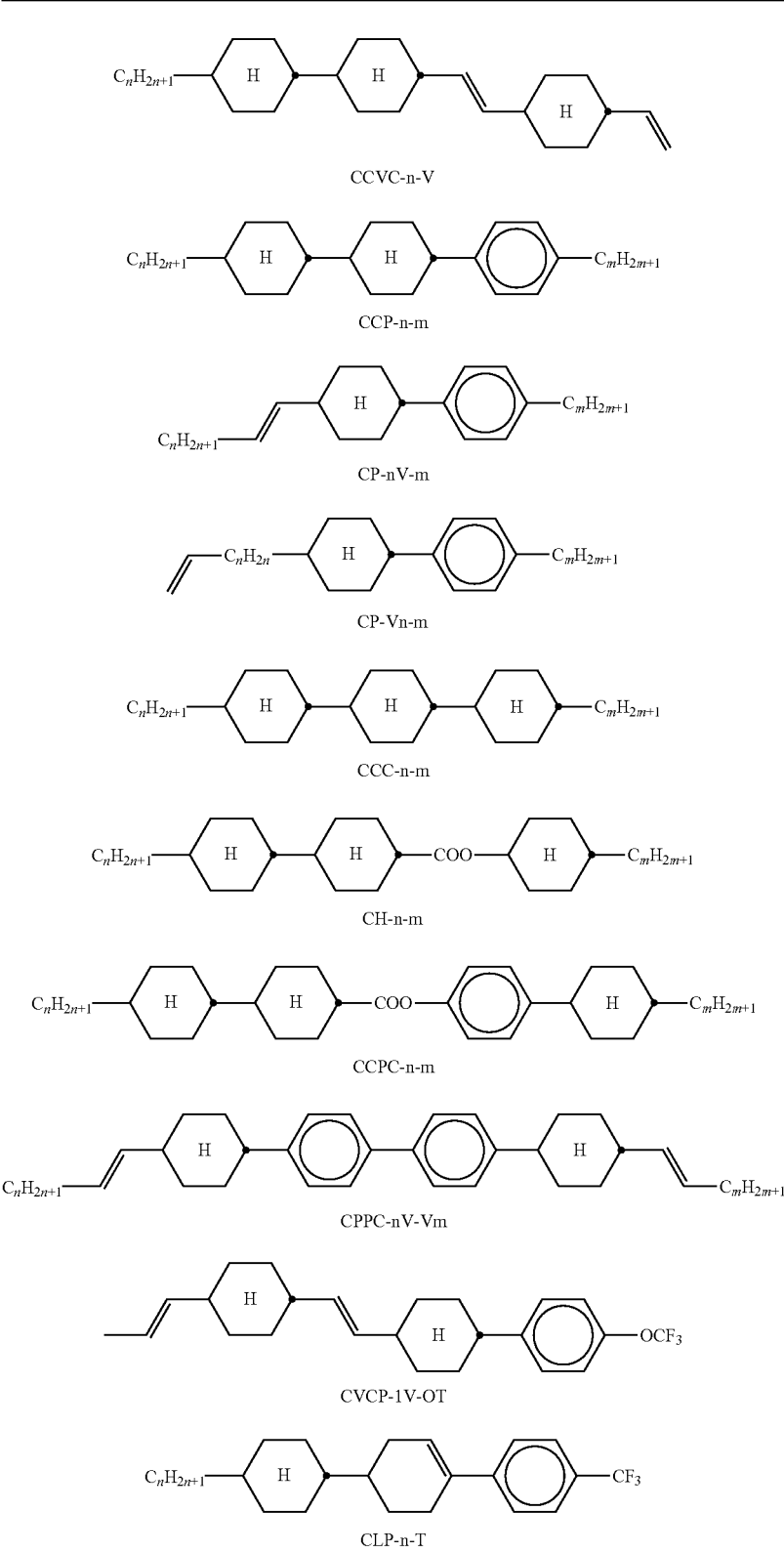
CCVC-n-V
CCP-n-m
CP-nV-m
CP-Vn-m
CCC-n-m
CH-n-m
CCPC-n-m
CPPC-nV-Vm
CVCP-1V-OT
CLP-n-T TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
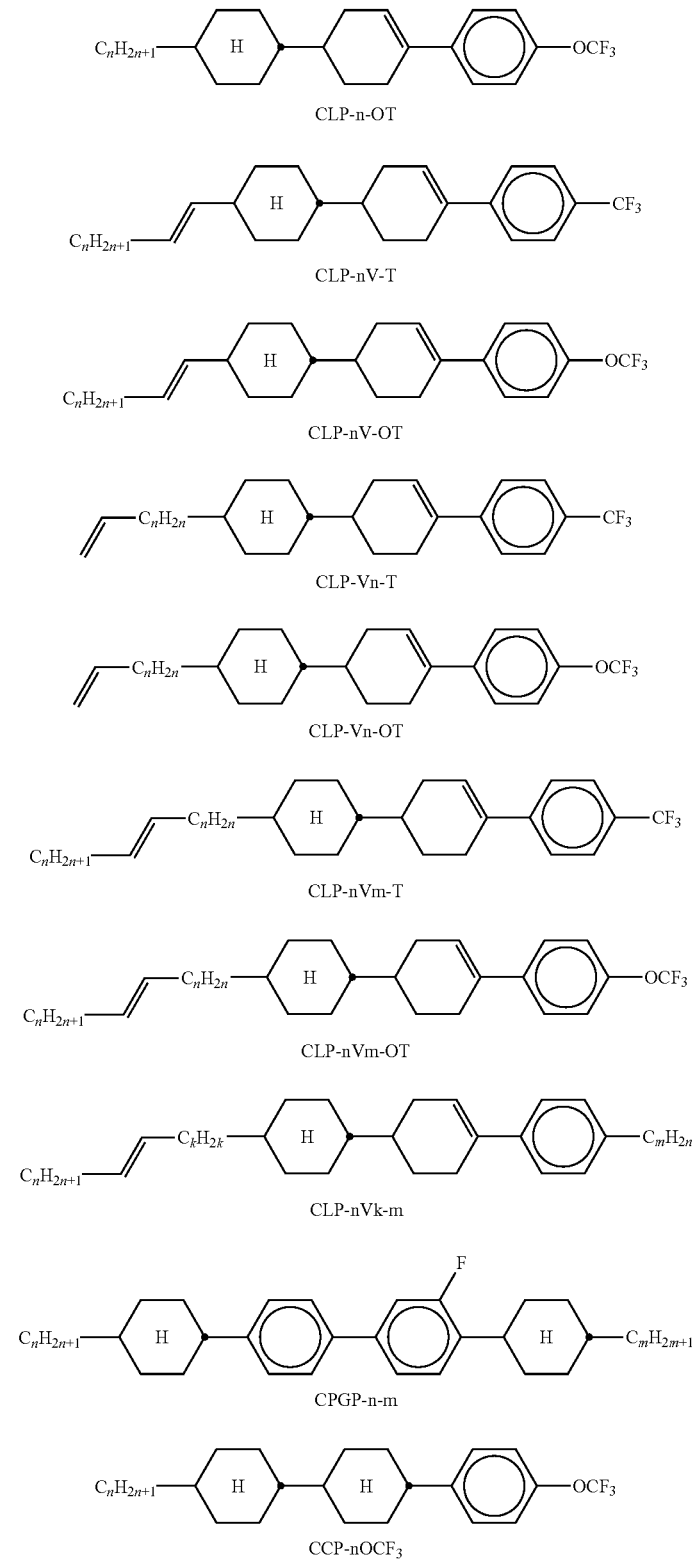

TABLE A-continued
In Table A, m and n are, independently of each other, an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
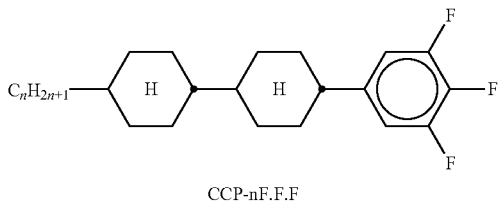
CCP-nF.F.F
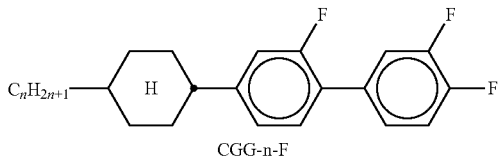
CGG-n-F
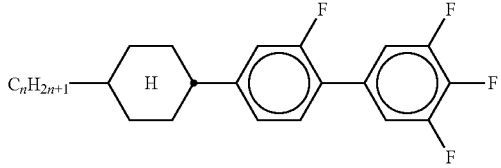
CGU-n-F
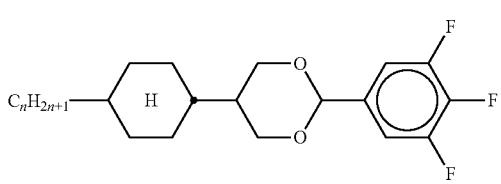
CDU-n-F
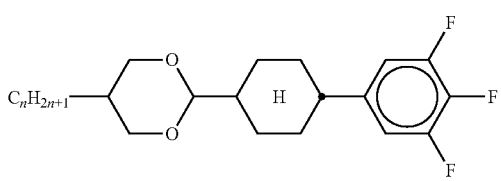
DCU-n-F
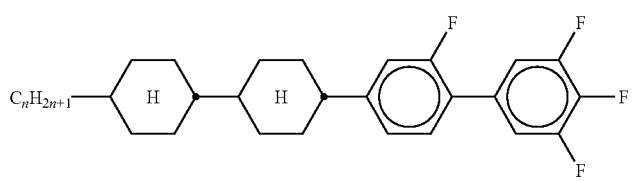
CCGU-n-F
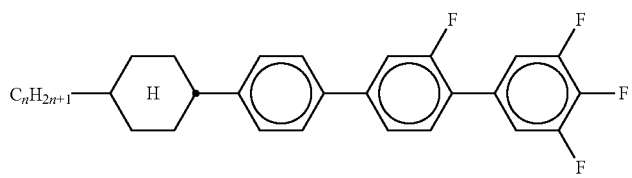
CPGU-n-F TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
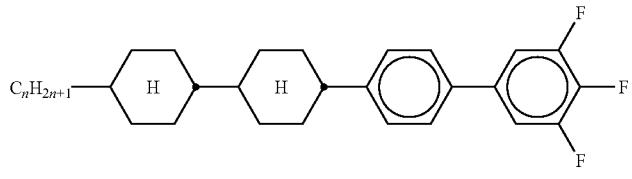
CCPU-n-F
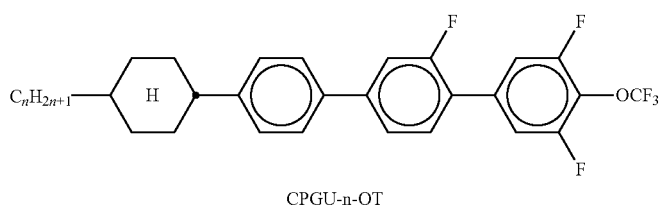
CPGU-n-OT
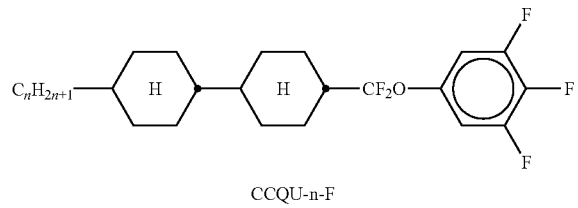
CCQU-n-F
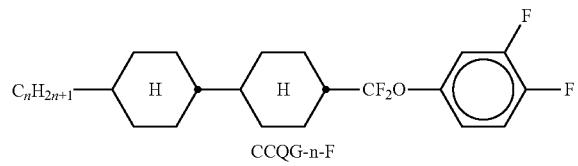
CCQG-n-F
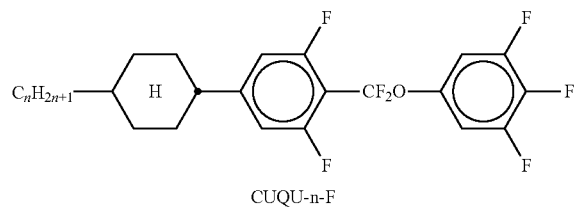
CUQU-n-F
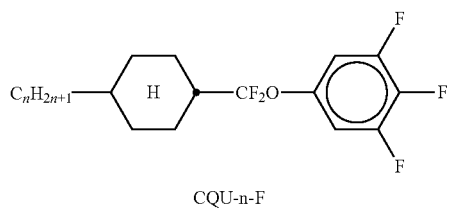
CQU-n-F
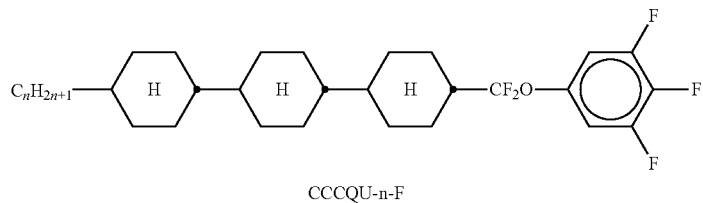
CCCQU-n-F TABLE A-continued
In Table A, m and n are, independently of each other, an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
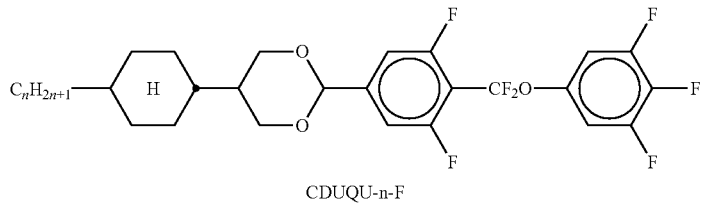
CDUQU-n-F
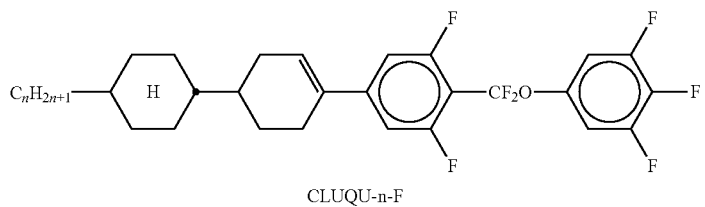
CLUQU-n-F
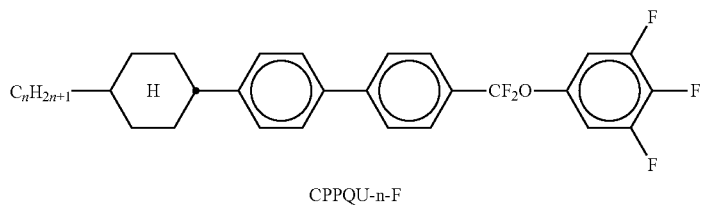
CPPQU-n-F
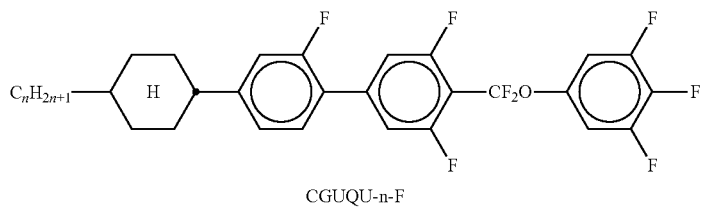
CGUQU-n-F
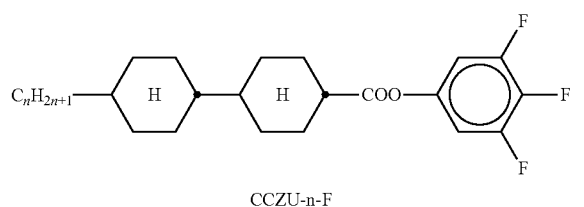
CCZU-n-F
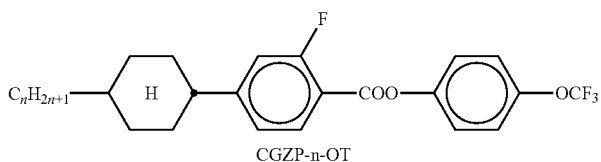
CGZP-n-OT
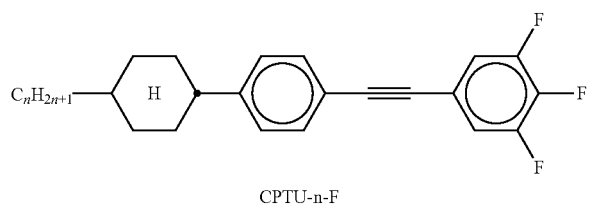
CPTU-n-F TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
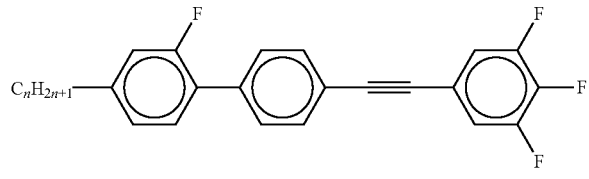
GPTU-n-F
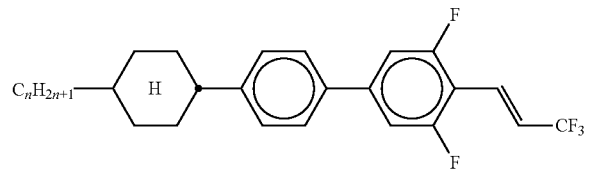
CPU-n-VT
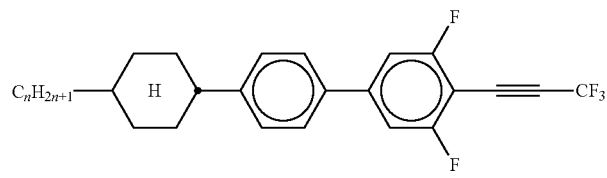
CPU-n-AT
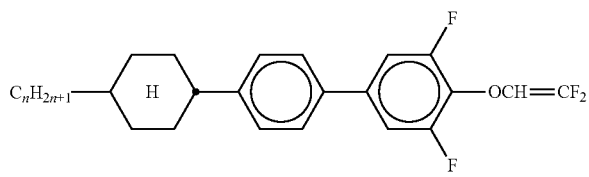
CPU-n-OXF
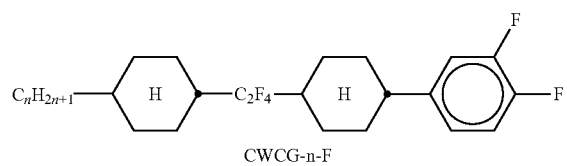
CWCG-n-F
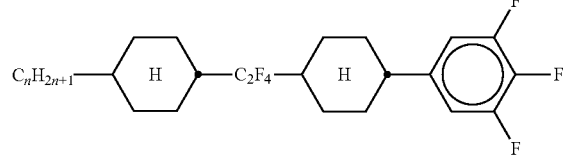
CWCU-n-F
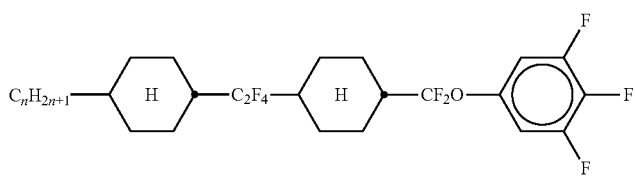
CWCQU-n-F TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
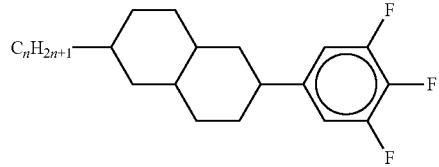
Dec-U-n-F
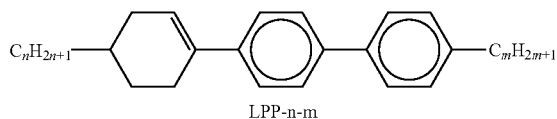
LPP-n-m
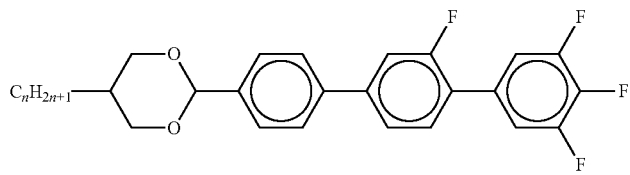
DPGU-n-F
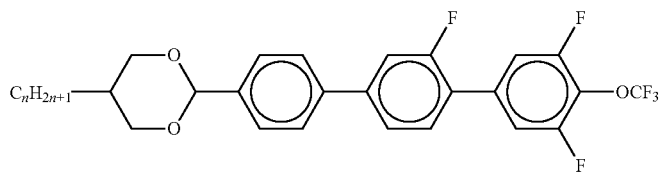
DPGU-n-OT
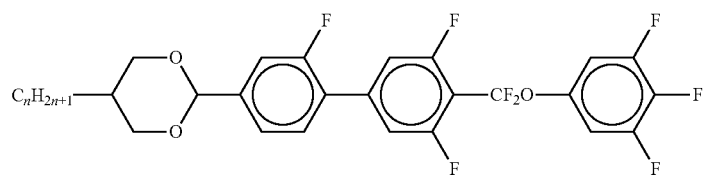
DGUQU-n-F
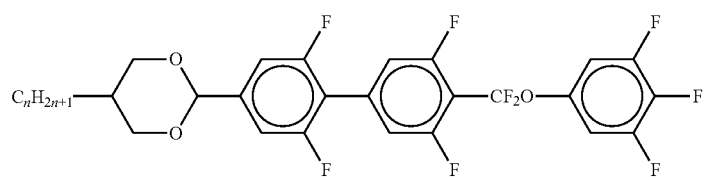
DUUQU-n-F
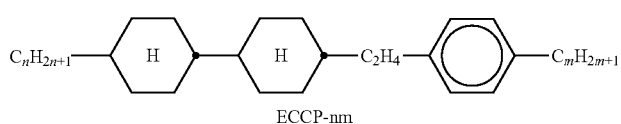
ECCP-nm
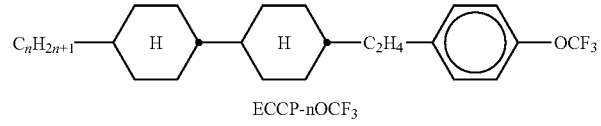
ECCP-nOCF$_3$ TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
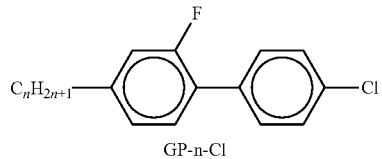
GP-n-Cl
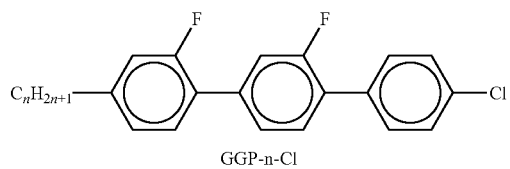
GGP-n-Cl
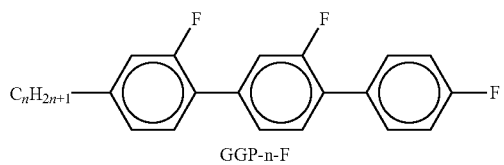
GGP-n-F
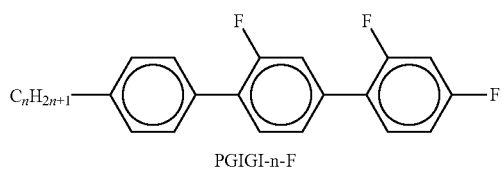
PGIGI-n-F
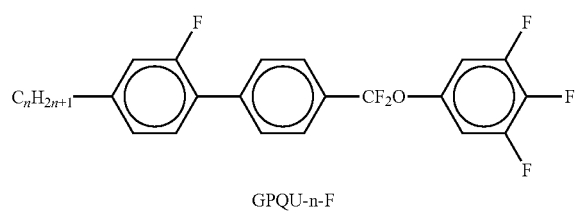
GPQU-n-F
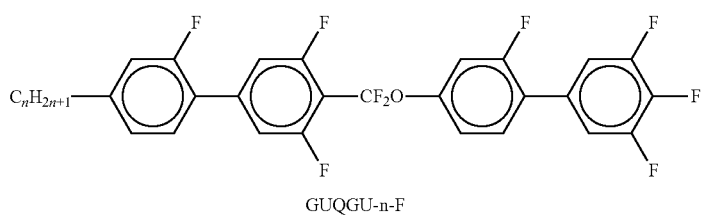
GUQGU-n-F
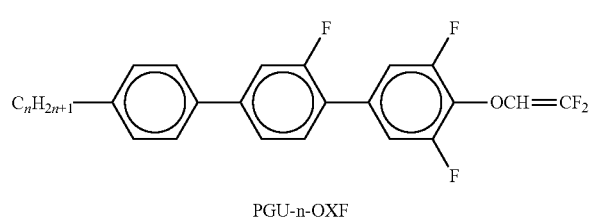
PGU-n-OXF
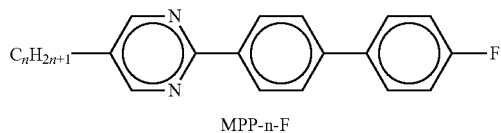
MPP-n-F TABLE A-continued
In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
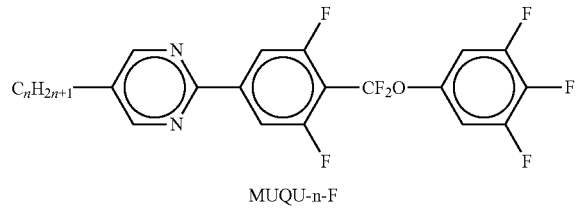
MUQU-n-F
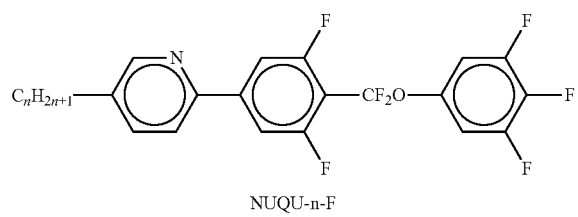
NUQU-n-F
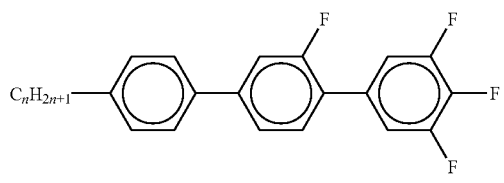
PGU-n-F
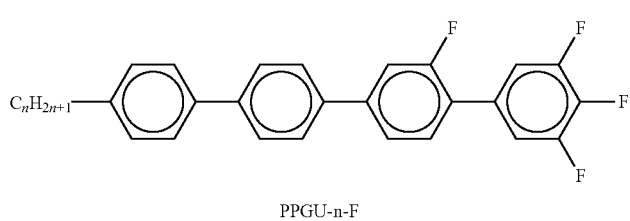
PPGU-n-F
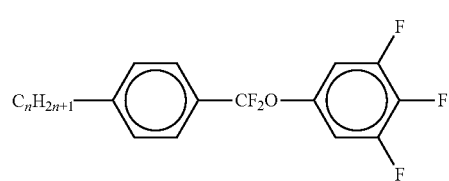
PQU-n-F
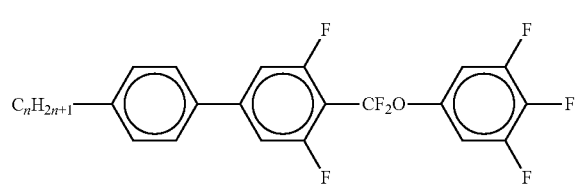
PUQU-n-F
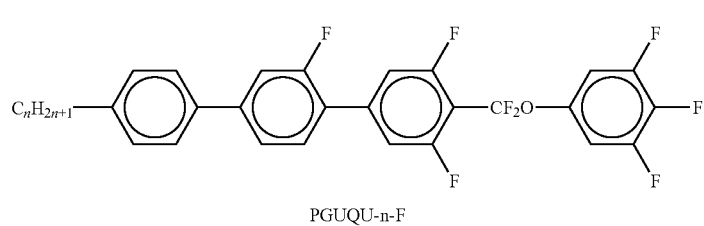
PGUQU-n-F TABLE A-continued
In Table A, m and n are, independently of each other, an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
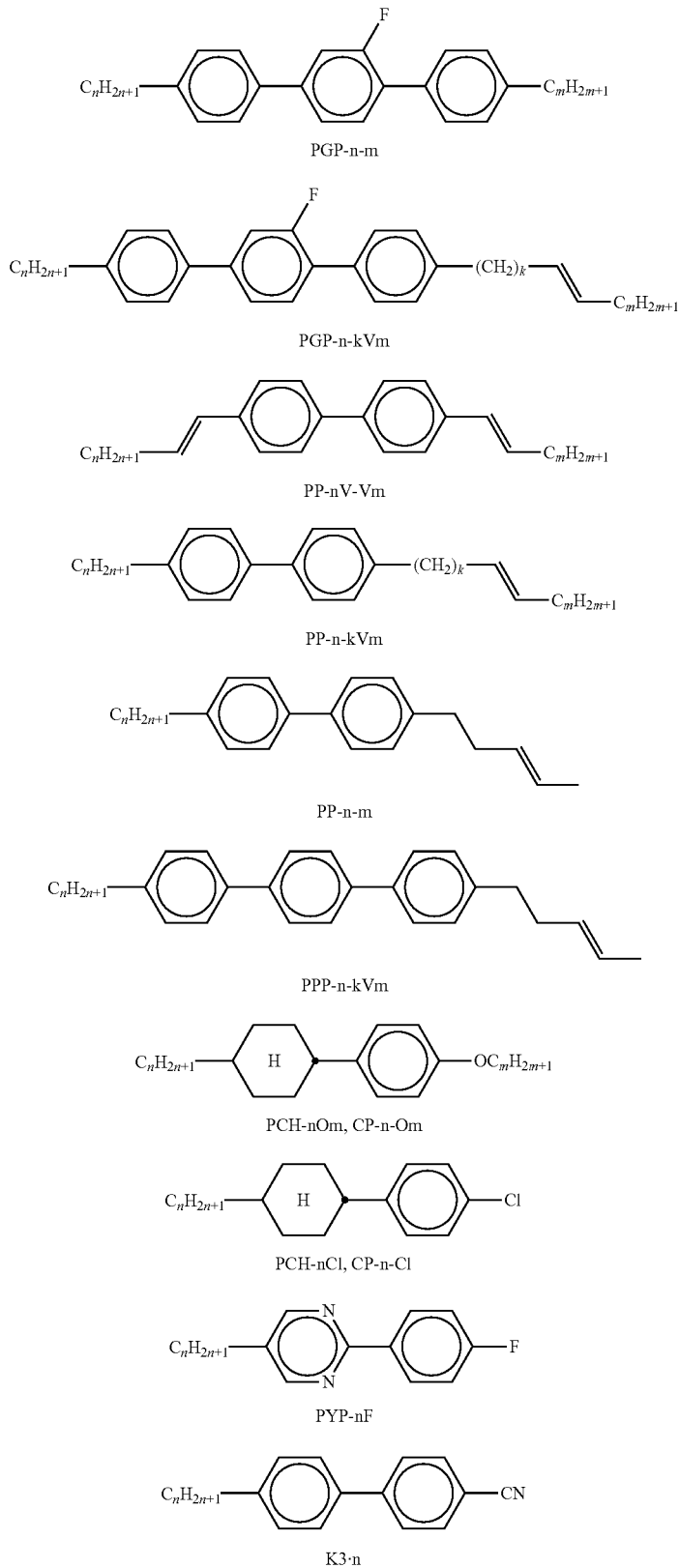

TABLE A-continued

In Table A, m and n are, independently of each other, an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

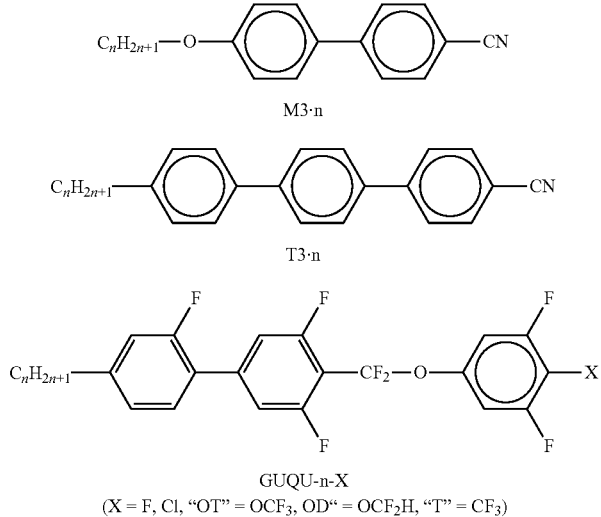

GUQU-n-X
(X = F, Cl, "OT" = $OCF_3$, OD" = $OCF_2H$, "T" = $CF_3$)

Particular preference is given to liquid-crystalline mixtures which comprise at least one, two, three, four or more compounds from Table A.

Table B indicates possible dopants which are generally added to the mixtures according to the invention. The mixtures preferably comprise 0-10% by weight, in particular 0.001-5% by weight and particularly preferably 0.001-3% by weight, of dopants.

TABLE B

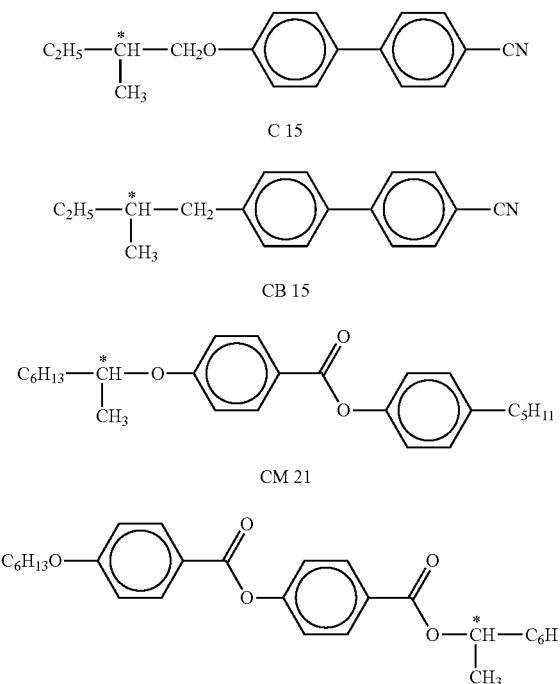

TABLE B-continued
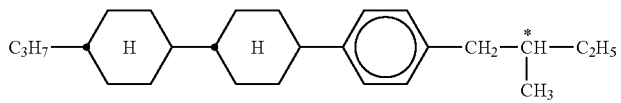
CM 44
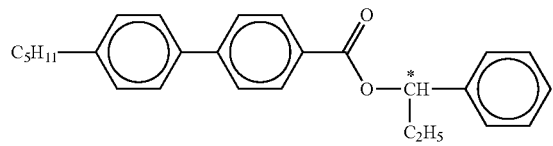
CM 45
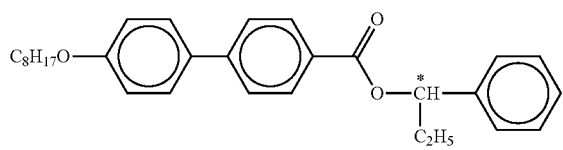
CM 47
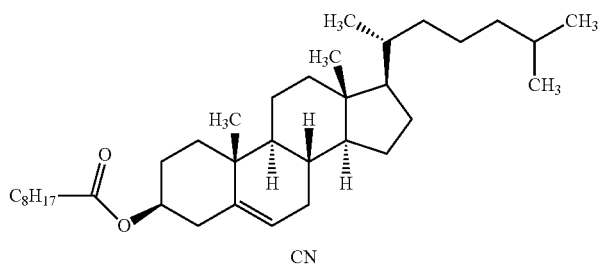
CN
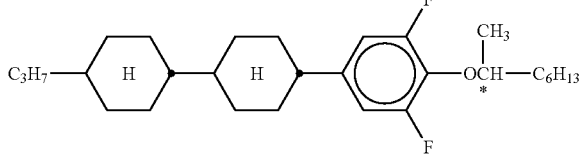
R/S-2011
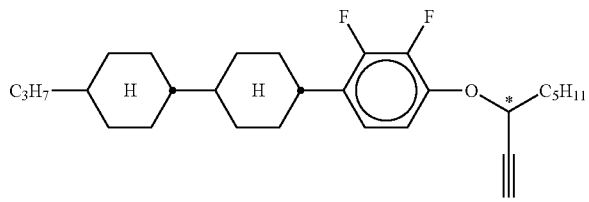
R/S-3011
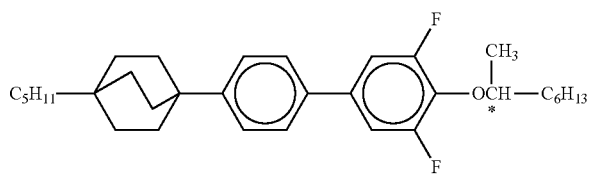
R/S-4011

TABLE B-continued
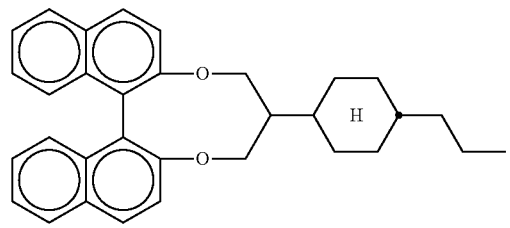
R/S-5011
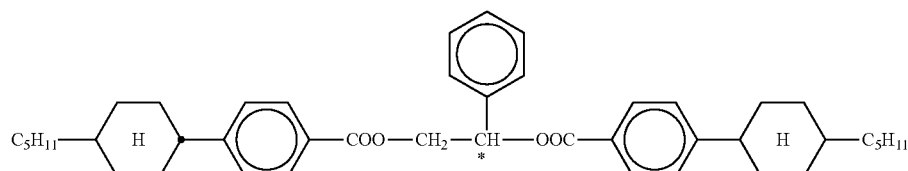
R/S-1011
TABLE C
Stabilizers which can be added, for example, to the mixtures according to the invention in amounts of 0-10% by weight are mentioned below.
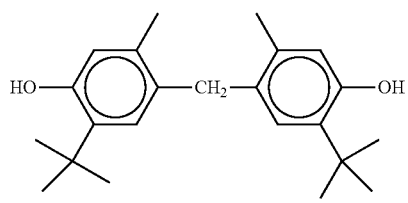
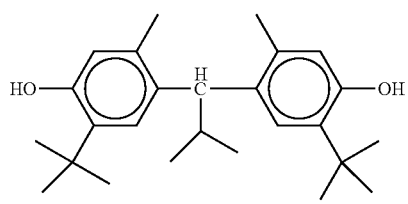
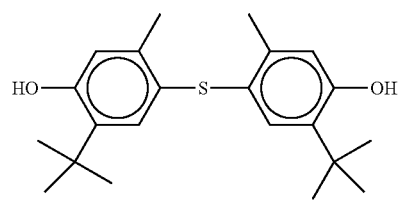
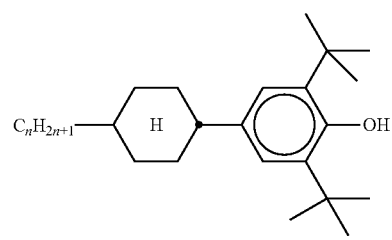
n = 1, 2, 3, 4, 5, 6 or 7

TABLE C-continued
Stabilizers which can be added, for example, to the mixtures according to the invention in amounts of 0-10% by weight are mentioned below.
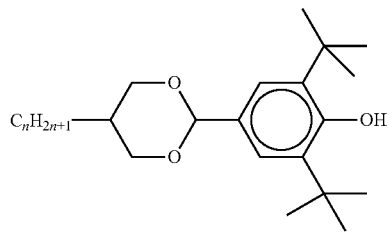
n = 1, 2, 3, 4, 5, 6 or 7
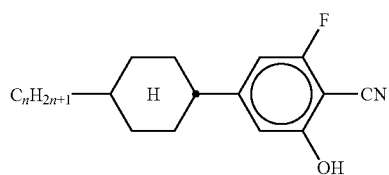
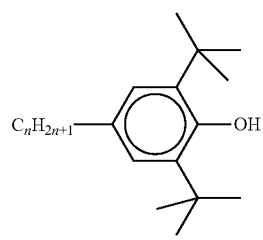
n = 1, 2, 3, 4, 5, 6 or 7
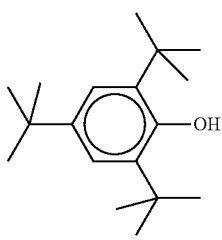
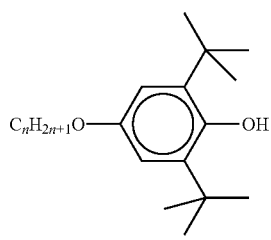
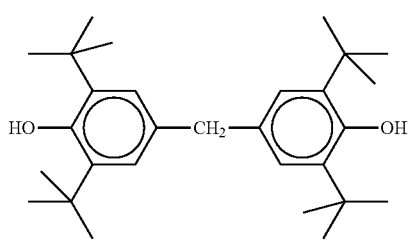

TABLE C-continued
Stabilizers which can be added, for example, to the mixtures according to the invention in amounts of 0-10% by weight are mentioned below.
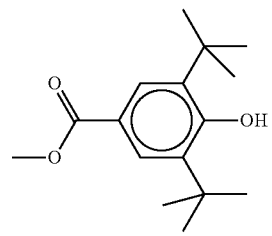
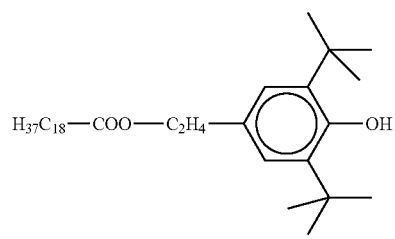
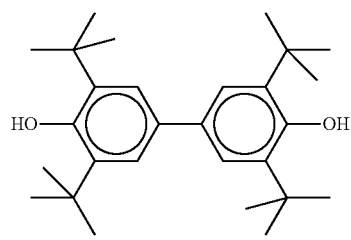
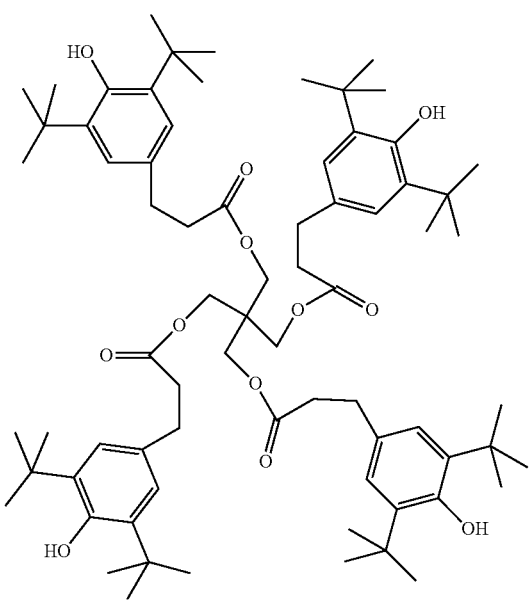 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
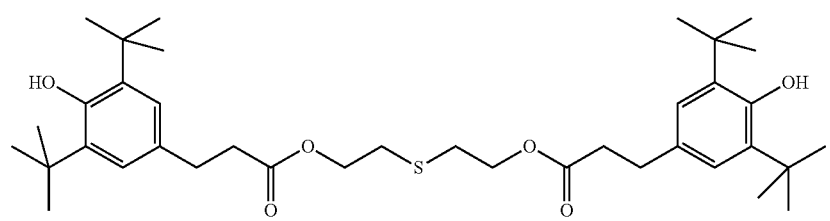 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
Stabilizers which can be added, for example, to the mixtures according to the invention in amounts of 0-10% by weight are mentioned below.
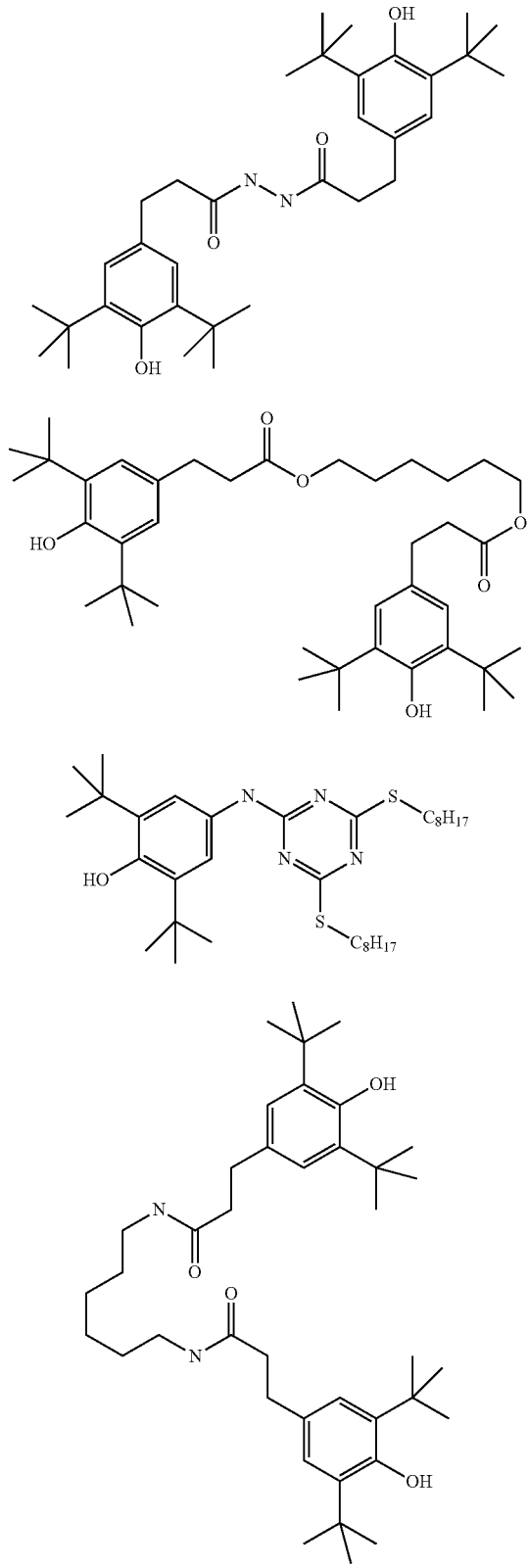

TABLE C-continued
Stabilizers which can be added, for example, to the mixtures according to the invention in amounts of 0-10% by weight are mentioned below.
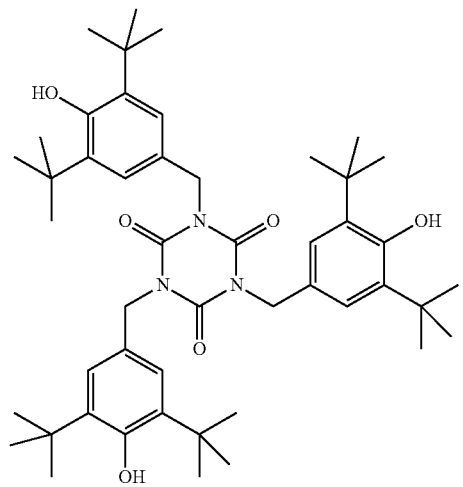 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
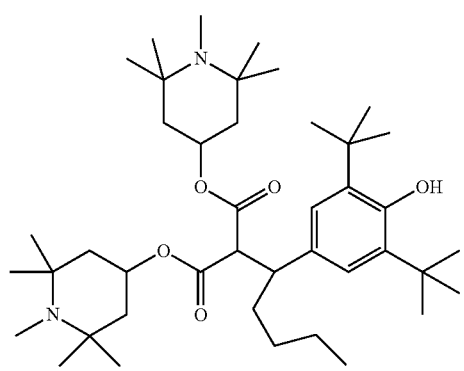 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
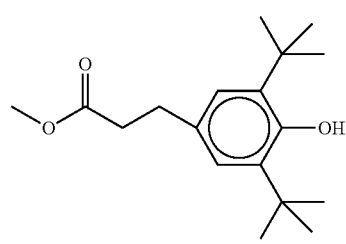
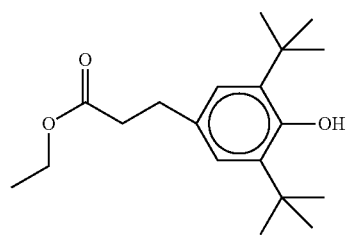
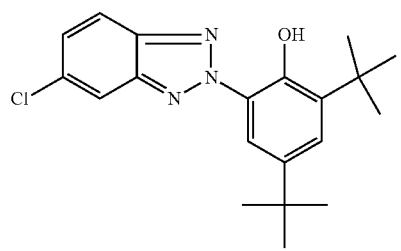 [SMILES: CC(C)(C)c1cc(-n2nc3ccc(Cl)cc3n2)c(O)c(C(C)(C)C)c1]

TABLE C-continued
Stabilizers which can be added, for example, to the mixtures according to the invention in amounts of 0-10% by weight are mentioned below.
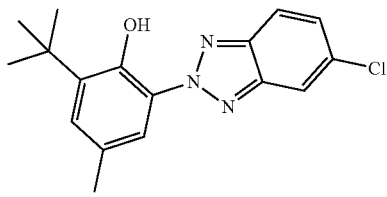 [SMILES: Cc1cc(-n2nc3ccc(Cl)cc3n2)c(O)c(C(C)(C)C)c1]
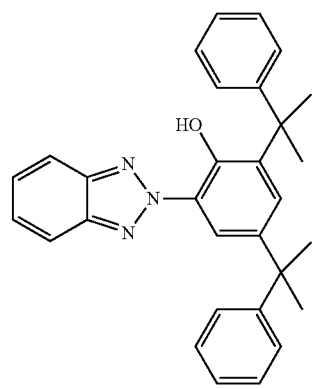 [SMILES: CC(C)(c1ccccc1)c1cc(-n2nc3ccccc3n2)c(O)c(C(C)(C)c2ccccc2)c1]
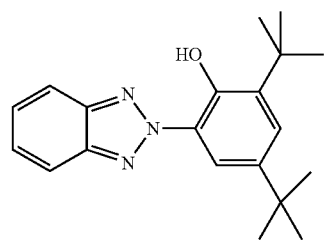 [SMILES: CC(C)(C)c1cc(-n2nc3ccccc3n2)c(O)c(C(C)(C)C)c1]
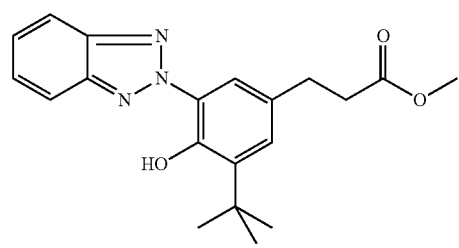 [SMILES: COC(=O)CCc1cc(-n2nc3ccccc3n2)c(O)c(C(C)(C)C)c1]
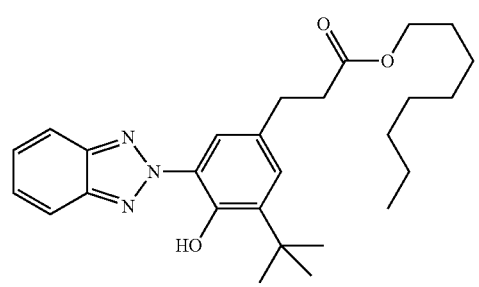 [SMILES: CCCCCCCCOC(=O)CCc1cc(-n2nc3ccccc3n2)c(O)c(C(C)(C)C)c1]

TABLE C-continued
Stabilizers which can be added, for example, to the mixtures according to the invention in amounts of 0-10% by weight are mentioned below.
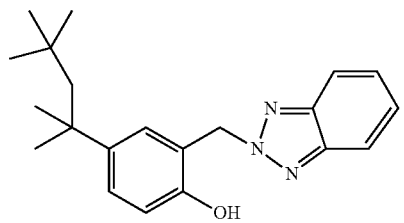 [SMILES: CC(C)(C)CC(C)(C)c1ccc(O)c(Cn2nc3ccccc3n2)c1]
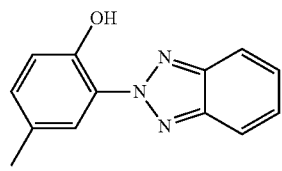 [SMILES: Cc1ccc(O)c(-n2nc3ccccc3n2)c1]
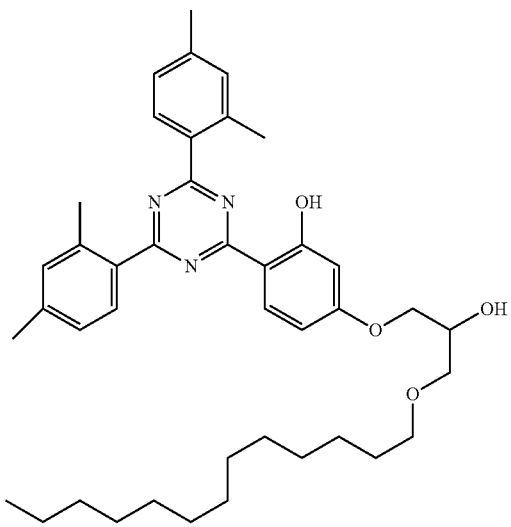 [SMILES: CCCCCCCCCCCCCOCC(O)COc1ccc(-c2nc(-c3ccc(C)cc3C)nc(-c3ccc(C)cc3C)n2)c(O)c1]
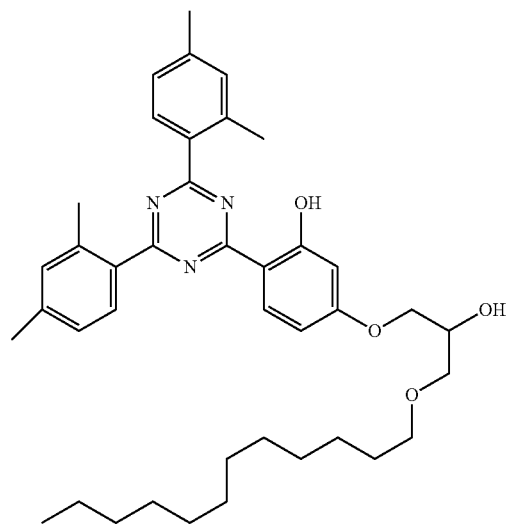 [SMILES: CCCCCCCCCCCCOCC(O)COc1ccc(-c2nc(-c3ccc(C)cc3C)nc(-c3ccc(C)cc3C)n2)c(O)c1]

TABLE C-continued
Stabilizers which can be added, for example, to the mixtures according to the invention in amounts of 0-10% by weight are mentioned below.
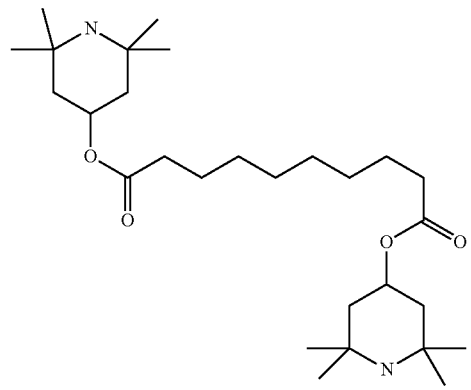
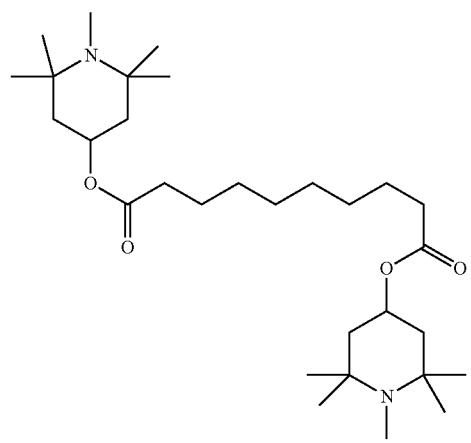
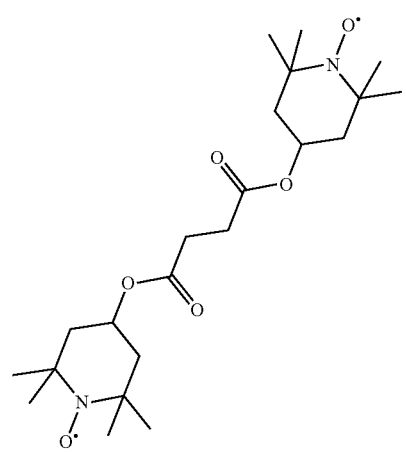

TABLE C-continued
Stabilizers which can be added, for example, to the mixtures according to the invention in amounts of 0-10% by weight are mentioned below.
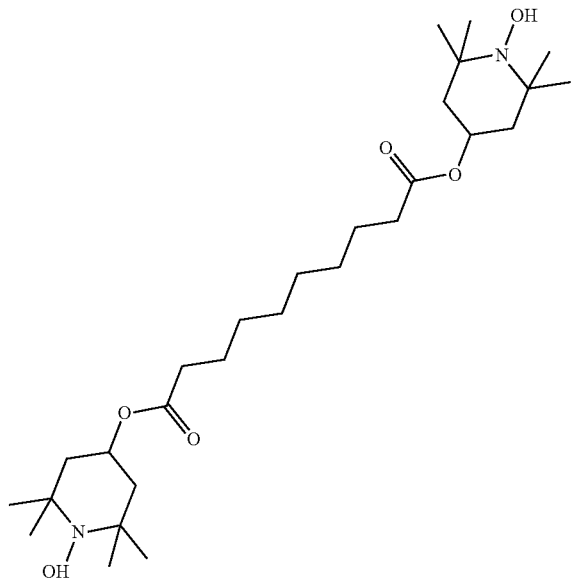
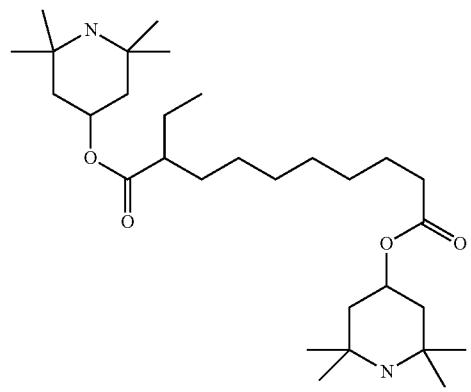
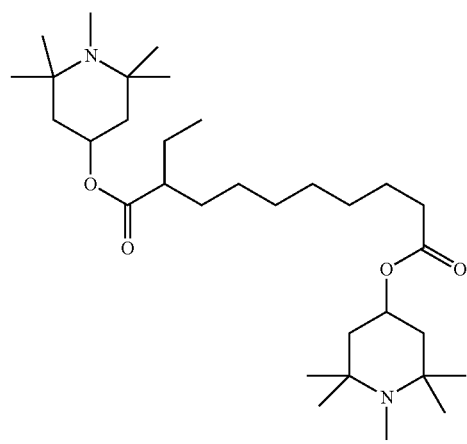

TABLE C-continued
Stabilizers which can be added, for example, to the mixtures according to the invention in amounts of 0-10% by weight are mentioned below.
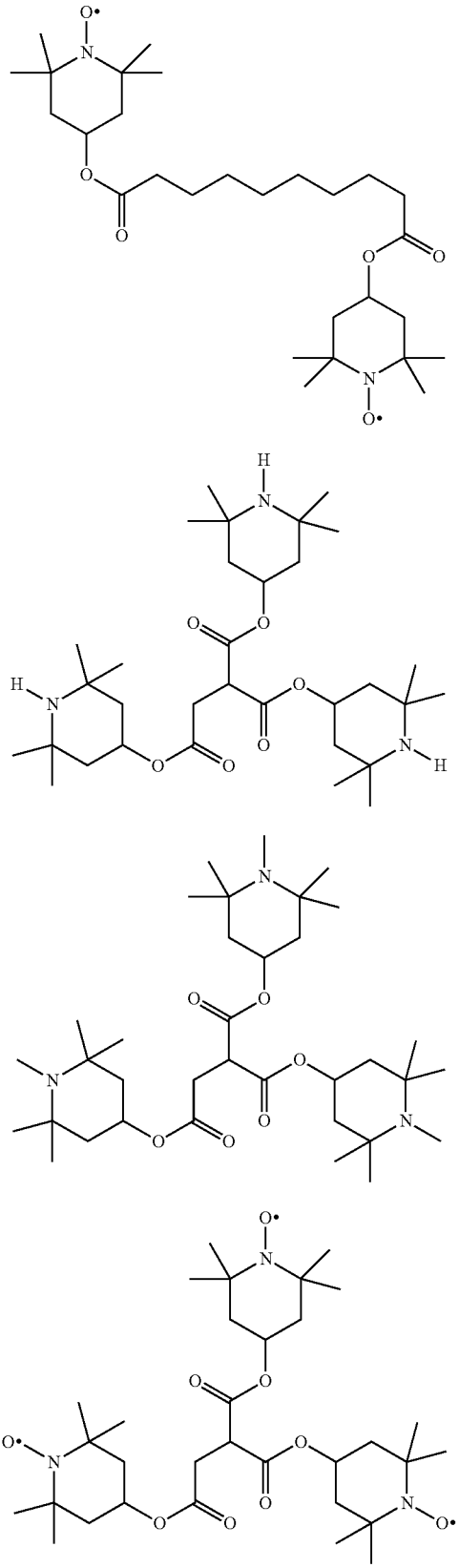

TABLE C-continued
Stabilizers which can be added, for example, to the mixtures according to the invention in amounts of 0-10% by weight are mentioned below.
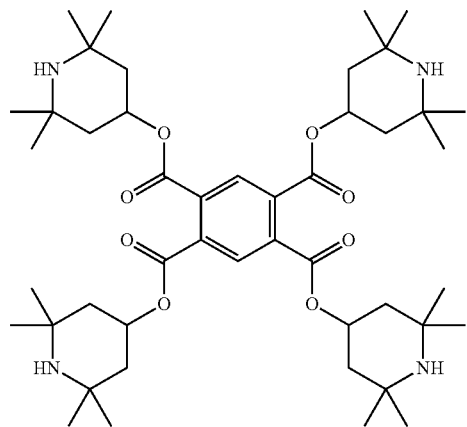
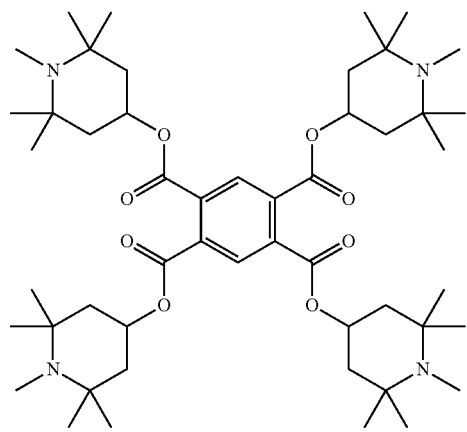
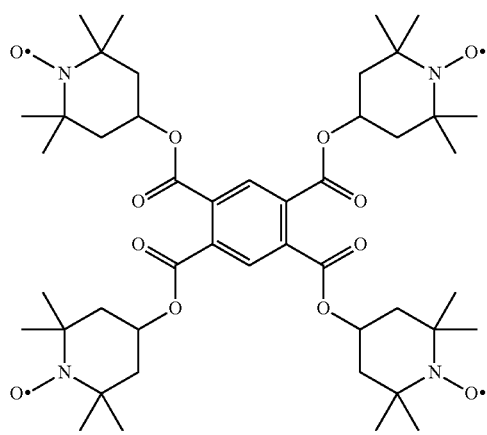

TABLE C-continued
Stabilizers which can be added, for example, to the mixtures according to the invention in amounts of 0-10% by weight are mentioned below.
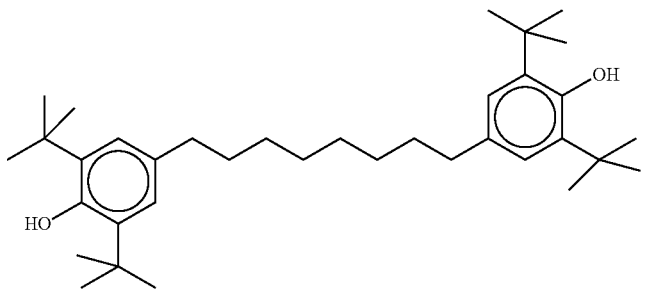
TABLE D
Table D shows illustrative reactive mesogenic compounds which can be used in the LC media in accordance with the present invention.
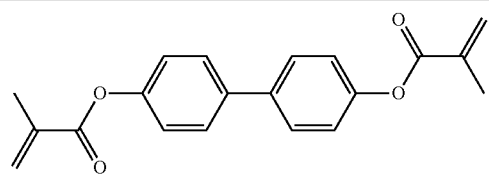
RM-1
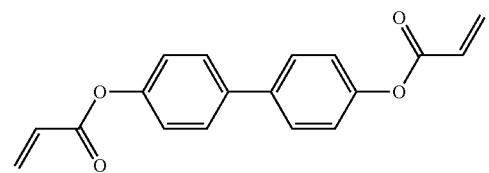 [SMILES: C=CC(=O)Oc1ccc(-c2ccc(OC(=O)C=C)cc2)cc1]
RM-2
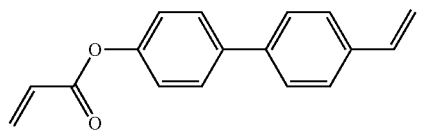 [SMILES: C=CC(=O)Oc1ccc(-c2ccc(C=C)cc2)cc1]
RM-3
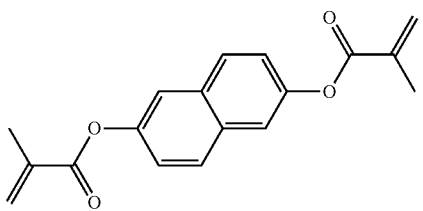 [SMILES: C=C(C)C(=O)Oc1ccc2cc(OC(=O)C(=C)C)ccc2c1]
RM-4
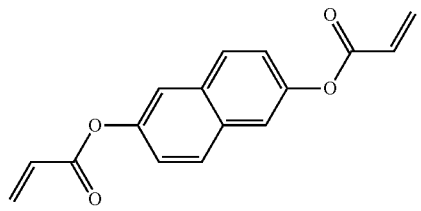 [SMILES: C=CC(=O)Oc1ccc2cc(OC(=O)C=C)ccc2c1]
RM-5
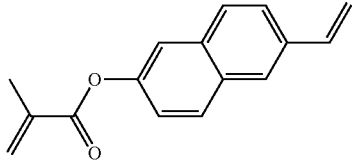 [SMILES: C=Cc1ccc2cc(OC(=O)C(=C)C)ccc2c1]
RM-6

TABLE D-continued
Table D shows illustrative reactive mesogenic compounds which can be used in the LC media in accordance with the present invention.
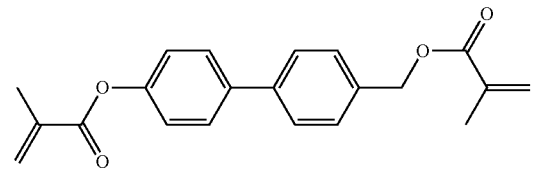 [SMILES: C=C(C)C(=O)OCc1ccc(-c2ccc(OC(=O)C(=C)C)cc2)cc1]
RM-7
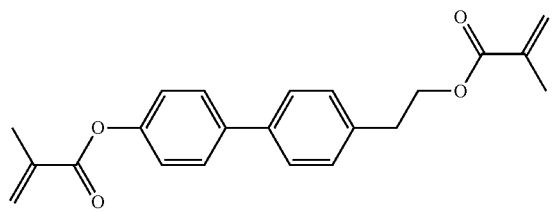 [SMILES: C=C(C)C(=O)OCCc1ccc(-c2ccc(OC(=O)C(=C)C)cc2)cc1]
RM-8
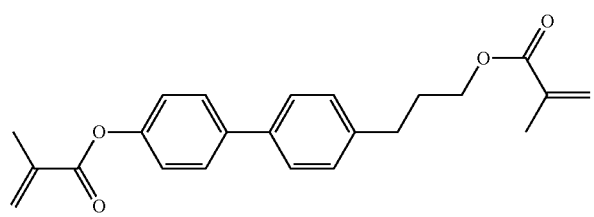 [SMILES: C=C(C)C(=O)OCCCc1ccc(-c2ccc(OC(=O)C(=C)C)cc2)cc1]
RM-9
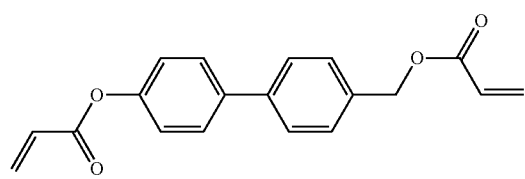 [SMILES: C=CC(=O)OCc1ccc(-c2ccc(OC(=O)C=C)cc2)cc1]
RM-10
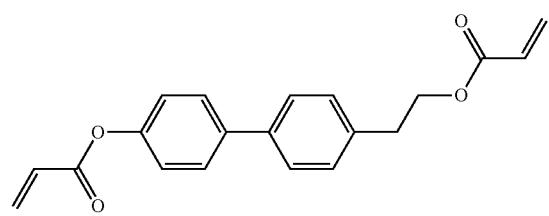 [SMILES: C=CC(=O)OCCc1ccc(-c2ccc(OC(=O)C=C)cc2)cc1]
RM-11
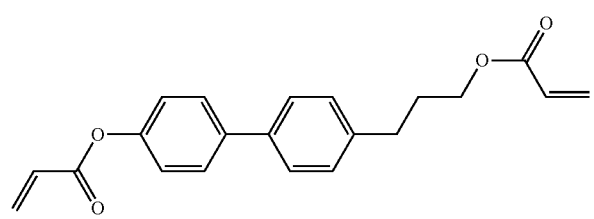 [SMILES: C=CC(=O)OCCCc1ccc(-c2ccc(OC(=O)C=C)cc2)cc1]
RM-12
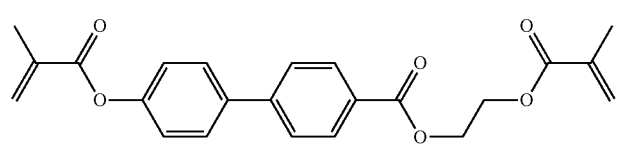 [SMILES: C=C(C)C(=O)OCCOC(=O)c1ccc(-c2ccc(OC(=O)C(=C)C)cc2)cc1]
R-13
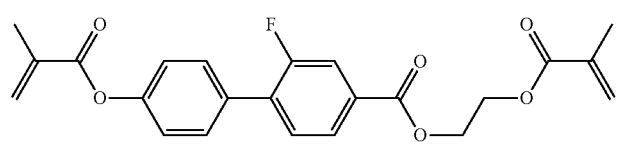 [SMILES: C=C(C)C(=O)OCCOC(=O)c1ccc(-c2ccc(OC(=O)C(=C)C)cc2)c(F)c1]
RM-14

TABLE D-continued
Table D shows illustrative reactive mesogenic compounds which can be used in the LC media in accordance with the present invention.
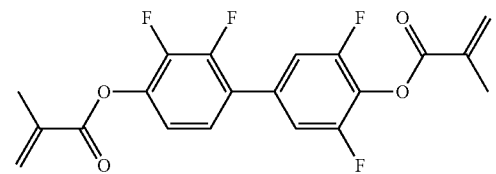 [SMILES: C=C(C)C(=O)Oc1ccc(-c2cc(F)c(OC(=O)C(=C)C)c(F)c2)c(F)c1F]
RM-15
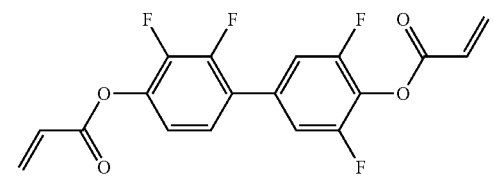 [SMILES: C=CC(=O)Oc1ccc(-c2cc(F)c(OC(=O)C=C)c(F)c2)c(F)c1F]
RM-16
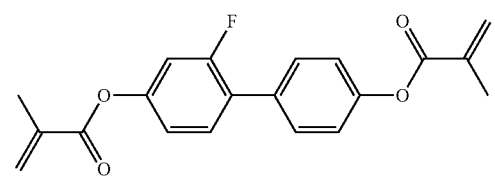 [SMILES: C=C(C)C(=O)Oc1ccc(-c2ccc(OC(=O)C(=C)C)cc2F)cc1]
RM-17
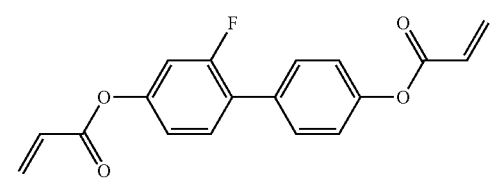 [SMILES: C=CC(=O)Oc1ccc(-c2ccc(OC(=O)C=C)cc2F)cc1]
RM-18
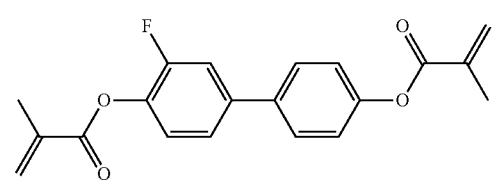
RM-19
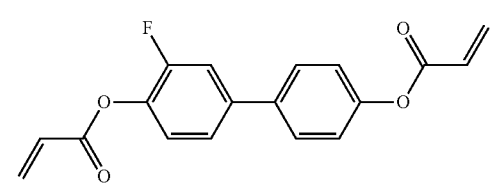 [SMILES: C=CC(=O)Oc1ccc(-c2ccc(OC(=O)C=C)c(F)c2)cc1]
RM-20
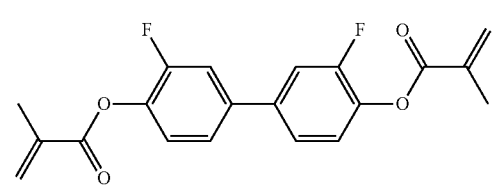 [SMILES: C=C(C)C(=O)Oc1ccc(-c2ccc(OC(=O)C(=C)C)c(F)c2)cc1F]
RM-21
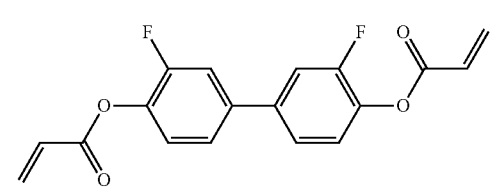 [SMILES: C=CC(=O)Oc1ccc(-c2ccc(OC(=O)C=C)c(F)c2)cc1F]
RM-22

TABLE D-continued
Table D shows illustrative reactive mesogenic compounds which can be used in the LC media in accordance with the present invention.
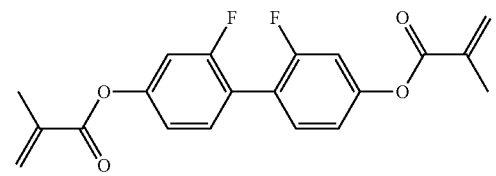 [SMILES: C=C(C)C(=O)Oc1ccc(-c2ccc(OC(=O)C(=C)C)cc2F)c(F)c1]
RM-23
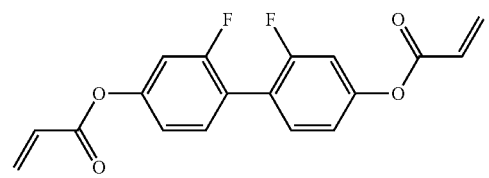 [SMILES: C=CC(=O)Oc1ccc(-c2ccc(OC(=O)C=C)cc2F)c(F)c1]
RM-24
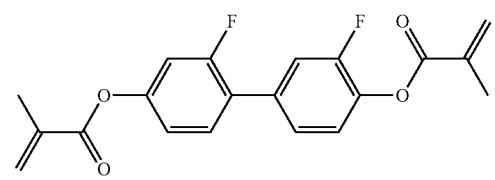 [SMILES: C=C(C)C(=O)Oc1ccc(-c2ccc(OC(=O)C(=C)C)c(F)c2)c(F)c1]
RM-25
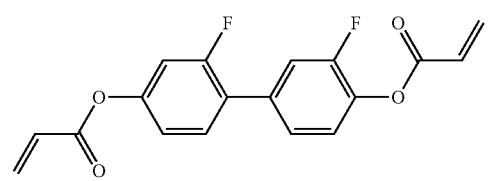 [SMILES: C=CC(=O)Oc1ccc(-c2ccc(OC(=O)C=C)c(F)c2)c(F)c1]
RM-26
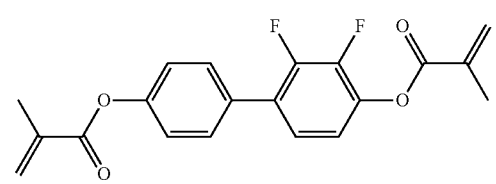 [SMILES: C=C(C)C(=O)Oc1ccc(-c2ccc(OC(=O)C(=C)C)c(F)c2F)cc1]
RM-27
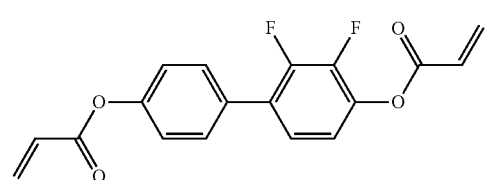
RM-28
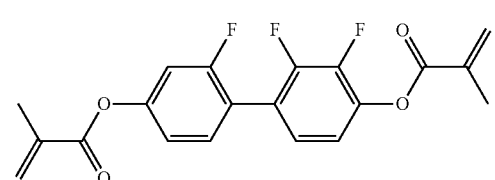
RM-29
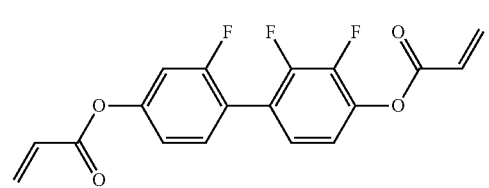 [SMILES: C=CC(=O)Oc1ccc(-c2ccc(OC(=O)C=C)c(F)c2F)c(F)c1]
RM-30

TABLE D-continued
Table D shows illustrative reactive mesogenic compounds which can be used in the LC media in accordance with the present invention.
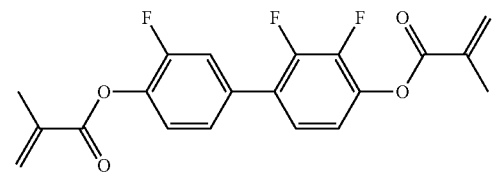 [SMILES: C=C(C)C(=O)Oc1ccc(-c2ccc(OC(=O)C(=C)C)c(F)c2F)cc1F] RM-31
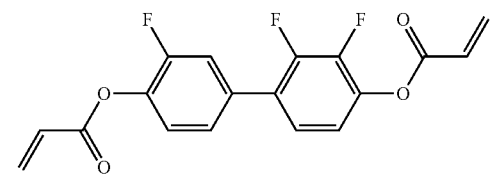 [SMILES: C=CC(=O)Oc1ccc(-c2ccc(OC(=O)C=C)c(F)c2F)cc1F] RM-32
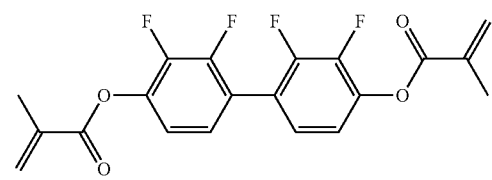 [SMILES: C=C(C)C(=O)Oc1ccc(-c2ccc(OC(=O)C(=C)C)c(F)c2F)c(F)c1F] RM-33
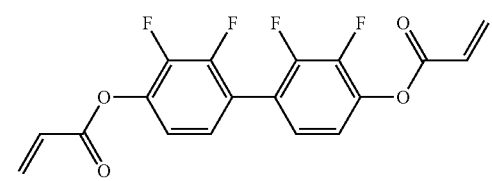 [SMILES: C=CC(=O)Oc1ccc(-c2ccc(OC(=O)C=C)c(F)c2F)c(F)c1F] RM-34
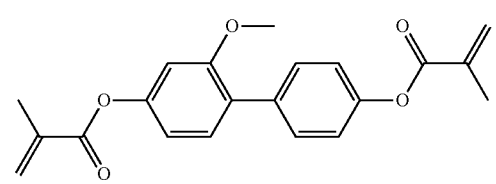 RM-35
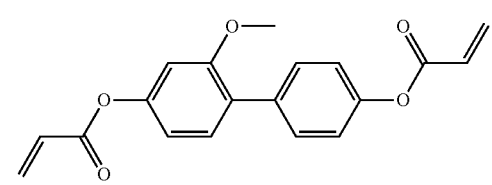 [SMILES: C=CC(=O)Oc1ccc(-c2ccc(OC(=O)C=C)cc2OC)cc1] RM-36
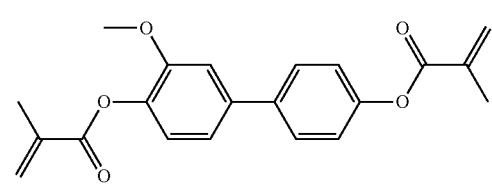 [SMILES: C=C(C)C(=O)Oc1ccc(-c2ccc(OC(=O)C(=C)C)c(OC)c2)cc1] RM-37
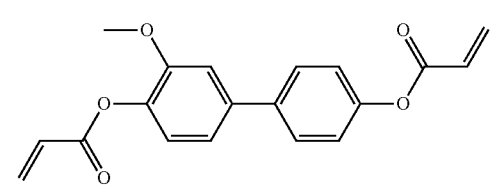 RM-38

TABLE D-continued
Table D shows illustrative reactive mesogenic compounds which can be used in the LC media in accordance with the present invention.
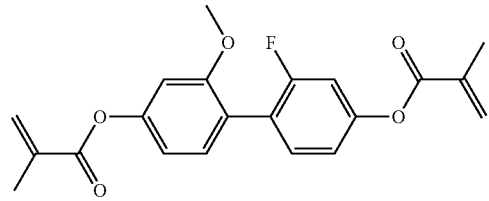 [SMILES: C=C(C)C(=O)Oc1ccc(-c2ccc(OC(=O)C(=C)C)cc2OC)c(F)c1]
RM-39
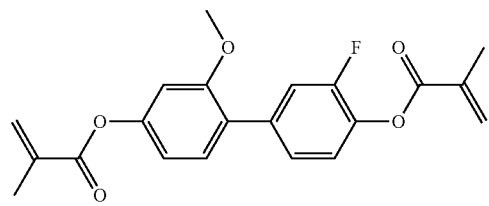 [SMILES: C=C(C)C(=O)Oc1ccc(-c2ccc(OC(=O)C(=C)C)c(F)c2)c(OC)c1]
RM-40
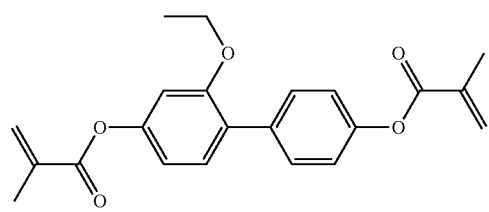 [SMILES: C=C(C)C(=O)Oc1ccc(-c2ccc(OC(=O)C(=C)C)cc2OCC)cc1]
RM-41
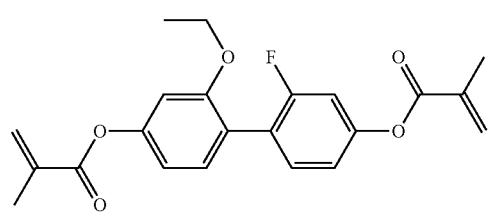 [SMILES: C=C(C)C(=O)Oc1ccc(-c2ccc(OC(=O)C(=C)C)cc2OCC)c(F)c1]
RM-42
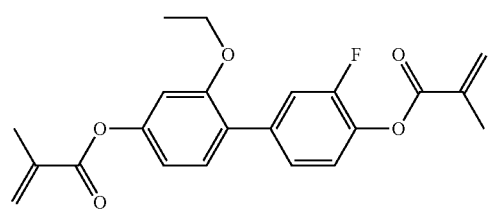 [SMILES: C=C(C)C(=O)Oc1ccc(-c2ccc(OC(=O)C(=C)C)c(F)c2)c(OCC)c1]
RM-43
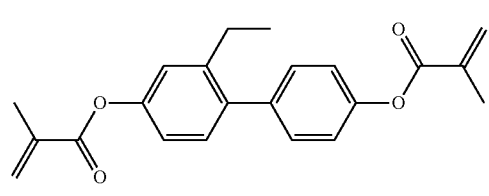 [SMILES: C=C(C)C(=O)Oc1ccc(-c2ccc(OC(=O)C(=C)C)cc2CC)cc1]
RM-44
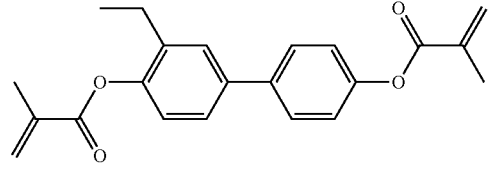 [SMILES: C=C(C)C(=O)Oc1ccc(-c2ccc(OC(=O)C(=C)C)c(CC)c2)cc1]
RM-45
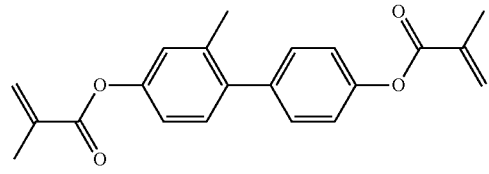 [SMILES: C=C(C)C(=O)Oc1ccc(-c2ccc(OC(=O)C(=C)C)cc2C)cc1]
RM-46

TABLE D-continued
Table D shows illustrative reactive mesogenic compounds which can be used in the LC media in accordance with the present invention.
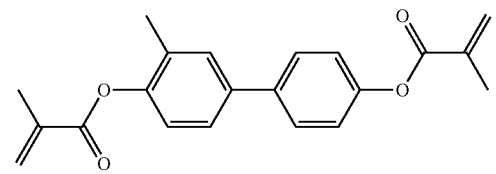
RM-47
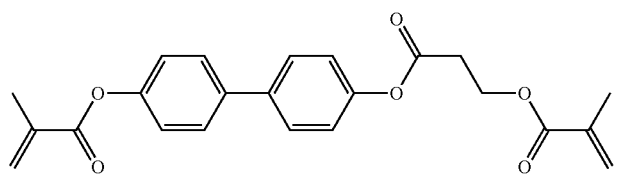
RM-48
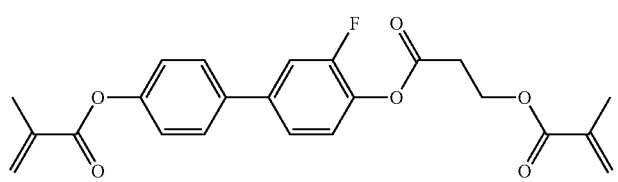 [SMILES: C=C(C)C(=O)OCCC(=O)Oc1ccc(-c2ccc(OC(=O)C(=C)C)cc2)cc1]
RM-49
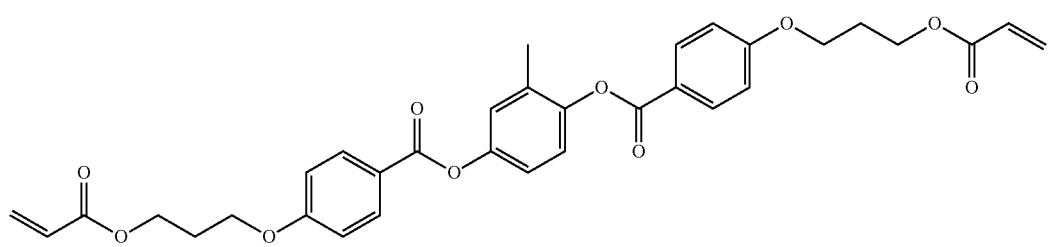 [SMILES: C=CC(=O)OCCCOc1ccc(C(=O)Oc2ccc(OC(=O)c3ccc(OCCCOC(=O)C=C)cc3)c(C)c2)cc1]
RM-50
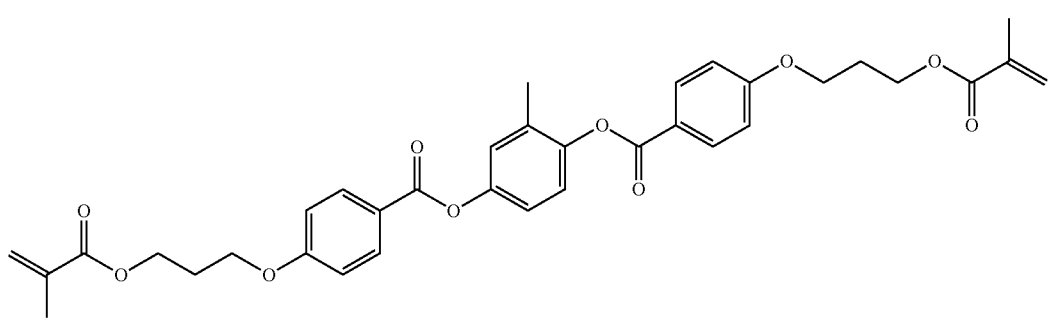 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
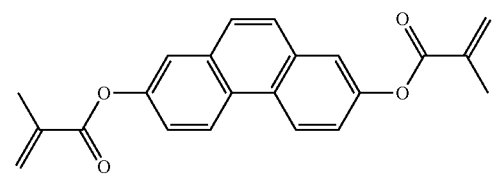
RM-52
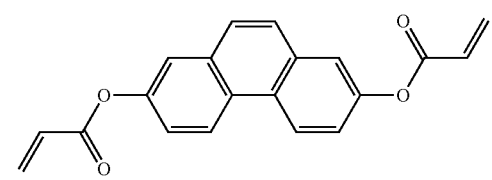 [SMILES: C=CC(=O)Oc1ccc2c(ccc3cc(OC(=O)C=C)ccc32)c1]
RM-53

TABLE D-continued
Table D shows illustrative reactive mesogenic compounds which can be used in the LC media in accordance with the present invention.
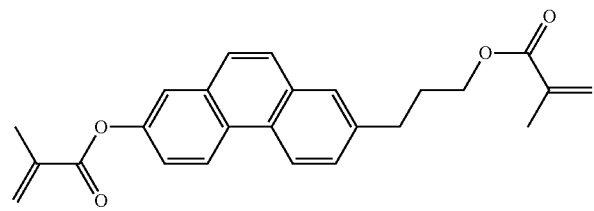 [SMILES: C=C(C)C(=O)OCCCc1ccc2c(ccc3cc(OC(=O)C(=C)C)ccc32)c1]
RM-54
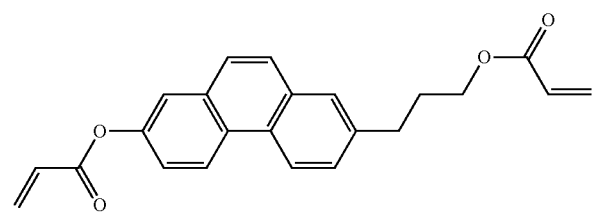 [SMILES: C=CC(=O)OCCCc1ccc2c(ccc3cc(OC(=O)C=C)ccc32)c1]
RM-55
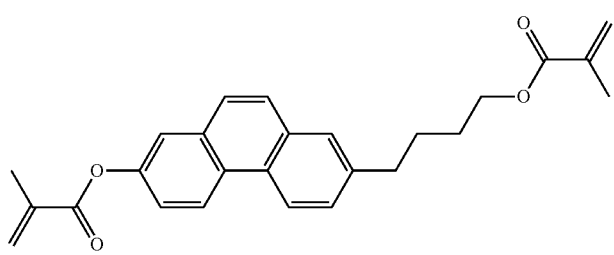 [SMILES: C=C(C)C(=O)OCCCCc1ccc2c(ccc3cc(OC(=O)C(=C)C)ccc32)c1]
RM-56
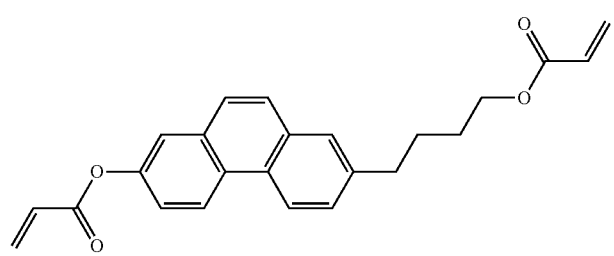 [SMILES: C=CC(=O)OCCCCc1ccc2c(ccc3cc(OC(=O)C=C)ccc32)c1]
RM-57
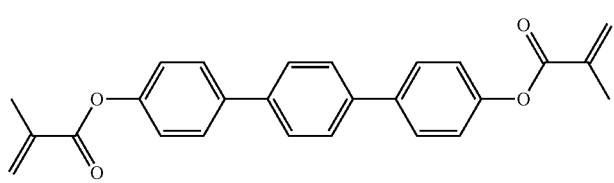
RM-58
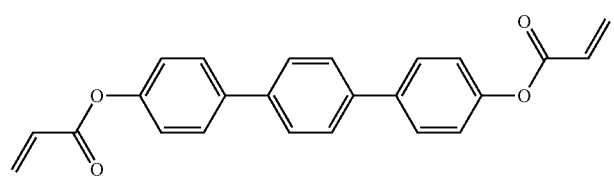 [SMILES: C=CC(=O)Oc1ccc(-c2ccc(-c3ccc(OC(=O)C=C)cc3)cc2)cc1]
RM-59
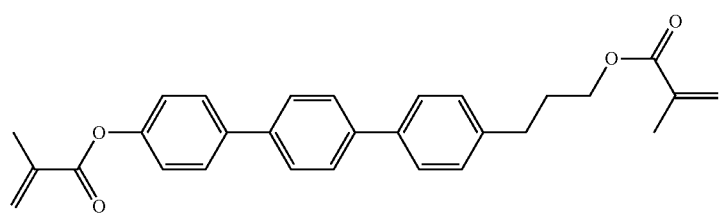 [SMILES: C=C(C)C(=O)OCCCc1ccc(-c2ccc(-c3ccc(OC(=O)C(=C)C)cc3)cc2)cc1]
RM-60

TABLE D-continued
Table D shows illustrative reactive mesogenic compounds which can be used in the LC media in accordance with the present invention.
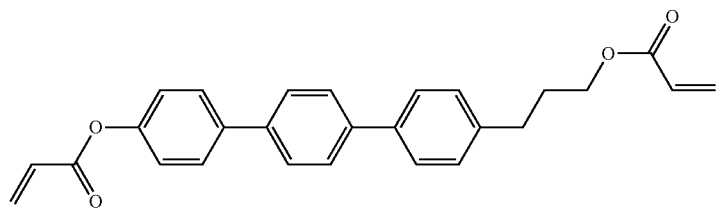 [SMILES: C=CC(=O)OCCCc1ccc(-c2ccc(-c3ccc(OC(=O)C=C)cc3)cc2)cc1] RM-61
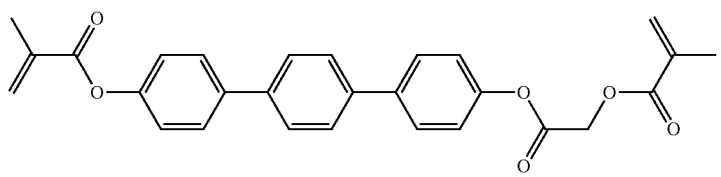 [SMILES: C=C(C)C(=O)OCC(=O)Oc1ccc(-c2ccc(-c3ccc(OC(=O)C(=C)C)cc3)cc2)cc1] RM-62
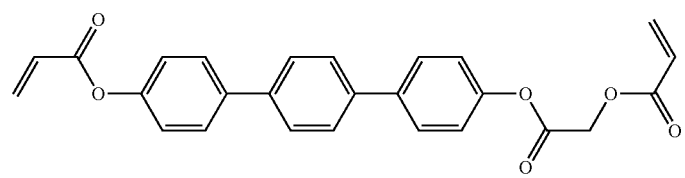 [SMILES: C=CC(=O)OCC(=O)Oc1ccc(-c2ccc(-c3ccc(OC(=O)C=C)cc3)cc2)cc1] RM-63
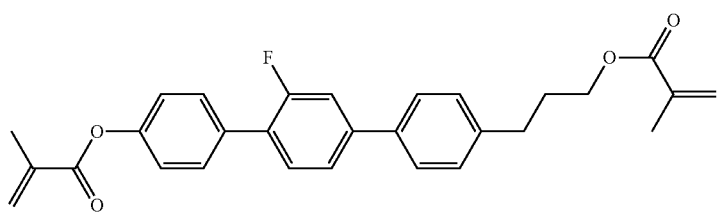 [SMILES: C=C(C)C(=O)OCCCc1ccc(-c2ccc(-c3ccc(OC(=O)C(=C)C)cc3)c(F)c2)cc1] RM-64
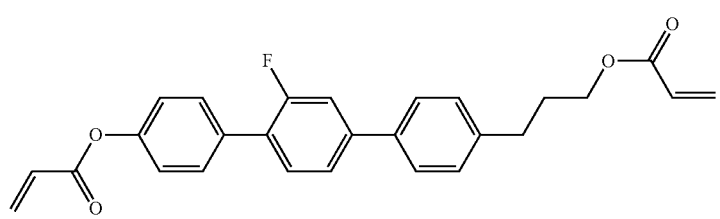 RM-65
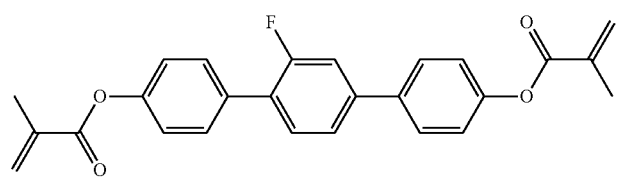 RM-66
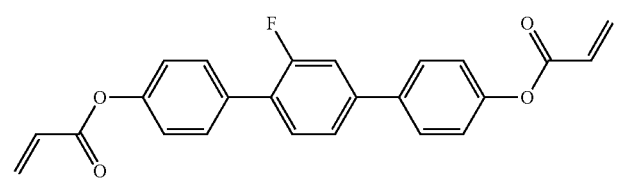 [SMILES: C=CC(=O)Oc1ccc(-c2ccc(-c3ccc(OC(=O)C=C)cc3)c(F)c2)cc1] RM-67
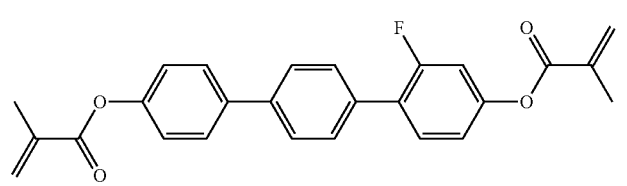 [SMILES: C=C(C)C(=O)Oc1ccc(-c2ccc(-c3ccc(OC(=O)C(=C)C)cc3F)cc2)cc1] RM-68

TABLE D-continued
Table D shows illustrative reactive mesogenic compounds which can be used in the LC media in accordance with the present invention.
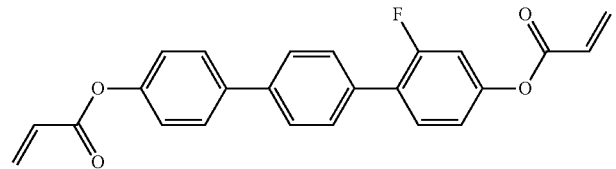 [SMILES: C=CC(=O)Oc1ccc(-c2ccc(-c3ccc(OC(=O)C=C)cc3F)cc2)cc1] RM-69
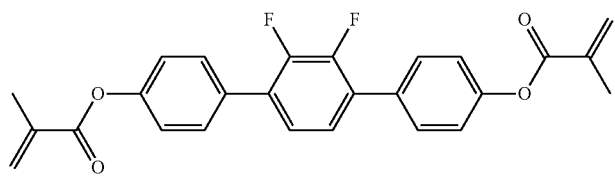 RM-70
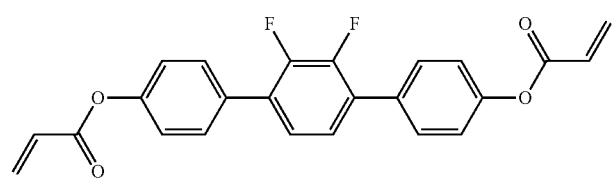 RM-71
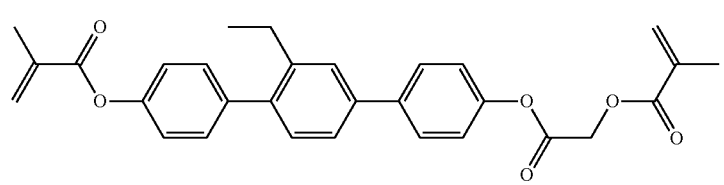 [SMILES: C=C(C)C(=O)OCC(=O)Oc1ccc(-c2ccc(-c3ccc(OC(=O)C(=C)C)cc3)c(CC)c2)cc1] RM-72
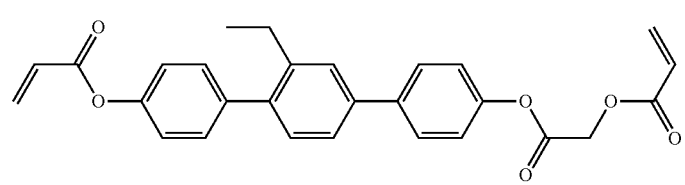 [SMILES: C=CC(=O)OCC(=O)Oc1ccc(-c2ccc(-c3ccc(OC(=O)C=C)cc3)c(CC)c2)cc1] RM-73
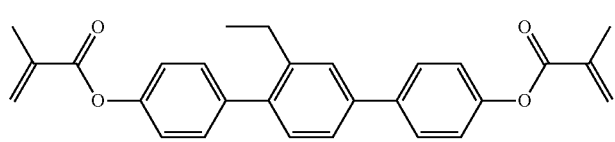 RM-74
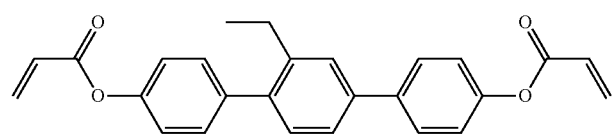 [SMILES: C=CC(=O)Oc1ccc(-c2ccc(-c3ccc(OC(=O)C=C)cc3)c(CC)c2)cc1] RM-75
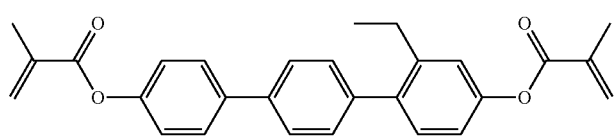 RM-76
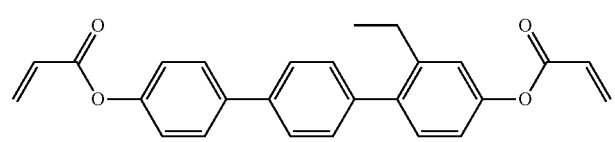 [SMILES: C=CC(=O)Oc1ccc(-c2ccc(-c3ccc(OC(=O)C=C)cc3CC)cc2)cc1] RM-77

TABLE D-continued
Table D shows illustrative reactive mesogenic compounds which can be used in the LC media in accordance with the present invention.
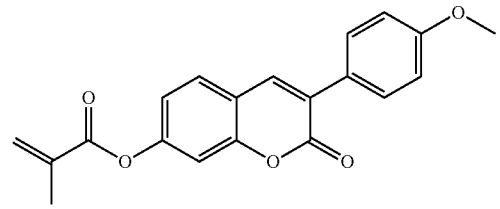 [SMILES: C=C(C)C(=O)Oc1ccc2cc(-c3ccc(OC)cc3)c(=O)oc2c1]
RM-78
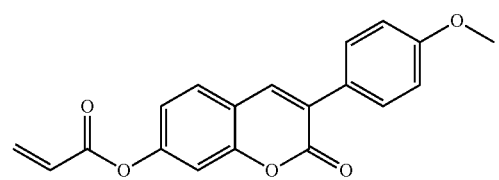 [SMILES: C=CC(=O)Oc1ccc2cc(-c3ccc(OC)cc3)c(=O)oc2c1]
RM-79
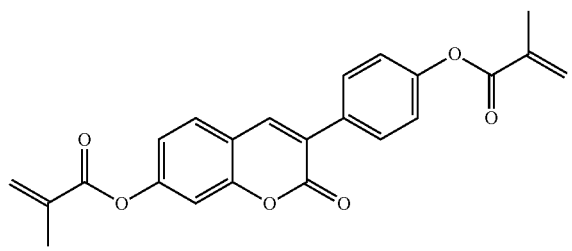 [SMILES: C=C(C)C(=O)Oc1ccc(-c2cc3ccc(OC(=O)C(=C)C)cc3oc2=O)cc1]
RM-80
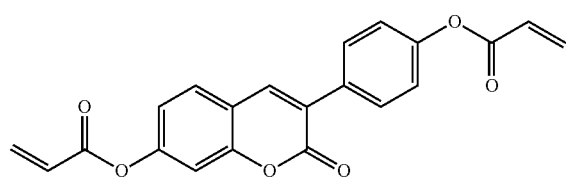 [SMILES: C=CC(=O)Oc1ccc(-c2cc3ccc(OC(=O)C=C)cc3oc2=O)cc1]
RM-81
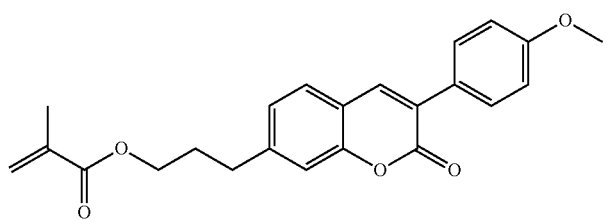 [SMILES: C=C(C)C(=O)OCCCc1ccc2cc(-c3ccc(OC)cc3)c(=O)oc2c1]
RM-82
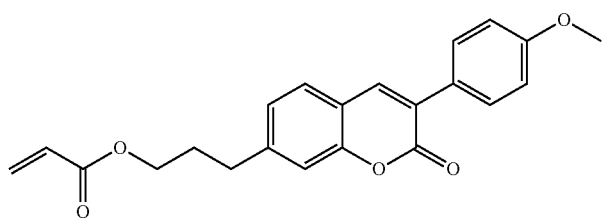 [SMILES: C=CC(=O)OCCCc1ccc2cc(-c3ccc(OC)cc3)c(=O)oc2c1]
RM-83
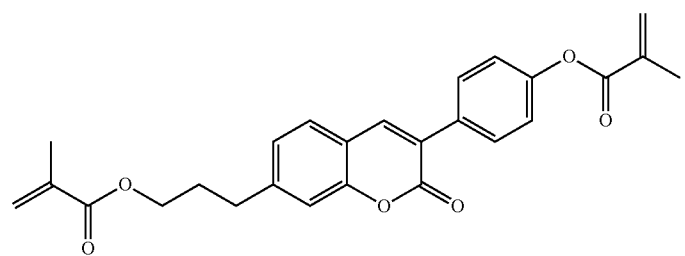 [SMILES: C=C(C)C(=O)OCCCc1ccc2cc(-c3ccc(OC(=O)C(=C)C)cc3)c(=O)oc2c1]
RM-84

TABLE D-continued
Table D shows illustrative reactive mesogenic compounds which can be used in the LC media in accordance with the present invention.
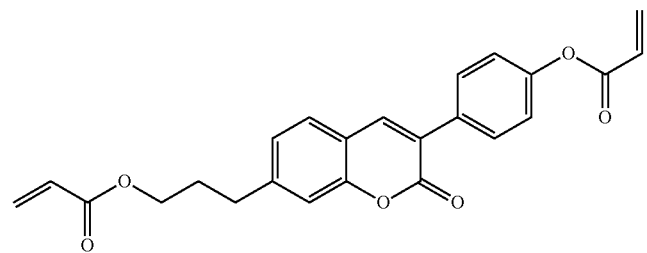 [SMILES: C=CC(=O)OCCCc1ccc2cc(-c3ccc(OC(=O)C=C)cc3)c(=O)oc2c1] RM-85
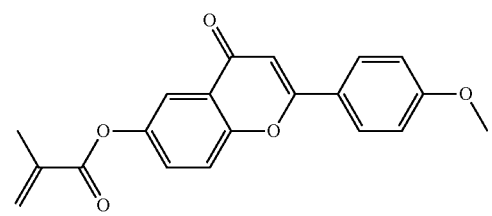 [SMILES: C=C(C)C(=O)Oc1ccc2oc(-c3ccc(OC)cc3)cc(=O)c2c1] RM-86
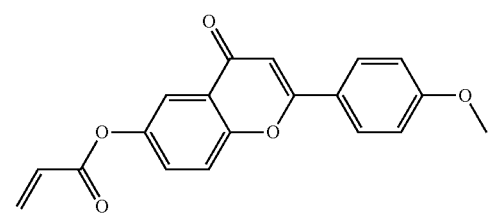 [SMILES: C=CC(=O)Oc1ccc2oc(-c3ccc(OC)cc3)cc(=O)c2c1] RM-87
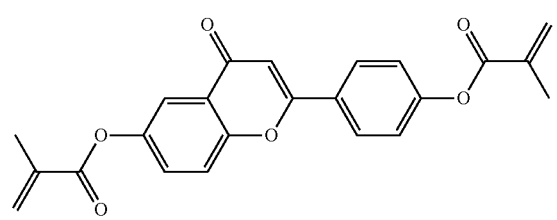 [SMILES: C=C(C)C(=O)Oc1ccc(-c2cc(=O)c3cc(OC(=O)C(=C)C)ccc3o2)cc1] RM-88
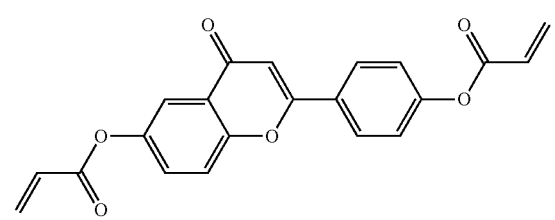 [SMILES: C=CC(=O)Oc1ccc(-c2cc(=O)c3cc(OC(=O)C=C)ccc3o2)cc1] RM-89
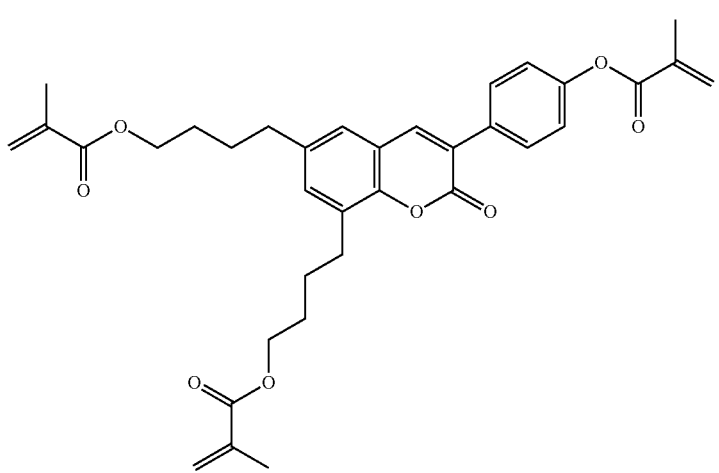 [SMILES: C=C(C)C(=O)OCCCCc1cc(CCCCOC(=O)C(=C)C)c2oc(=O)c(-c3ccc(OC(=O)C(=C)C)cc3)cc2c1] RM-90

TABLE D-continued
Table D shows illustrative reactive mesogenic compounds which can be used in the LC media in accordance with the present invention.
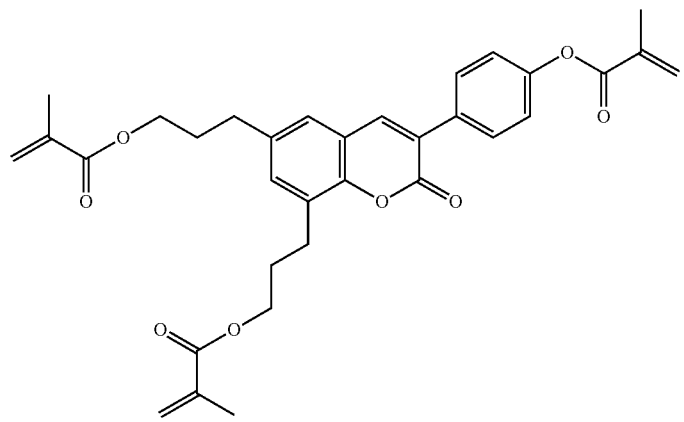 [SMILES: C=C(C)C(=O)OCCCc1cc(CCCOC(=O)C(=C)C)c2oc(=O)c(-c3ccc(OC(=O)C(=C)C)cc3)cc2c1]
RM-91
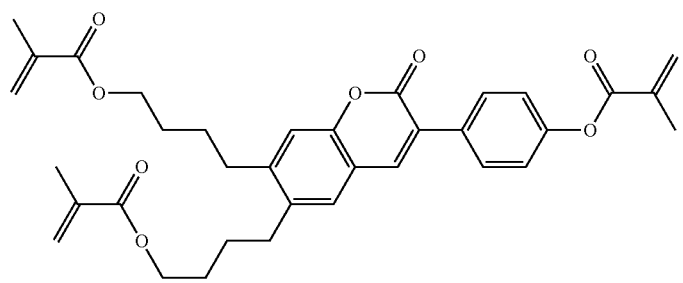 [SMILES: C=C(C)C(=O)OCCCCc1cc2cc(-c3ccc(OC(=O)C(=C)C)cc3)c(=O)oc2cc1CCCCOC(=O)C(=C)C]
RM-92
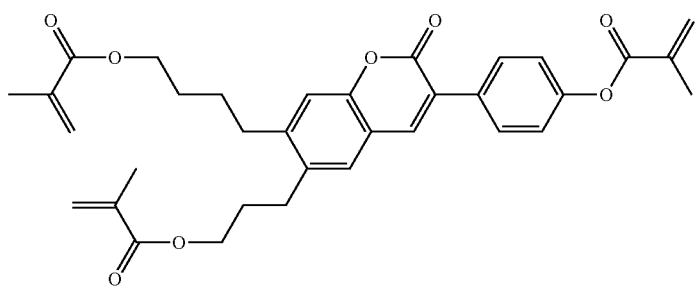 [SMILES: C=C(C)C(=O)OCCCCc1cc2oc(=O)c(-c3ccc(OC(=O)C(=C)C)cc3)cc2cc1CCCOC(=O)C(=C)C]
RM-93
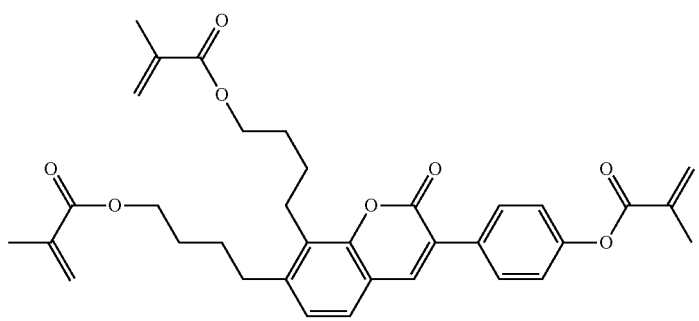 [SMILES: C=C(C)C(=O)OCCCCc1ccc2cc(-c3ccc(OC(=O)C(=C)C)cc3)c(=O)oc2c1CCCCOC(=O)C(=C)C]
RM-94
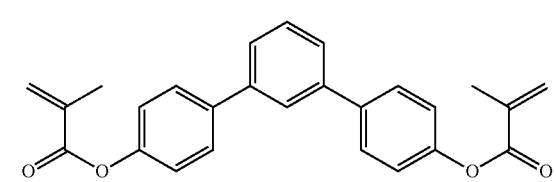 [SMILES: C=C(C)C(=O)Oc1ccc(-c2cccc(-c3ccc(OC(=O)C(=C)C)cc3)c2)cc1]
RM-95

TABLE D-continued
Table D shows illustrative reactive mesogenic compounds which can be used in the LC media in accordance with the present invention.
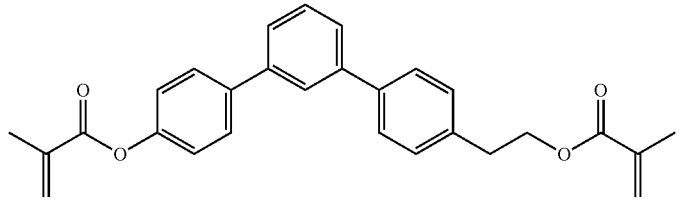 [SMILES: C=C(C)C(=O)OCCc1ccc(-c2cccc(-c3ccc(OC(=O)C(=C)C)cc3)c2)cc1]
RM-96
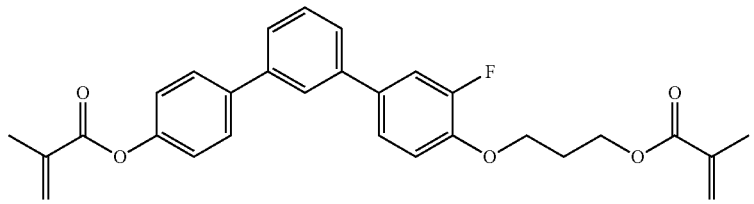 [SMILES: C=C(C)C(=O)OCCCOc1ccc(-c2cccc(-c3ccc(OC(=O)C(=C)C)cc3)c2)cc1F]
RM-97
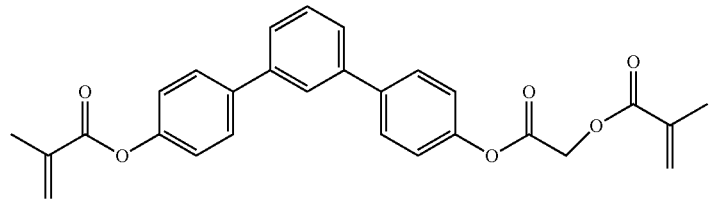 [SMILES: C=C(C)C(=O)OCC(=O)Oc1ccc(-c2cccc(-c3ccc(OC(=O)C(=C)C)cc3)c2)cc1]
RM-98
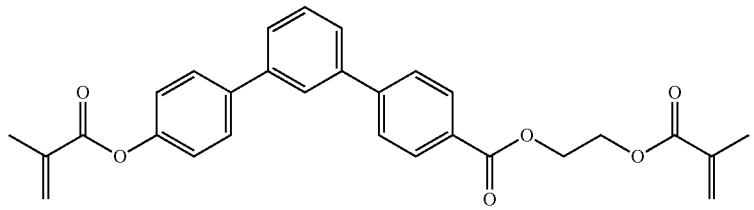 [SMILES: C=C(C)C(=O)OCCOC(=O)c1ccc(-c2cccc(-c3ccc(OC(=O)C(=C)C)cc3)c2)cc1]
RM-99
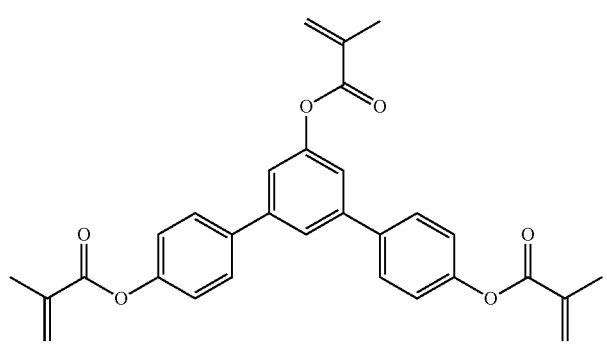 [SMILES: C=C(C)C(=O)Oc1ccc(-c2cc(OC(=O)C(=C)C)cc(-c3ccc(OC(=O)C(=C)C)cc3)c2)cc1]
RM-100
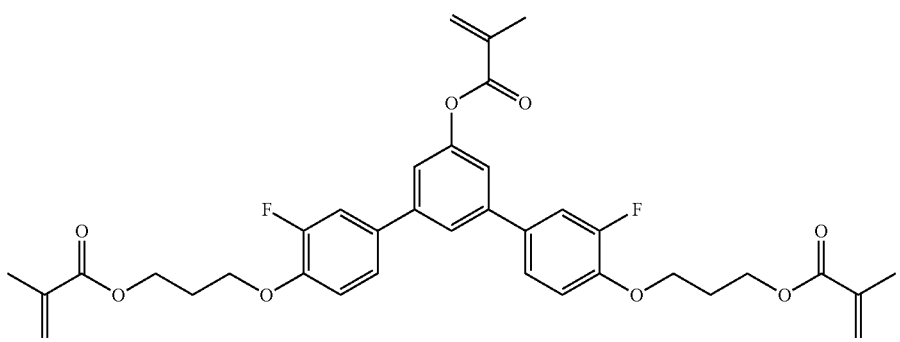 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101

TABLE D-continued
Table D shows illustrative reactive mesogenic compounds which can be used in the LC media in accordance with the present invention.
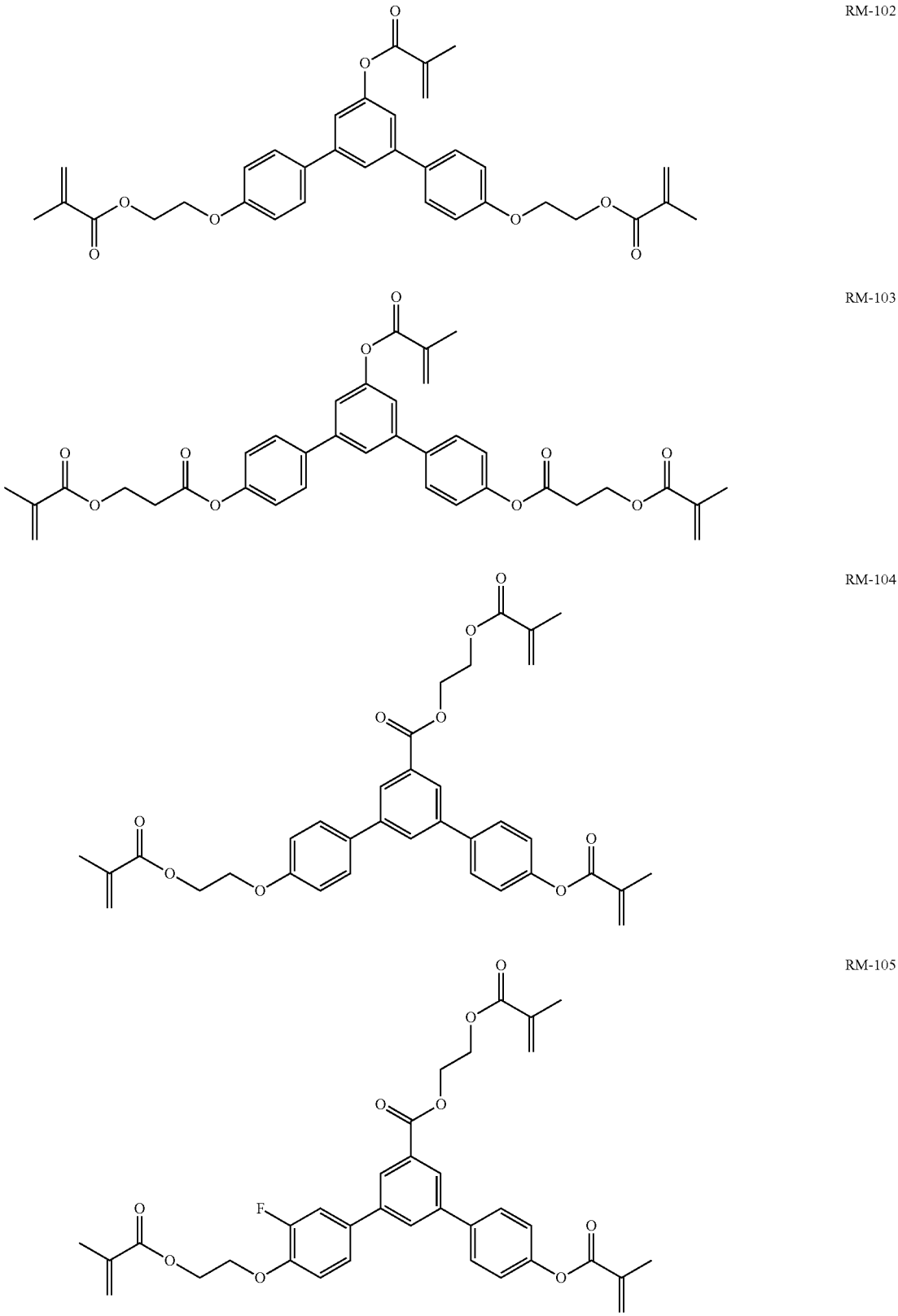
RM-102
RM-103
RM-104
RM-105

TABLE D-continued
Table D shows illustrative reactive mesogenic compounds which can be used in the LC media in accordance with the present invention.
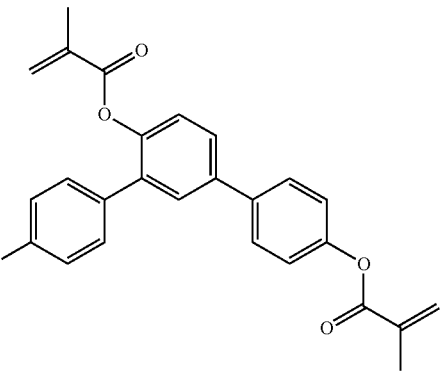
RM-106
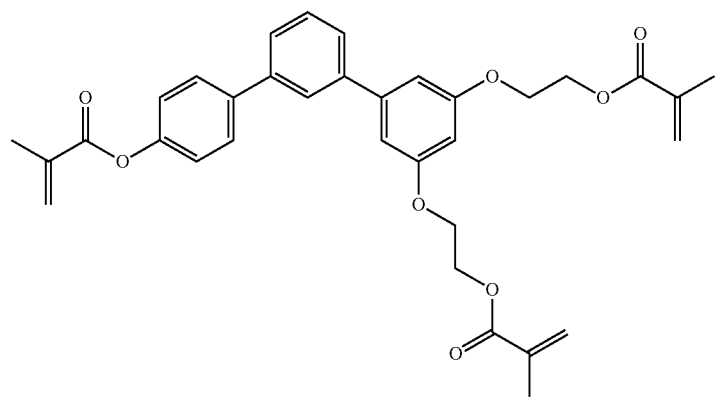 [SMILES: C=C(C)C(=O)OCCOc1cc(OCCOC(=O)C(=C)C)cc(-c2cccc(-c3ccc(OC(=O)C(=C)C)cc3)c2)c1]
RM-107
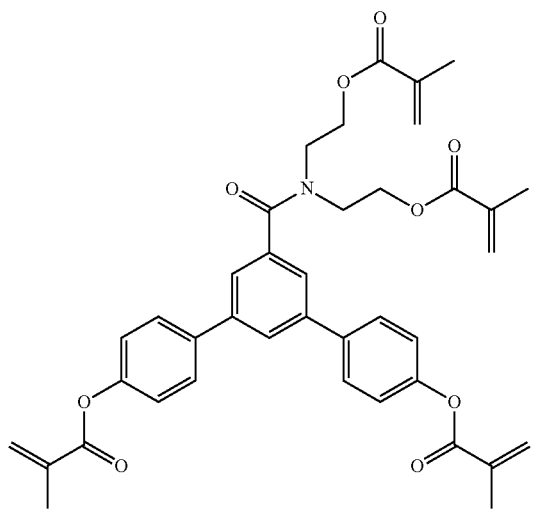 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
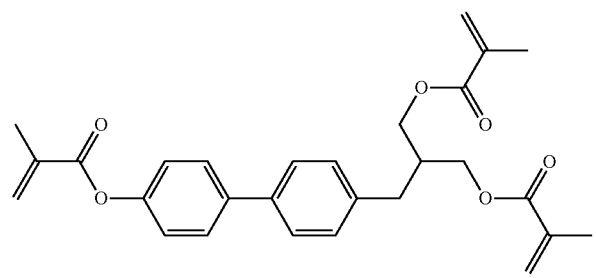 [SMILES: C=C(C)C(=O)OCC(COC(=O)C(=C)C)Cc1ccc(-c2ccc(OC(=O)C(=C)C)cc2)cc1]
RM-109

TABLE D-continued
Table D shows illustrative reactive mesogenic compounds which can be used in the LC media in accordance with the present invention.
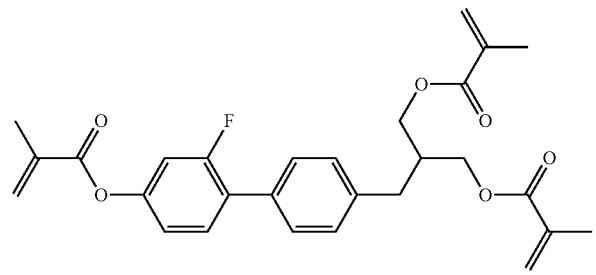 [SMILES: C=C(C)C(=O)OCC(COC(=O)C(=C)C)Cc1ccc(-c2ccc(OC(=O)C(=C)C)cc2F)cc1]
RM-110
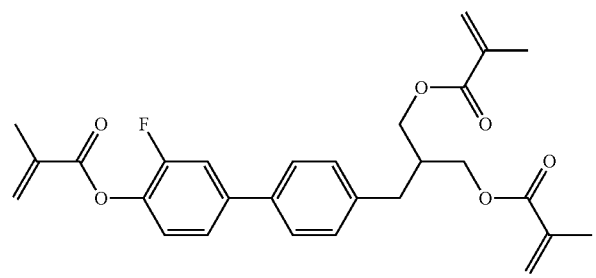 [SMILES: C=C(C)C(=O)OCC(COC(=O)C(=C)C)Cc1ccc(-c2ccc(OC(=O)C(=C)C)c(F)c2)cc1]
RM-111
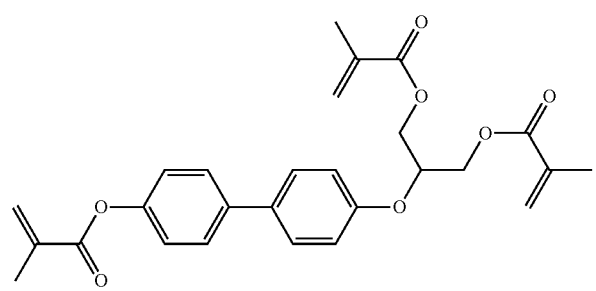 [SMILES: C=C(C)C(=O)OCC(COC(=O)C(=C)C)Oc1ccc(-c2ccc(OC(=O)C(=C)C)cc2)cc1]
RM-112
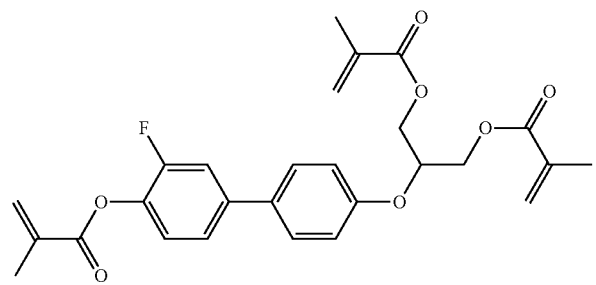 [SMILES: C=C(C)C(=O)OCC(COC(=O)C(=C)C)Oc1ccc(-c2ccc(OC(=O)C(=C)C)c(F)c2)cc1]
RM-113
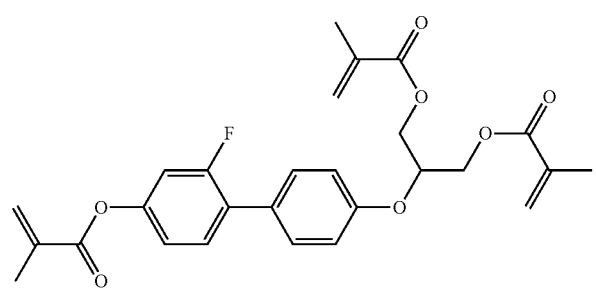 [SMILES: C=C(C)C(=O)OCC(COC(=O)C(=C)C)Oc1ccc(-c2ccc(OC(=O)C(=C)C)cc2F)cc1]
RM-114

TABLE D-continued
Table D shows illustrative reactive mesogenic compounds which can be used in the LC media in accordance with the present invention.
RM-115
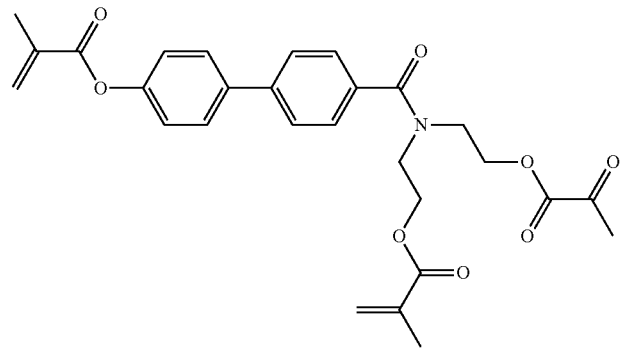 [SMILES: C=C(C)C(=O)OCCN(CCOC(=O)C(C)=O)C(=O)c1ccc(-c2ccc(OC(=O)C(=C)C)cc2)cc1]
RM-116
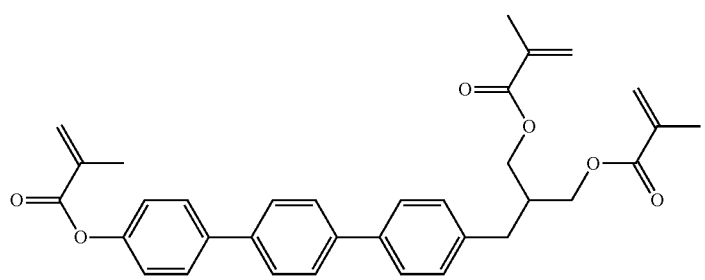 [SMILES: C=C(C)C(=O)OCC(COC(=O)C(=C)C)Cc1ccc(-c2ccc(-c3ccc(OC(=O)C(=C)C)cc3)cc2)cc1]
RM-117
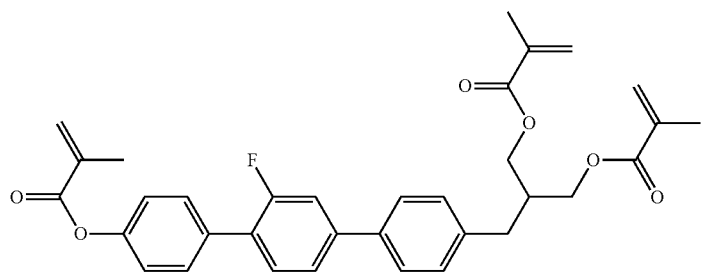 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
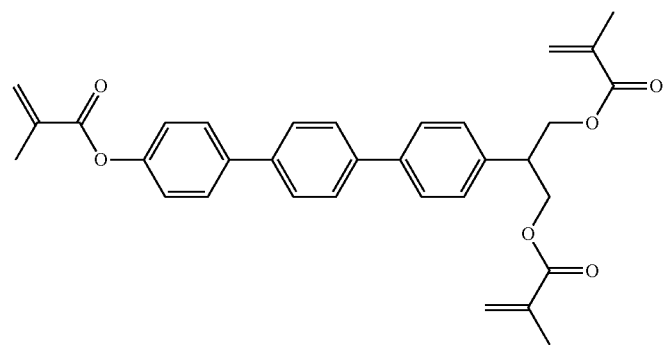 [SMILES: C=C(C)C(=O)OCC(COC(=O)C(=C)C)c1ccc(-c2ccc(-c3ccc(OC(=O)C(=C)C)cc3)cc2)cc1]
RM-119
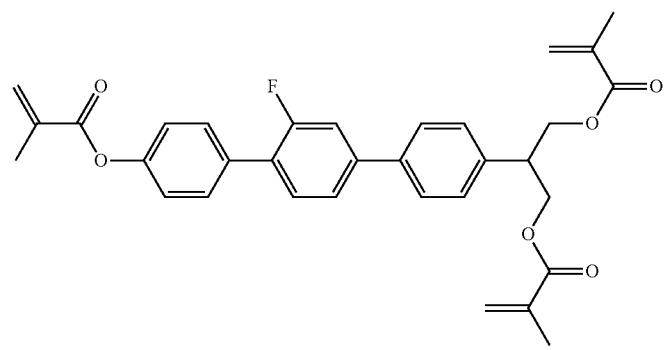 [SMILES: C=C(C)C(=O)OCC(COC(=O)C(=C)C)c1ccc(-c2ccc(-c3ccc(OC(=O)C(=C)C)cc3)c(F)c2)cc1]

TABLE D-continued
Table D shows illustrative reactive mesogenic compounds which can be used in the LC media in accordance with the present invention.
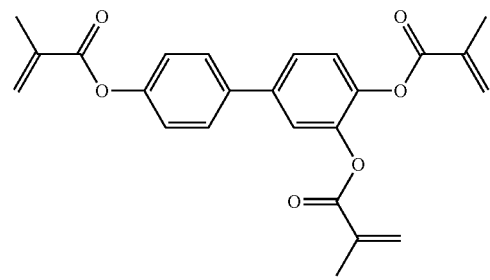 [SMILES: C=C(C)C(=O)Oc1ccc(-c2ccc(OC(=O)C(=C)C)c(OC(=O)C(=C)C)c2)cc1]
RM-120
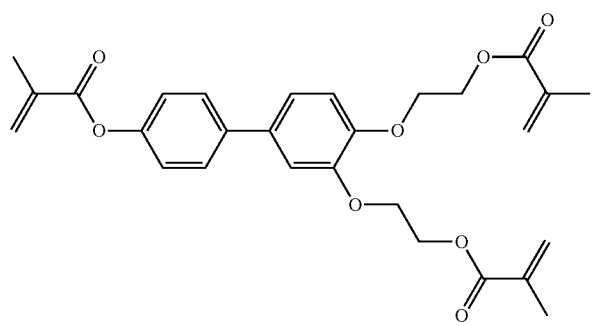 [SMILES: C=C(C)C(=O)OCCOc1ccc(-c2ccc(OC(=O)C(=C)C)cc2)cc1OCCOC(=O)C(=C)C]
RM-121
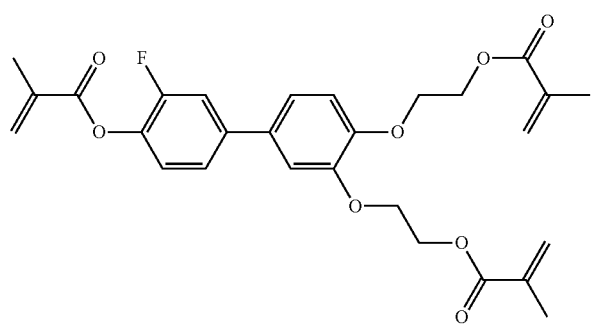 [SMILES: C=C(C)C(=O)OCCOc1ccc(-c2ccc(OC(=O)C(=C)C)c(F)c2)cc1OCCOC(=O)C(=C)C]
RM-122
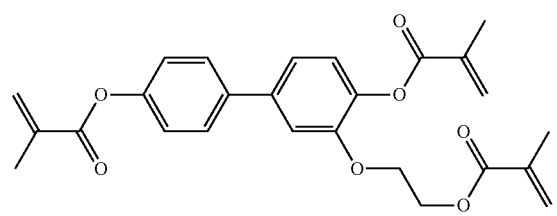 [SMILES: C=C(C)C(=O)OCCOc1cc(-c2ccc(OC(=O)C(=C)C)cc2)ccc1OC(=O)C(=C)C]
RM-123
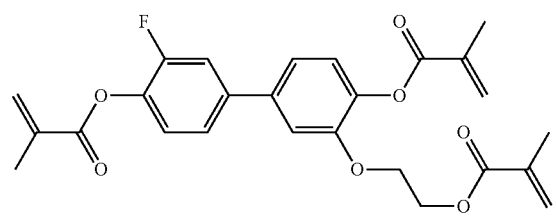 [SMILES: C=C(C)C(=O)OCCOc1cc(-c2ccc(OC(=O)C(=C)C)c(F)c2)ccc1OC(=O)C(=C)C]
RM-124

TABLE D-continued
Table D shows illustrative reactive mesogenic compounds which can be used in the LC media in accordance with the present invention.
RM-125
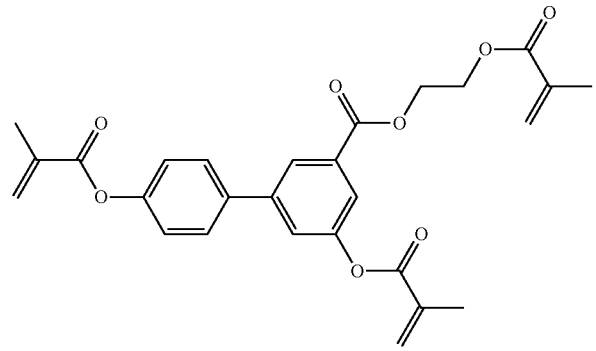 [SMILES: C=C(C)C(=O)OCCOC(=O)c1cc(OC(=O)C(=C)C)cc(-c2ccc(OC(=O)C(=C)C)cc2)c1]
RM-126
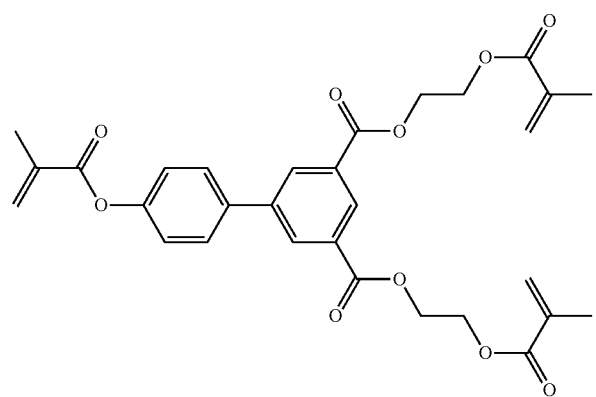 [SMILES: C=C(C)C(=O)OCCOC(=O)c1cc(C(=O)OCCOC(=O)C(=C)C)cc(-c2ccc(OC(=O)C(=C)C)cc2)c1]
RM-127
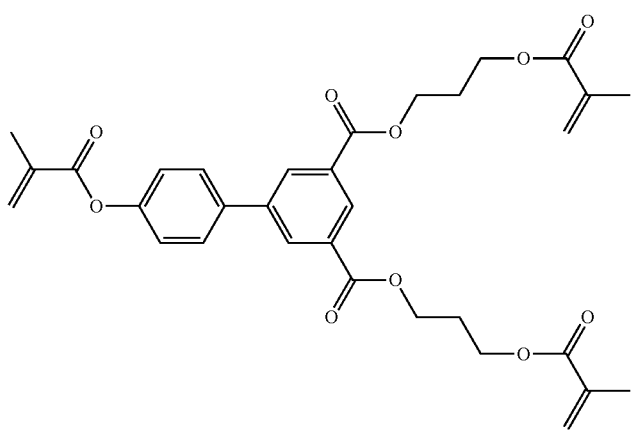 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
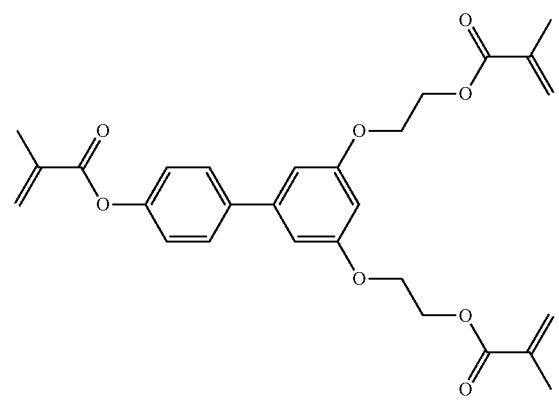 [SMILES: C=C(C)C(=O)OCCOc1cc(OCCOC(=O)C(=C)C)cc(-c2ccc(OC(=O)C(=C)C)cc2)c1]

TABLE D-continued
Table D shows illustrative reactive mesogenic compounds which can be used in the LC media in accordance with the present invention.
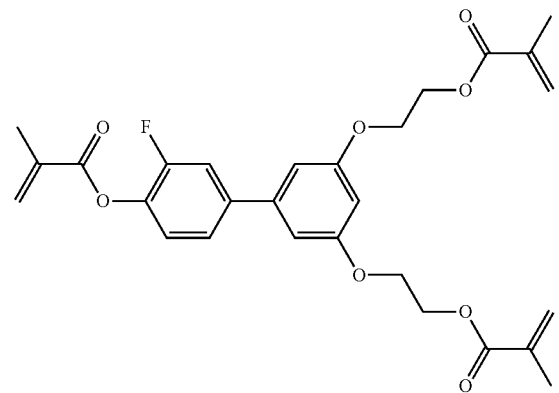 [SMILES: C=C(C)C(=O)OCCOc1cc(OCCOC(=O)C(=C)C)cc(-c2ccc(OC(=O)C(=C)C)c(F)c2)c1]
RM-129
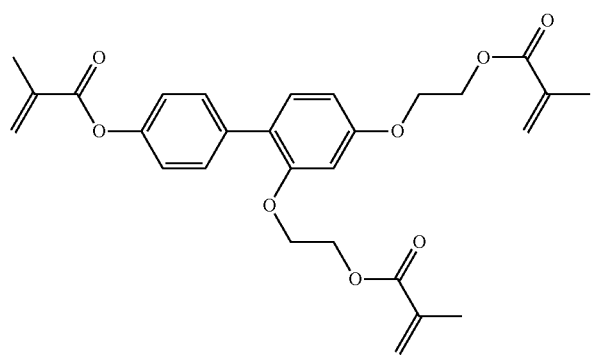 [SMILES: C=C(C)C(=O)OCCOc1ccc(-c2ccc(OC(=O)C(=C)C)cc2)c(OCCOC(=O)C(=C)C)c1]
RM-130
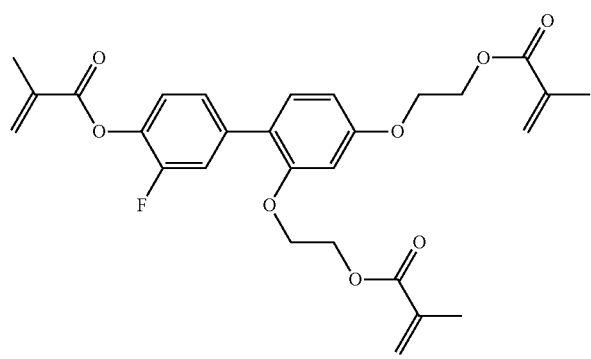 [SMILES: C=C(C)C(=O)OCCOc1ccc(-c2ccc(OC(=O)C(=C)C)c(F)c2)c(OCCOC(=O)C(=C)C)c1]
RM-131
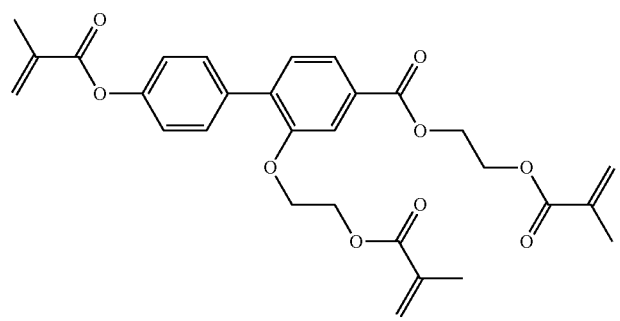 [SMILES: C=C(C)C(=O)OCCOC(=O)c1ccc(-c2ccc(OC(=O)C(=C)C)cc2)c(OCCOC(=O)C(=C)C)c1]
RM-132

TABLE D-continued
Table D shows illustrative reactive mesogenic compounds which can be used in the LC media in accordance with the present invention.
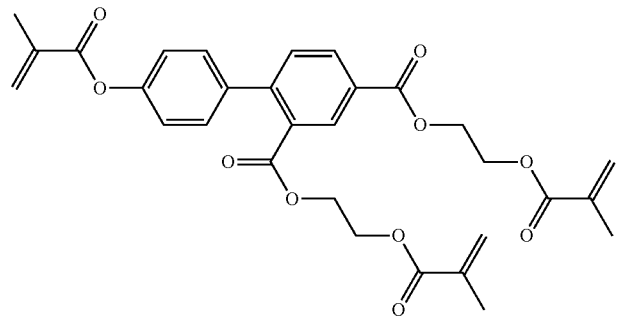 [SMILES: C=C(C)C(=O)OCCOC(=O)c1ccc(-c2ccc(OC(=O)C(=C)C)cc2)c(C(=O)OCCOC(=O)C(=C)C)c1]
RM-133
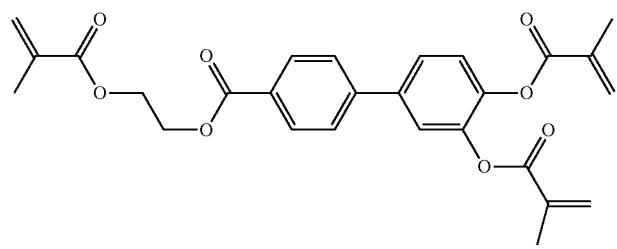 [SMILES: C=C(C)C(=O)OCCOC(=O)c1ccc(-c2ccc(OC(=O)C(=C)C)c(OC(=O)C(=C)C)c2)cc1]
RM-134
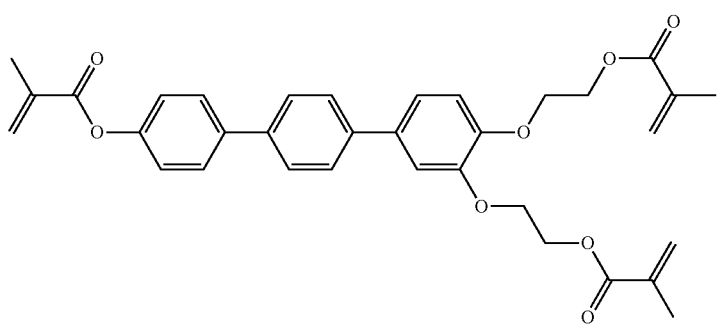 [SMILES: C=C(C)C(=O)OCCOc1ccc(-c2ccc(-c3ccc(OC(=O)C(=C)C)cc3)cc2)cc1OCCOC(=O)C(=C)C]
RM-135
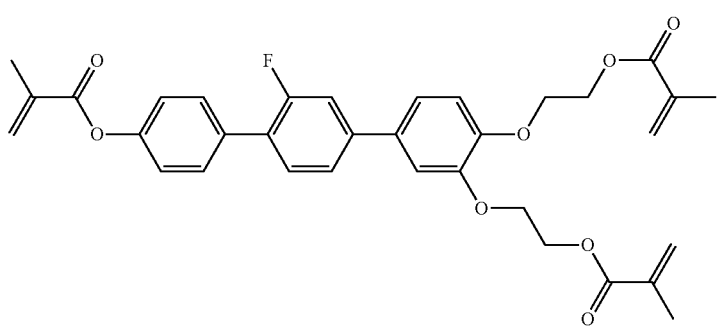 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136
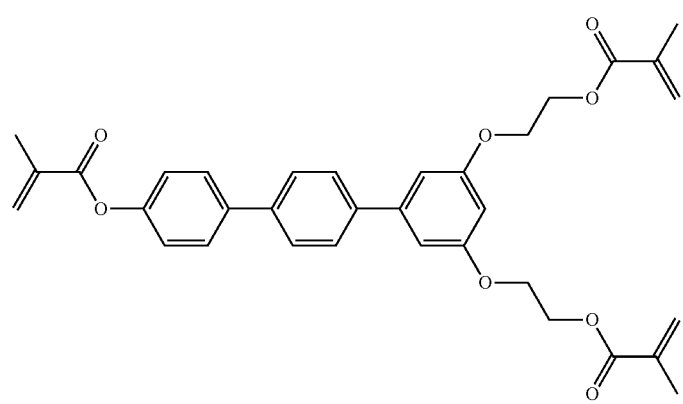 [SMILES: C=C(C)C(=O)OCCOc1cc(OCCOC(=O)C(=C)C)cc(-c2ccc(-c3ccc(OC(=O)C(=C)C)cc3)cc2)c1]
RM-137

TABLE D-continued
Table D shows illustrative reactive mesogenic compounds which can be used in the LC media in accordance with the present invention.
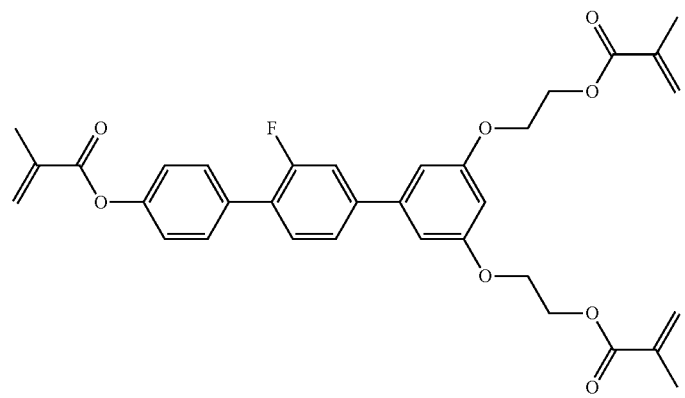 [SMILES: C=C(C)C(=O)OCCOc1cc(OCCOC(=O)C(=C)C)cc(-c2ccc(-c3ccc(OC(=O)C(=C)C)cc3)c(F)c2)c1] RM-138
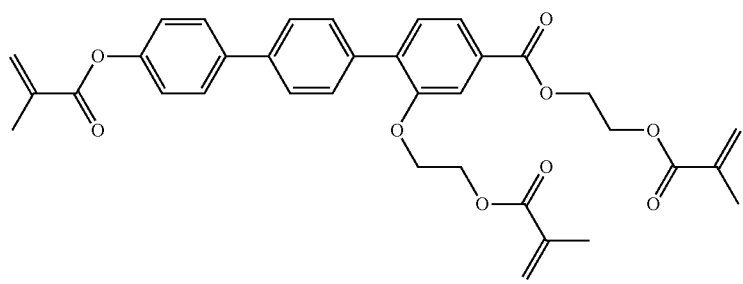 [SMILES: C=C(C)C(=O)OCCOC(=O)c1ccc(-c2ccc(-c3ccc(OC(=O)C(=C)C)cc3)cc2)c(OCCOC(=O)C(=C)C)c1] RM-139
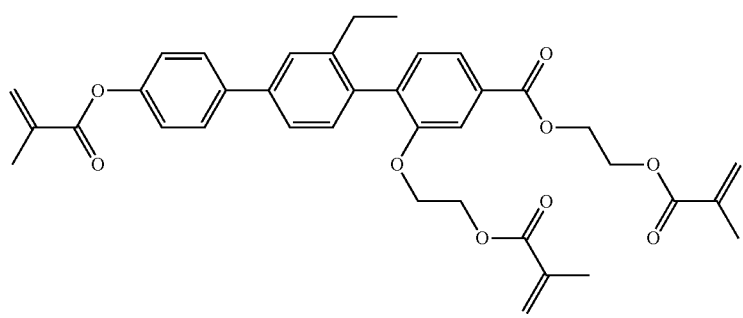 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1] RM-140
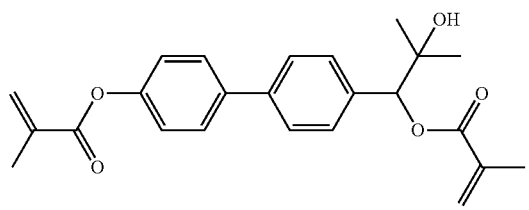 [SMILES: C=C(C)C(=O)Oc1ccc(-c2ccc(C(OC(=O)C(=C)C)C(C)(C)O)cc2)cc1] RM-141
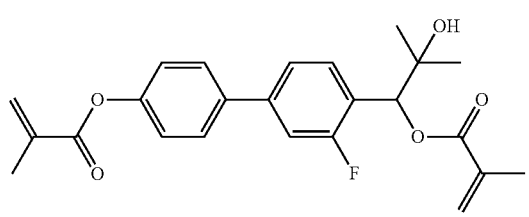 [SMILES: C=C(C)C(=O)Oc1ccc(-c2ccc(C(OC(=O)C(=C)C)C(C)(C)O)c(F)c2)cc1] RM-142

TABLE D-continued

Table D shows illustrative reactive mesogenic compounds which can be used in the LC media in accordance with the present invention.

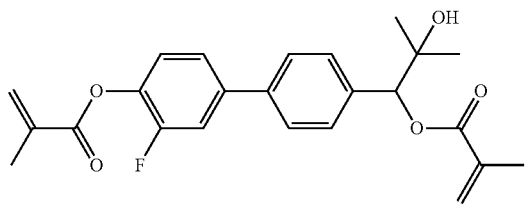 [SMILES: C=C(C)C(=O)Oc1ccc(-c2ccc(C(OC(=O)C(=C)C)C(C)(C)O)cc2)cc1F]

RM-143

In a preferred embodiment, the mixtures according to the invention comprise one or more polymerizable compounds, preferably selected from the polymerizable compounds of the formulae RM-1 to RM-140. Of these, compounds RM-1, RM-4, RM-8, RM-17, RM-19, RM-35, RM-37, RM-39, RM-40, RM-41, RM-48, RM-51, RM-52, RM-54, RM-57, RM-64, RM-74, RM-76, RM-88, RM-91 RM-102, RM-103, RM-109, RM-117, RM-120, RM-121 and RM-122 are particularly preferred.

TABLE E

Table E shows self-alignment additives for vertical alignment which can be used in LC media for SA-VA and SA-FFS displays according to the present invention together with the polymerizable compounds of formula I:

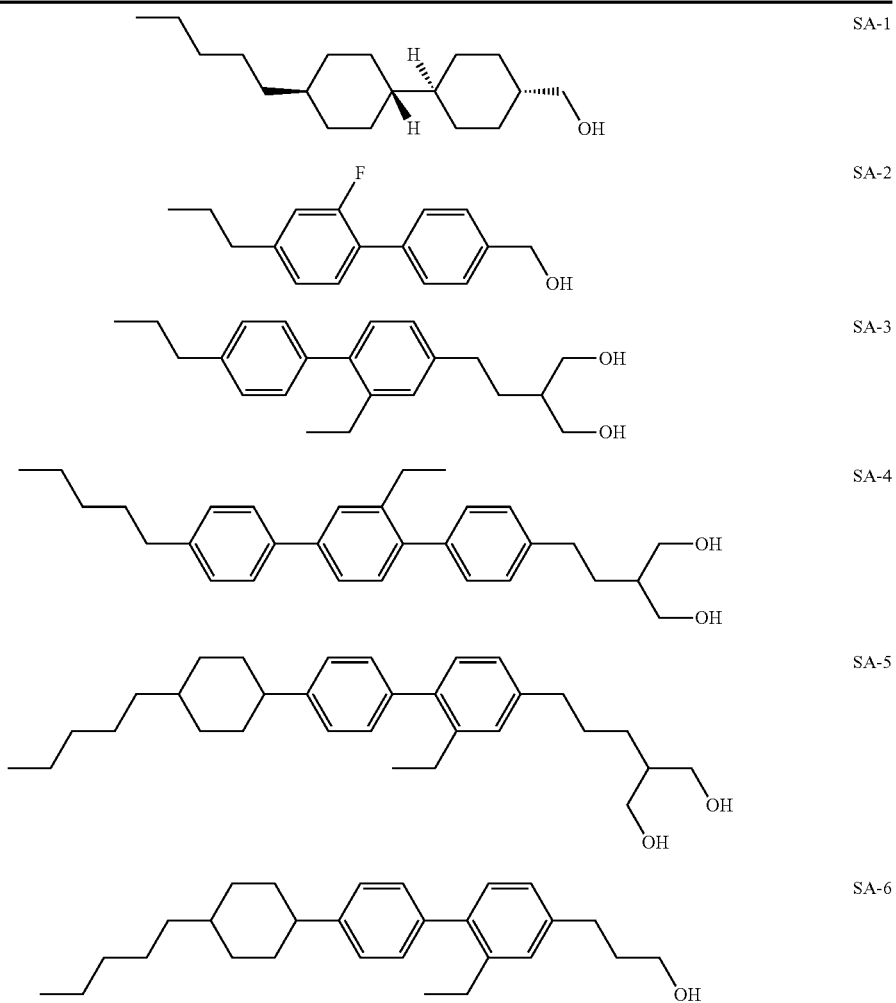

TABLE E-continued
Table E shows self-alignment additives for vertical alignment which can be used in LC media for SA-VA and SA-FFS displays according to the present invention together with the polymerizable compounds of formula I:
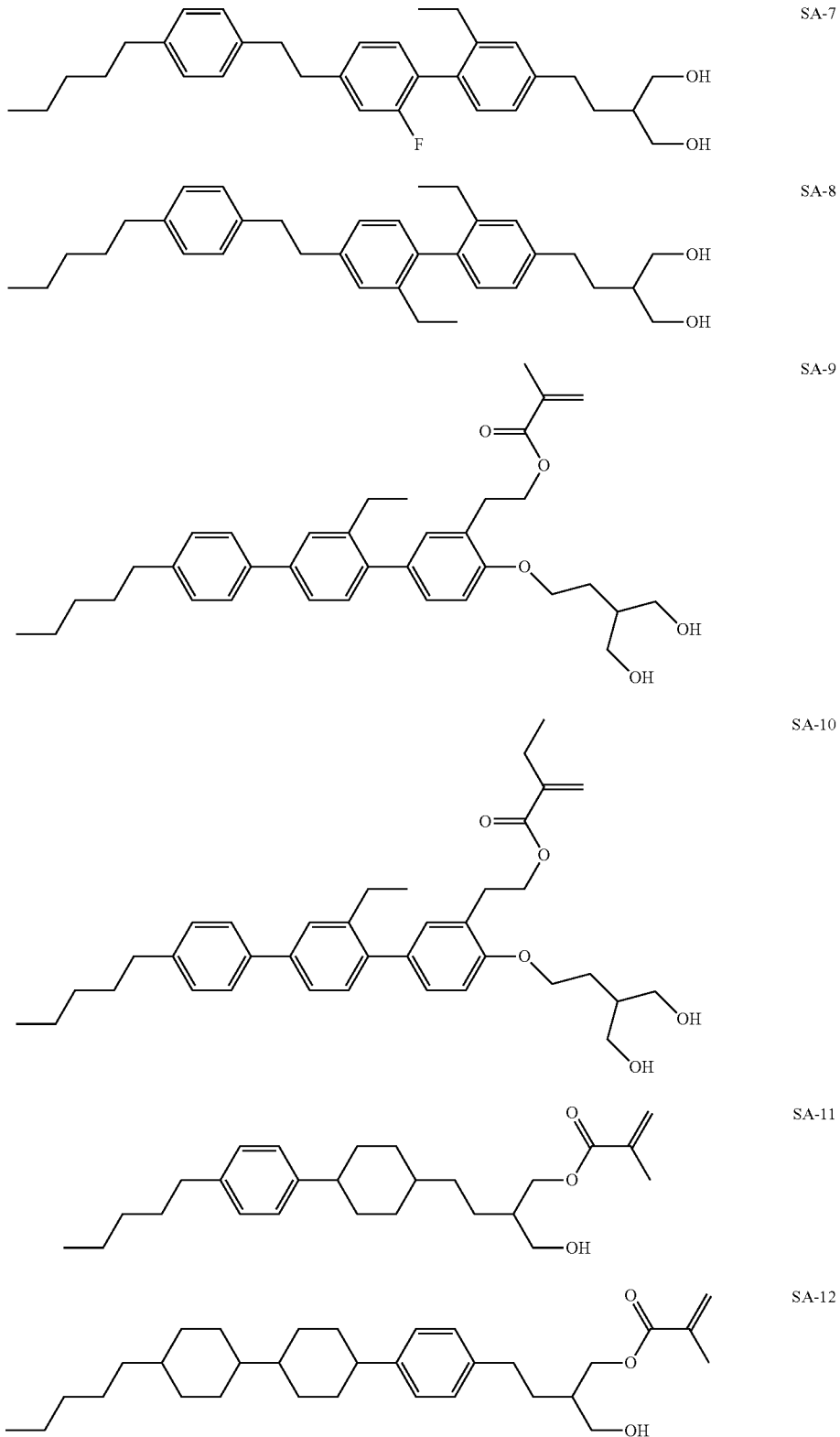
SA-7
SA-8
SA-9
SA-10
SA-11
SA-12

TABLE E-continued
Table E shows self-alignment additives for vertical alignment which can be used in LC media for SA-VA and SA-FFS displays according to the present invention together with the polymerizable compounds of formula I:
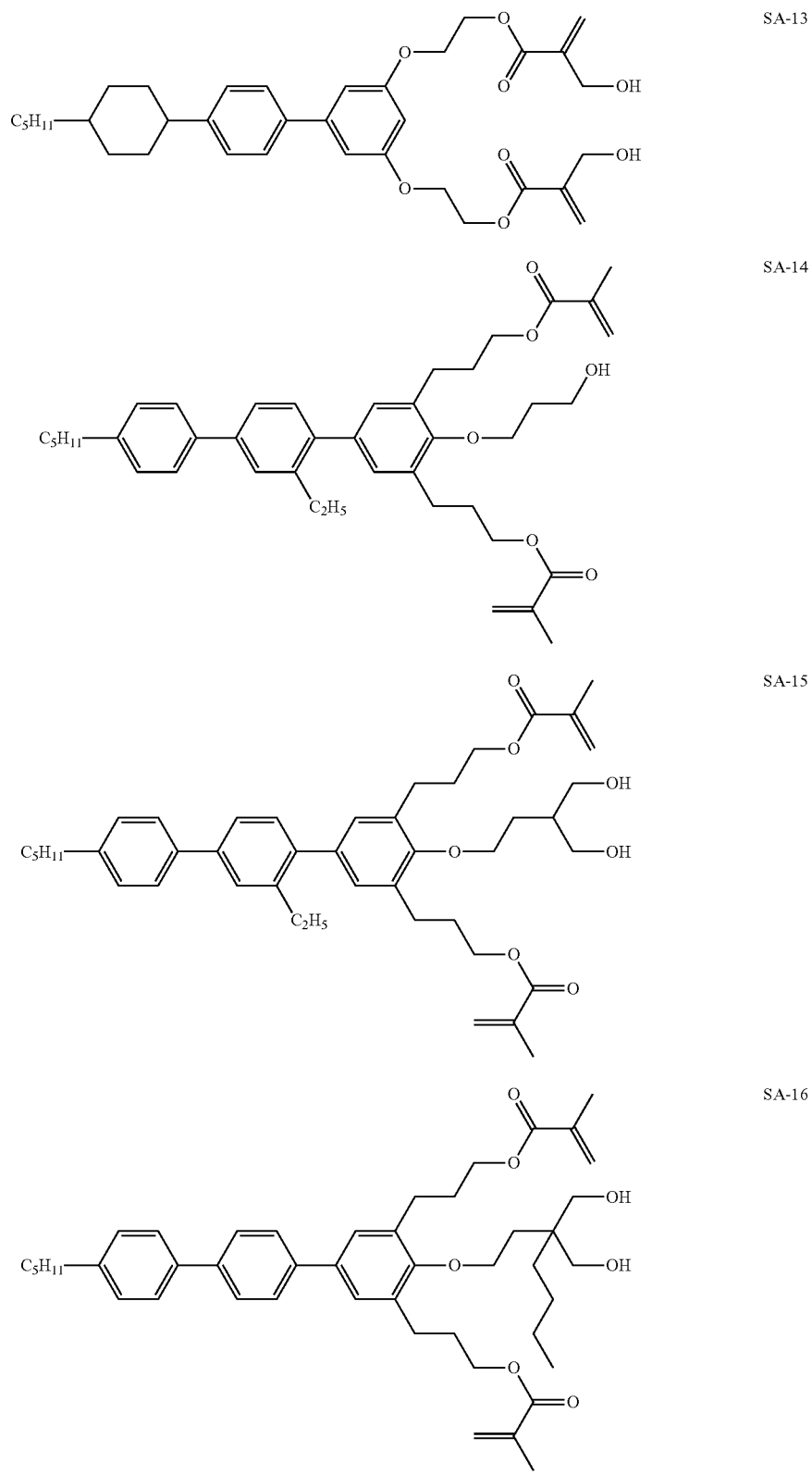
SA-13
SA-14
SA-15
SA-16

TABLE E-continued
Table E shows self-alignment additives for vertical alignment which can be used in LC media for SA-VA and SA-FFS displays according to the present invention together with the polymerizable compounds of formula I:
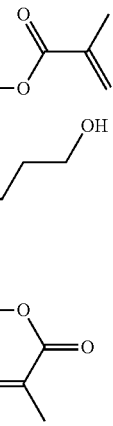
SA-17
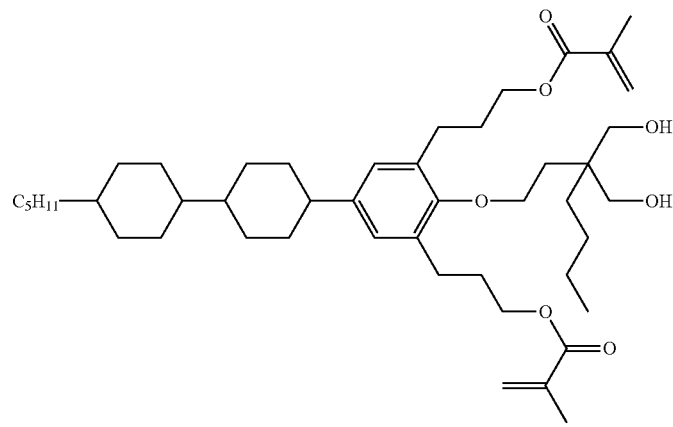
SA-18
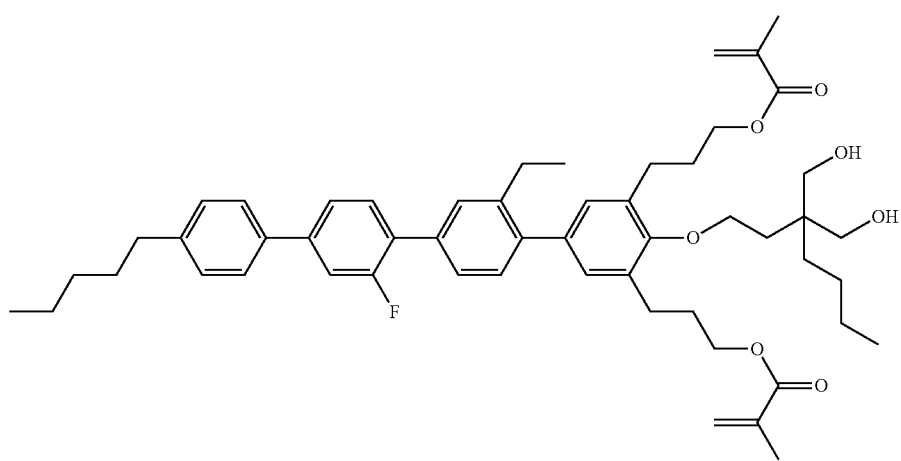 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-19

TABLE E-continued
Table E shows self-alignment additives for vertical alignment which can be used in LC media for SA-VA and SA-FFS displays according to the present invention together with the polymerizable compounds of formula I:
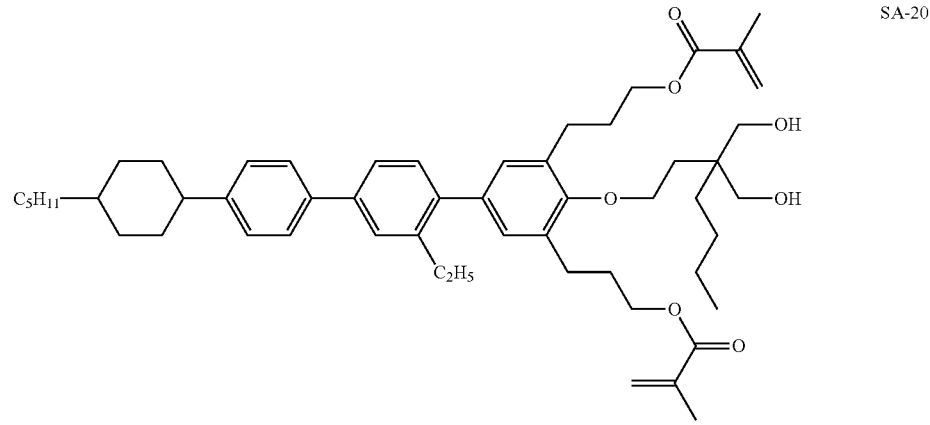
SA-20
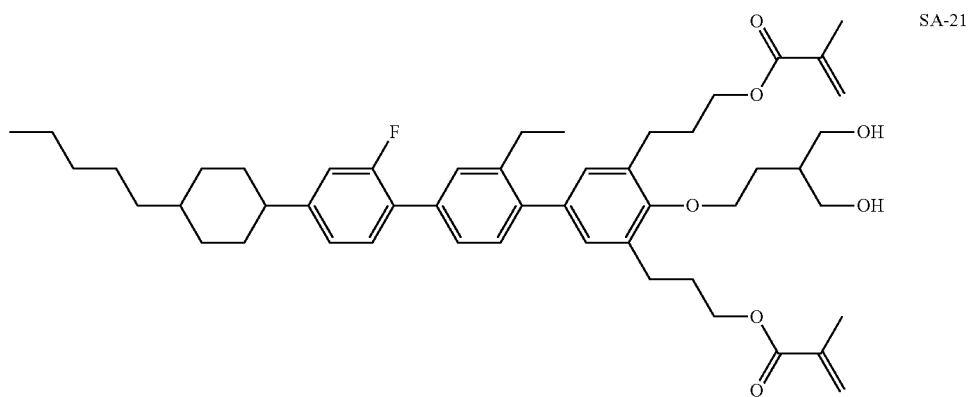
SA-21
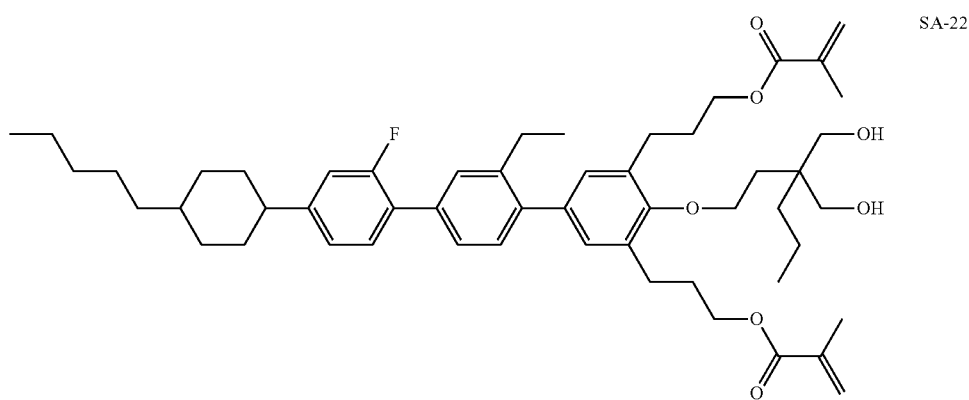
SA-22

TABLE E-continued
Table E shows self-alignment additives for vertical alignment which can be used in LC media for SA-VA and SA-FFS displays according to the present invention together with the polymerizable compounds of formula I:
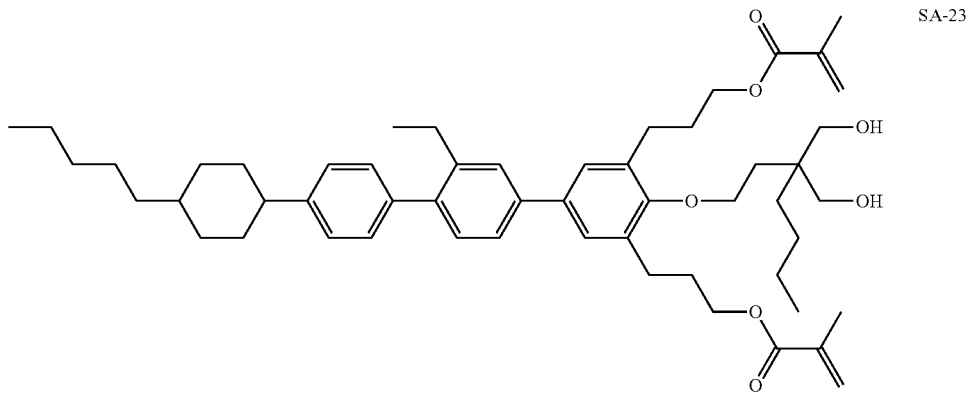
SA-23
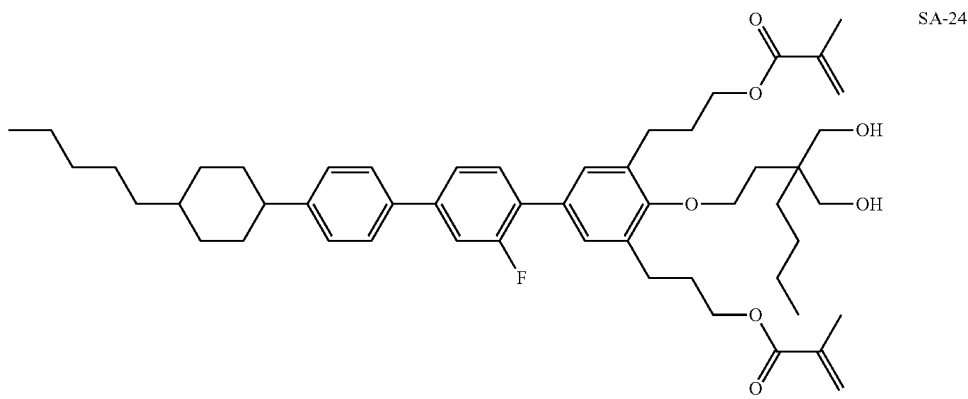
SA-24
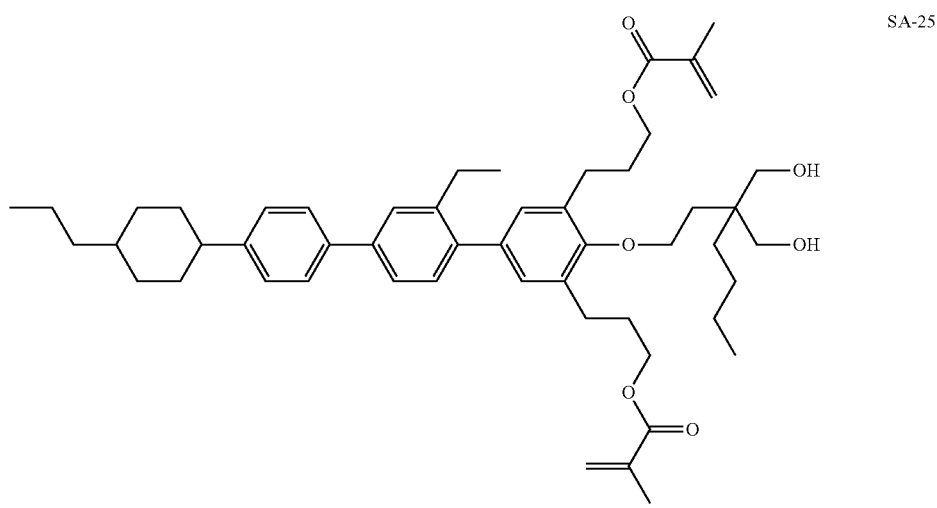
SA-25

TABLE E-continued
Table E shows self-alignment additives for vertical alignment which can be used in LC media for SA-VA and SA-FFS displays according to the present invention together with the polymerizable compounds of formula I:
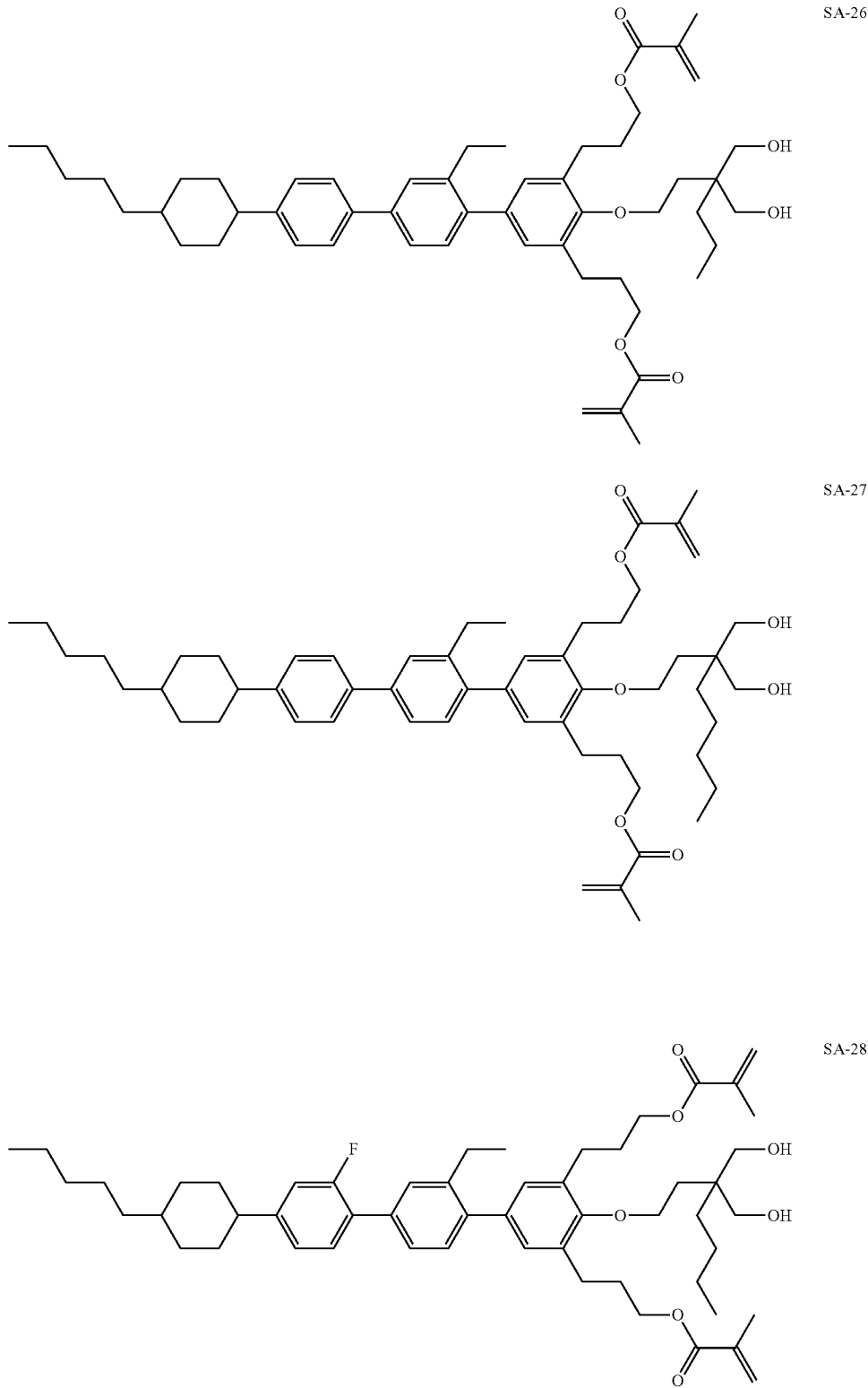
SA-26
SA-27
SA-28

TABLE E-continued
Table E shows self-alignment additives for vertical alignment which can be used in LC media for SA-VA and SA-FFS displays according to the present invention together with the polymerizable compounds of formula I:
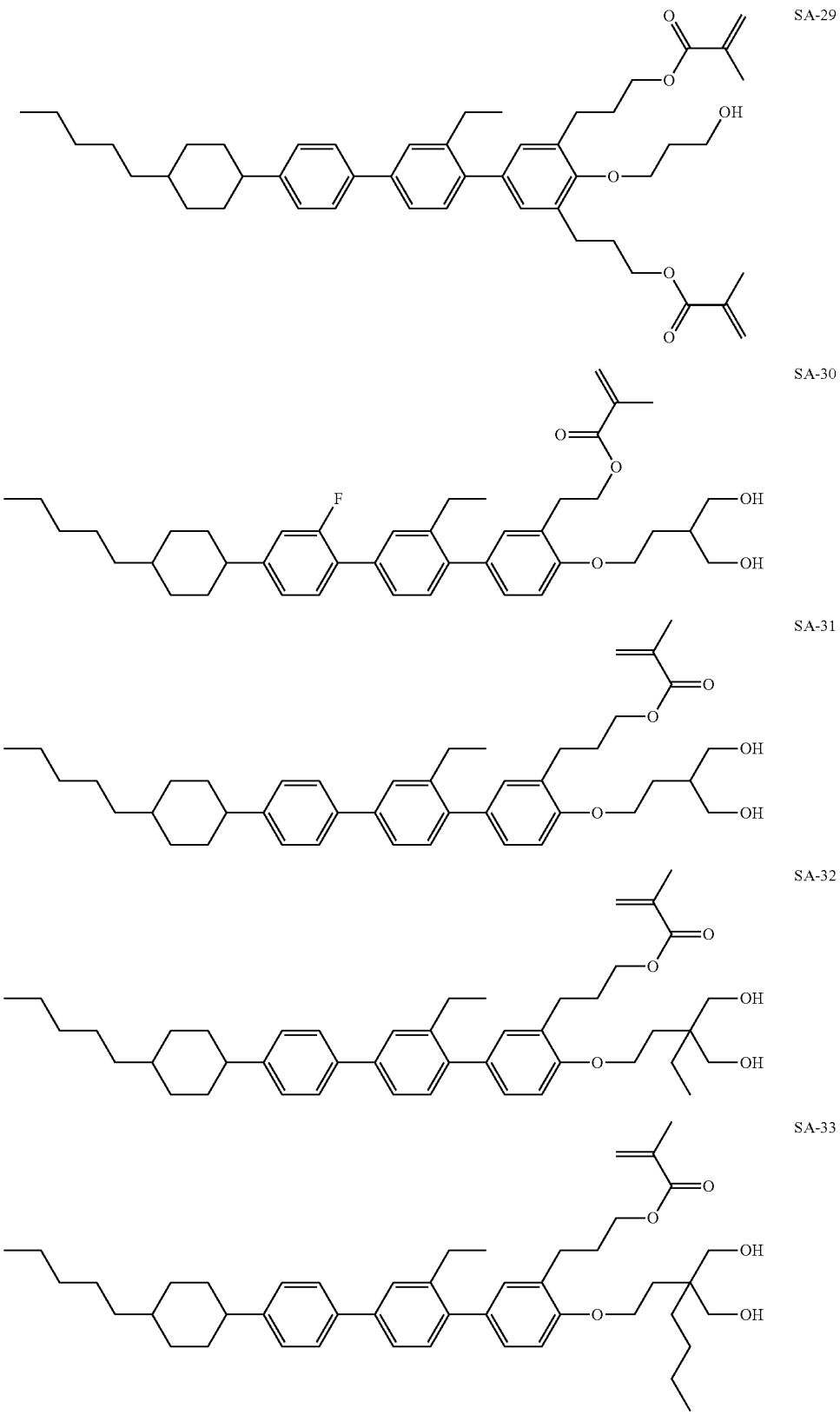

TABLE E-continued

Table E shows self-alignment additives for vertical alignment which can be used in LC media for SA-VA and SA-FFS displays according to the present invention together with the polymerizable compounds of formula I:

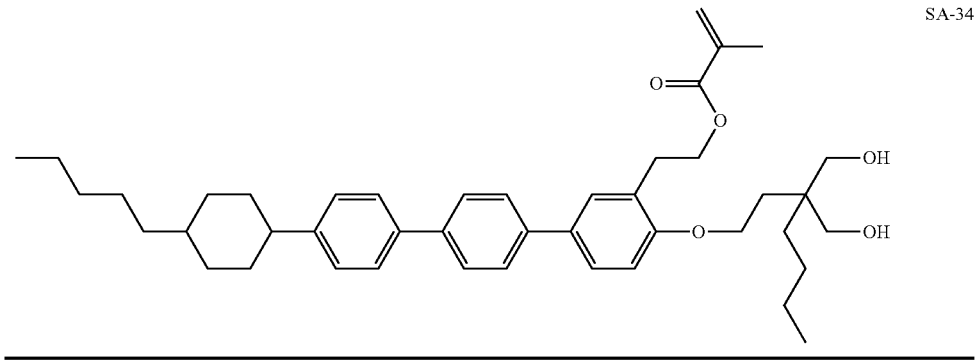

SA-34

In a preferred embodiment, the LC media, SA-VA and SA-FFS displays according to the present invention comprise one or more SA additives selected from formulae SA-1 to SA-34.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$t_{off}$, $t_d$, $\tau_{off}$ switch-off or decay time [ms] at 20° C.
$t_{on}$, $t_r$, $\tau_{on}$ switch-on or rise time [ms] at 20° C.
d cell gap or LC thickness of the switchable LC layer [μm]
$V_0$, $V_{th}$ threshold voltage, capacitive [V] at 20° C.,
$V_{op}$ operating voltage [V]
$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all parameters and values as given above and below refer to a temperature of 20° C.

Unless explicitly noted otherwise, all concentrations and proportions in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage ($V_{th}$, $V_0$)" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

The term "operating voltage ($V_{op}$)" for the present invention relates to the voltage given by $2 \times V_{10}$ and then choosing the next larger multiple of 0.5 V. For example, when $V_{10}$=4.8 V then $V_{op}$=10 V, when $V_{10}$=5.2 V then $V_{op}$=10.5 V, when $V_{10}$=5.6 V then $V_{op}$=11.5 V.

Unless stated otherwise, the process of polymerizing the polymerizable compounds in the polymer stabilized displays as described above and below is carried out at a temperature where the LC medium exhibits a liquid crystal phase, preferably a nematic phase, and most preferably is carried out at room temperature (also abbreviated as "RT").

Unless stated otherwise, methods of preparing test cells and measuring their electrooptical and other properties are carried out by the methods as described hereinafter or in analogy thereto.

Example 1

The nematic LC host mixture N1 is formulated as follows:

| CC-3-V | 51.00% | cl.p. | 75.0° C. |
|---|---|---|---|
| PGP-1-2V | 10.00% | Δn | 0.1385 |
| PGP-2-2V | 15.00% | Δε | +4.1 |
| PGP-3-2V | 4.00% | $\varepsilon_\parallel$ | 7.2 |
| PGU-2-F | 5.50% | $K_1$ | 12.3 |
| PGUQU-3-F | 5.00% | $K_3$ | 12.8 |
| PGUQU-4-F | 2.50% | $\gamma_1$ | 52 mPa s (20° C.) |
| PP-1-2V1 | 2.50% | $V_0$ | 1.87 V |

| | |
|---|---|
| PPGU-3-F | 1.00% |
| PUQU-3-F | 3.50% |

To the mixture N1 are added 0.04% of stabilizer S2-1 to form the mixture S1.

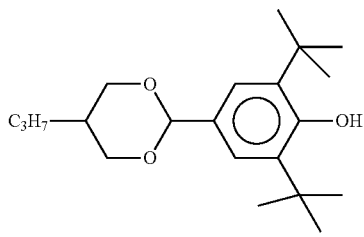

S2-1

To the mixture S1 are added 2.61% of the chiral dopant S-4011 to form the mixture D1A. The pitch of the mixture induced by the chiral dopant is 5 microns.

To the mixture S1 are added 0.21% of the chiral dopant S-4011 to form the mixture D1B. The pitch of the mixture induced by the chiral dopant is 60 microns.

To the mixture D1A are added 2% of RM-64 and 0.02% of the photoinitiator Irgacure®651, to form the mixture P1A.

To the mixture D1B are added 2% of RM-64 and 0.02% of the photoinitiator Irgacure®651, to form the mixture P1B.

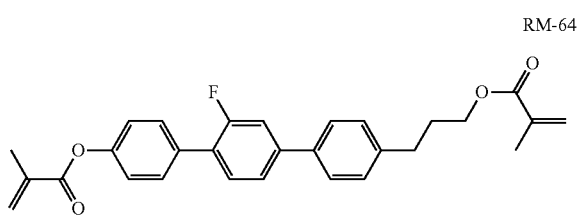 [SMILES: C=C(C)C(=O)OCCCc1ccc(-c2ccc(-c3ccc(OC(=O)C(=C)C)cc3)c(F)c2)cc1]

RM-64

TN Test Cell Manufacture

TN test cells are prepared comprising two substrates of polished SL glass (Corning, thickness 1.1 mm), which are equipped with ITO electrode layers (thickness 200 A, 10 Ohms/sq, 1 cm×1 cm), rubbed polyimide alignment layers (JSR AL3046) with rubbing directions at 0° and 90° respectively, spacers to achieve a cell gap of 3 or 2.7 microns, respectively, and a sealant (XN-1500 from Mitsubishi Chemicals).

The mixtures are filled into separate test cells.

PS-TN Test Cell Manufacture

The test cells with the mixtures comprising a polymerizable compound are subjected to a two-step UV curing process, wherein in the first step a voltage is applied to the electrodes and in the second UV step no voltage is applied.

UV Step 1 (UV1):

Fe/I lamp with 365 nm filter, UV intensity 4.0 mW/cm$^2$ with UV power detector Ushio UIT-250, UVD-S365; electric field: pulse 5 s/period, pulse height 18 V, pulse width 100 ms. Irradiation time 300 s.

UV Step 2 (UV2):

Toshiba C type fluorescent lamp, green UV without 365 nm filter, UV intensity 0.5 mW/cm$^2$ with UV power detector Ushio UIT-250, UVD-S365, irradiation time 60 min.

E/O Performance, Response Times

The electrooptical performance (transmission vs. voltage) and response times of the test cells are measured with an LCD evaluation system (LCD-5200, Otsuka electronics Co., Ltd).

The results are shown in Table 1.

| Cell Gap (μm) | | 3 | | 2.7 |
|---|---|---|---|---|
| Pitch (μm) | none | 60 | 5 | 5 |
| Mixture | N1 | P1B | P1A | P1A |
| Operating Voltage (V) | | 6.5 | | 14 |
| Response Time | On (ms) | 0.55 | 0.56 | 0.36 | 0.36 |
| | Off (ms) | 2.77 | 2.63 | 1.90 | 1.60 |
| | R/T (ms) | 3.32 | 3.19 | 2.26 | 1.96 |
| Trans- mission | White (%) | 99.5 | 98.7 | 93.6 | 80.1 |
| | Dark (%) | 0.16 | 0.20 | 0.51 | 0.67 |

It can be seen that, compared to undoped mixture N1, in the chirally doped and polymer-stabilized mixtures P1A and P1B, the response times are significantly reduced.

The above results show that the process of the present invention enables to manufacture a PS-UF TN-LCD with a high d/p value while keeping a 90° TN configuration, and to achieve fast response times, especially a faster decay time while maintaining a high transmission.

Example 2

To the mixture D1B from Example 1 are added 2% of RM-51 and 0.02%, relative to the total concentration of RM, of the photoinitiator Irgacure®651, to form the mixture P1C.

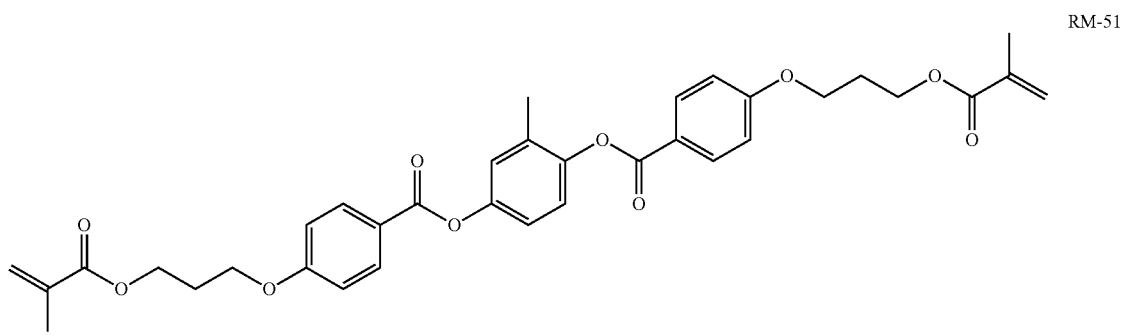 [SMILES: C=C(C)C(=O)OCCCOc1ccc(C(=O)Oc2ccc(OC(=O)c3ccc(OCCCOC(=O)C(=C)C)cc3)c(C)c2)cc1]

RM-51

Example 3

To the mixture D1B from Example 1 are added 2% of RM-52 and 0.02% of the photoinitiator Irgacure®651, to form the mixture P1D.

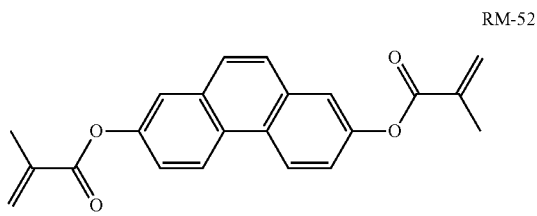 [SMILES: C=C(C)C(=O)Oc1ccc2c(ccc3cc(OC(=O)C(=C)C)ccc32)c1]

RM-52

Example 4

The nematic LC host mixture N2 is formulated as follows:

| APUQU-3-F | 6.00% | cl.p. | 100.8° C. |
|---|---|---|---|
| BCH-3F.F.F | 2.50% | $\Delta n$ | 0.1233 |
| CC-3-V | 30.50% | $\Delta\varepsilon$ | +9.3 |
| CCGU-3-F | 8.00% | $\varepsilon_\parallel$ | 12.6 |
| CCP-3OCF3 | 8.00% | $K_1$ | 14.4 |
| CCP-V-1 | 12.00% | $K_3$ | 17.0 |
| CCQU-3-F | 4.00% | $\gamma_1$ | 100 mPa·s |
| CPGU-3-OT | 4.00% | $V_0$ | 1.32 V |
| PGP-1-2V | 5.00% | | |
| PGP-2-2V | 5.00% | | |
| PGUQU-3-F | 3.00% | | |
| PPGU-3-F | 1.00% | | |
| PUQU-3-F | 11.00% | | |

To the mixture N2 are added 0.04% of the stabilizer S2-1 to form the mixture S2.

To the mixture S2 are added 0.35% of the chiral dopant S-4011 to form the mixture D2. The pitch of the mixture induced by the chiral dopant is 30 microns.

To the mixture D2 are added 2% of RM-64 and 0.02% of the photoinitiator Irgacure®651, to form the mixture P2.

Example 5

The nematic LC host mixture N3 is formulated as follows:

| BCH-2F.F | 9.00% | cl.p. | 109° C. |
|---|---|---|---|
| BCH-3F.F | 10.00% | $\Delta n$ | 0.1128 |
| CCP-1F.F.F | 7.00% | $\Delta\varepsilon$ | +6.7 |
| CCP-5F.F.F | 8.00% | $\varepsilon_\parallel$ | 9.8 |
| CCP-4OCF3 | 4.00% | $\gamma_1$ | 149 mPa·s |
| CCP-5OCF3 | 4.00% | | |
| CCP-3OCF3 | 4.00% | | |
| CCGU-3-F | 8.00% | | |
| CCP-V-1 | 10.00% | | |
| CC-5-V | 10.00% | | |
| CC-3-V1 | 7.00% | | |
| CPGP-5-3 | 3.00% | | |
| CPGP-5-2 | 2.00% | | |
| PUQU-3-F | 6.00% | | |
| CCOC-3-3 | 2.00% | | |
| CCOC-4-3 | 2.00% | | |
| PP-1-2V1 | 4.00% | | |

To the mixture N3 are added 0.04% of the stabilizer S2-1 to form the mixture S3.

To the mixture S3 are added 0.24% of the chiral dopant S-4011 to form the mixture D3. The pitch of the mixture induced by the chiral dopant is 40 microns.

To the mixture D3 are added 2% of RM-64 and 0.02% of the photoinitiator Irgacure®651, to form the mixture P3.

The invention claimed is:
1. A liquid crystal display comprising:
a) a first substrate and a second substrate, the first substrate being equipped with a first electrode layer and optionally a first alignment layer, the second substrate being equipped with a second electrode layer and optionally a second alignment layer,
b) a layer of a nematic liquid crystal medium containing liquid crystal molecules and a chiral additive and having positive dielectric anisotropy being dispensed between the first and the second substrate,
c) optionally a first polarizer on the side of the first substrate facing away from the liquid crystal layer and a second polarizer on the side of the second substrate facing away from the liquid crystal layer,
wherein the longitudinal axes of the liquid crystal molecules are oriented parallel or tilted relative to the planes of the substrates, and the chiral additive induces in the liquid crystal molecules of the liquid crystal medium a helical twist along an axis perpendicular to the substrates with a given pitch p,
wherein layer of the liquid crystal medium has a thickness d, and the ratio of the thickness d of the liquid crystal medium and the pitch p of the helical twist induced by the chiral additive is from 0.6 to 0.8,
wherein the twist angle of the helical twist of the liquid crystal molecules is from 60 to 120°,
wherein the display further comprises a polymer layer deposited on one or both of said first and second electrode or, if present, on one or both of said first and second alignment layer,
wherein said polymer layers are formed from one or more polymerizable mesogenic compounds, which are contained in the liquid crystal medium at a concentration from 1 to <3% by weight, and which are polymerized in situ after the liquid crystal medium has been dispensed between the two substrates,
wherein the polymerizable mesogenic compounds are selected from formula I

$$R^a\text{—}B^1\text{—}(Z^b\text{—}B^2)_m\text{—}R^b \qquad \text{I}$$

in which the individual radicals, on each occurrence identically or differently, and each, independently of one another, have the following meaning:
$R^a$ and $R^b$ P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C($R^o$)=C($R^{oo}$)—, —C≡C—, —N($R^{oo}$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom,
wherein at least one of the radicals $R^a$ and $R^b$ denotes or contains a group P or P-Sp-,
P a polymerizable group,
Sp a spacer group or a single bond,
$B^1$ and $B^2$ an aromatic, heteroaromatic, alicyclic or heterocyclic group, having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^O$R$^{OO}$ or a single bond, R$^O$ and R$^{OO}$ H or alkyl having 1 to 12 C atoms, m 0, 1, 2, 3 or 4, n1 1, 2, 3 or 4, L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F, Cl, P or P-Sp-, Y$^1$ halogen, and R$^x$ P, P-Sp-, H, halogen, straight-chain, branched or cyclic alkyl having up to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms, wherein liquid crystal medium comprises one or more compounds selected from formulae A1a2, A1b1, A1d1, A1f1, A2a1, A2h1, A2l1 A2l2, A2k1, B2d1, B2g2, B2h3, B2i1, B2k1, B2l1, and F1a, in an amount of from 4 to 40% by weight A1a2
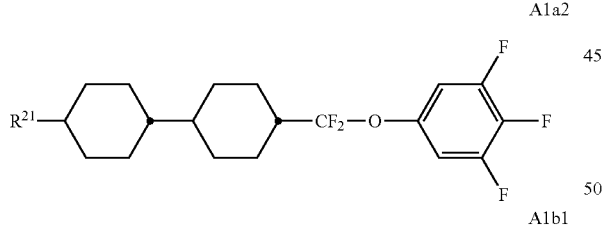

A1b1
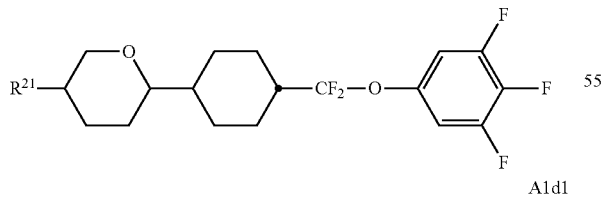

A1d1
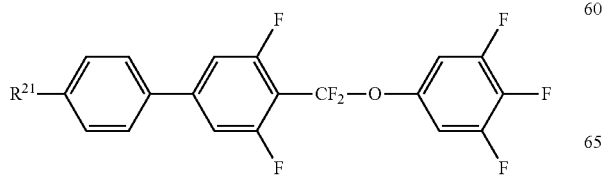

A1f1
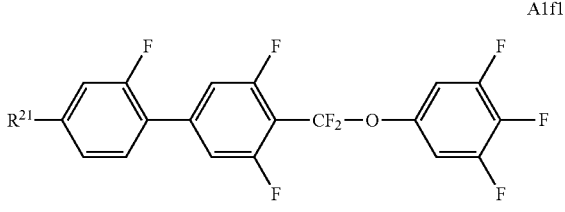

A2a1
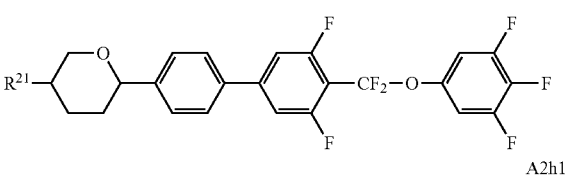

A2h1
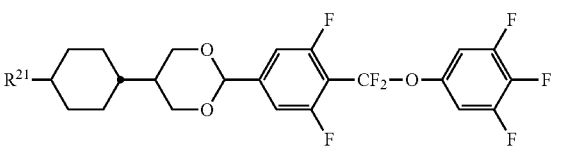

A2l1
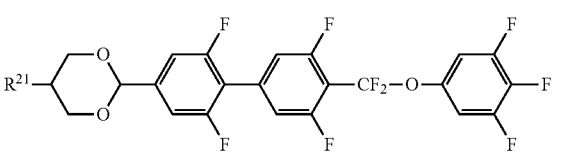

A2l2
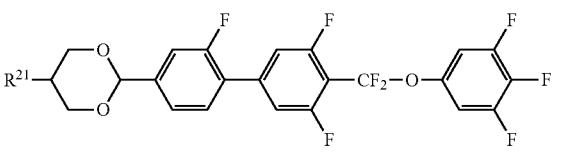

B2d1
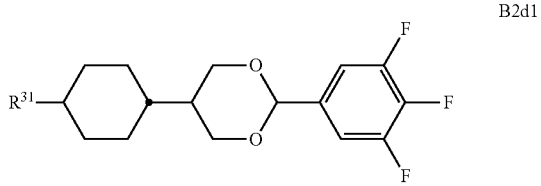

B2g2
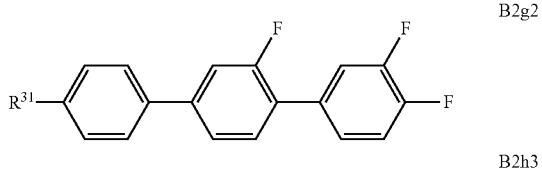

B2h3
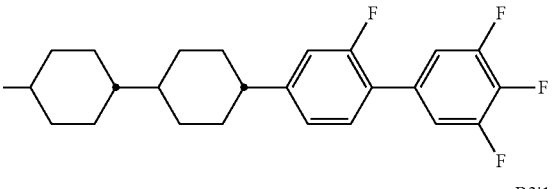

B2i1
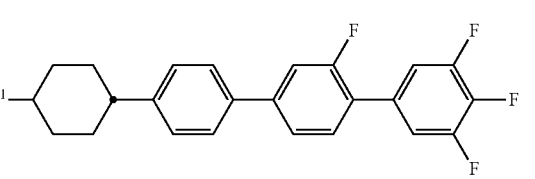

-continued

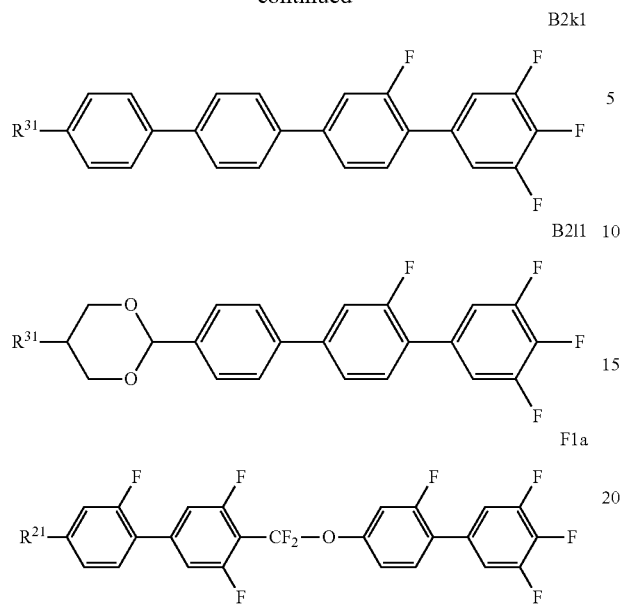

B2k1

B2l1

F1a wherein
R²¹, R³¹ each, independently of one another, alkyl, alkoxy, oxaalkyl or alkoxyalkyl having up to 9 C atoms or alkenyl or alkenyloxy having 2 to 9 C atoms, all of which are optionally fluorinated,
and
wherein the liquid crystal mixture comprises one or more compounds selected from formulae E1, E3 and E6 in an amount of from 5 to 75%

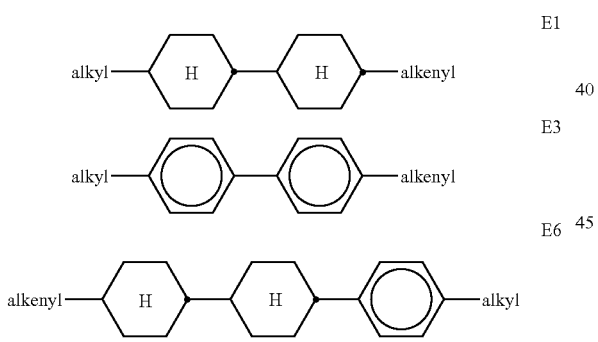

E1

E3

E6 in which alkyl denotes a straight-chain alkyl radical having 1-6 C atoms, and alkenyl denotes a straight-chain alkenyl radical having 2-7 C atoms.

2. The display according to claim 1, wherein the concentration of the polymerizable mesogenic compounds in the liquid crystal medium is from 2 to 2.8% by weight.

3. The display according to claim 1, wherein the liquid crystal medium contains a photoinitiator.

4. The display according to claim 1, wherein the liquid crystal medium has a dielectric anisotropy from +4 to +15 at 20° C. and 1 kHz.

5. The display according to claim 1, wherein the twist angle of the helical twist of the liquid crystal molecules between the first and the second substrate is from 80 to 100°.

6. The display according to claim 1, wherein the longitudinal axes of the liquid crystal molecules of the liquid crystal medium located at the surface of each substrate exhibit a tilt angle relative to said substrate from >0° to 20°.

7. The display according to claim 1, wherein the first and second substrate are equipped with fixing means fixing the first and second substrate at a constant distance relative to each other and with their planes parallel to each other.

8. The display according to claim 1, wherein, in addition to said one or more compounds selected from formulae A1a2, A1b1, A1d1, A1f1, A2a1, A2h1, A2l1 A2l2, A2k1, B2d1, B2g2, B2h3, B2i1, B2k1, B2l1, and F1a, and said one or more compounds selected from formulae E1, E3 and E6, the liquid crystal medium further comprises one or more compounds selected from the following formulae:

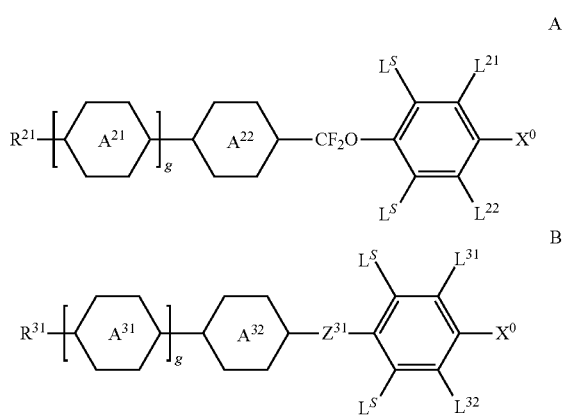

A

B in which the individual radicals have, independently of each other and on each occurrence identically or differently, the following meanings:

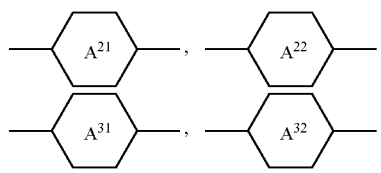

each, independently of one another, and on each occurrence, identically or differently

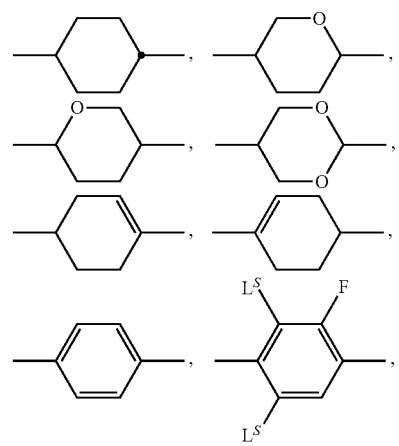

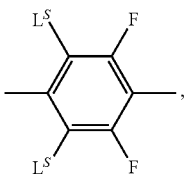

$R^{21}$, $R^{31}$ each, independently of one another, alkyl, alkoxy, oxaalkyl or alkoxyalkyl having up to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{31}$ —CH$_2$CH$_2$—, —CF$_2$CF$_2$—, —COO—, trans-CH=CH—, trans-CF=CF—, —CH$_2$O— or a single bond, $L^{21}$, $L^{22}$, $L^{31}$, $L^{32}$ each, independently of one another, H or F, $L^S$ H or CH$_3$, and g 0, 1, 2 or 3.

9. The display according to claim 1, wherein the liquid crystal medium comprises one or more compounds selected from the following formulae:

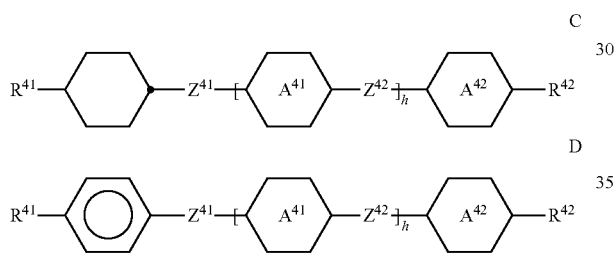

in which the individual radicals have the following meanings:

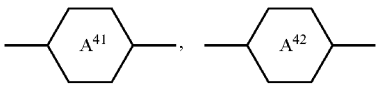

each, independently of one another, and on each occurrence, identically or differently

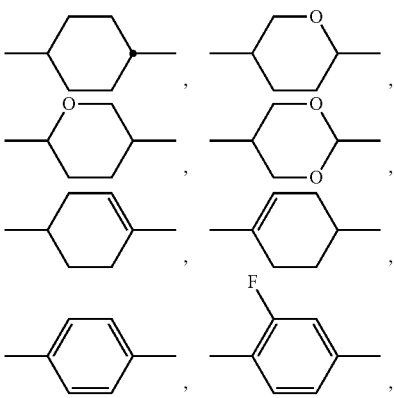

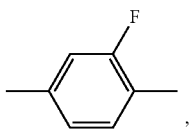

$R^{41}$, $R^{42}$ each, independently of one another, alkyl, alkoxy, oxaalkyl or alkoxyalkyl having up to 9 C atoms or alkenyl or alkenyloxy having 2 to 9 C atoms, all of which are optionally fluorinated, $Z^{41}$, $Z^{42}$ each, independently of one another, —CH$_2$CH$_2$—, —COO—, trans-CH=CH—, trans-CF=CF—, —CH$_2$O—, —CF$_2$O—, —C≡C— or a single bond, and h 0, 1, 2 or 3.

10. The display according to claim 1, wherein, in addition to said one or more compounds selected from formulae A1a2, A1b1, A1d1, A1f1, A2a1, A2h1, A2l1 A2l2, A2k1, B2d1, B2g2, B2h3, B2i1, B2k1, B2l1, and F1a, and said one or more compounds selected from formulae E1, E3 and E6, the liquid crystal medium comprises one or more compounds selected from the following formula:

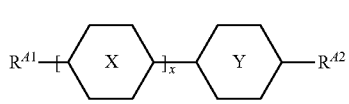

in which the individual radicals, on each occurrence identically or differently, each, independently of one another, have the following meaning:

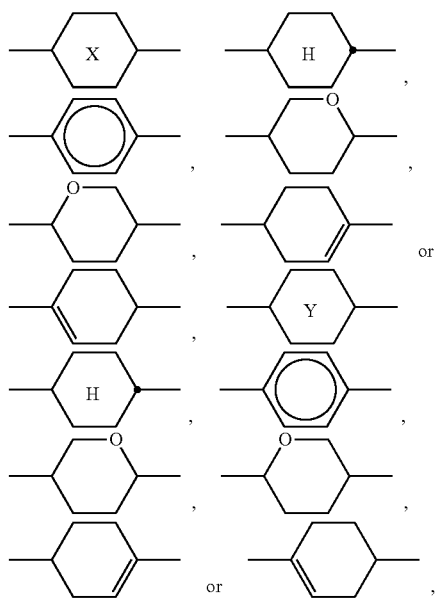

$R^{41}$ alkenyl having 2 to 9 C atoms or, if at least one of the rings X and Y denotes cyclohexenyl, also one of the meanings of $R^{42}$, $R^{42}$ alkyl having 1 to 12 C atoms, in which, in addition, one or two non-adjacent CH$_2$ groups may each be replaced by —O—, —CH=CH—, —CO—, —OCO— or —COO— in such a way that O atoms are not linked directly to one another, and x 1 or 2.

11. The display according to claim 1, wherein the polymerizable mesogenic compounds are selected from the following formulae:
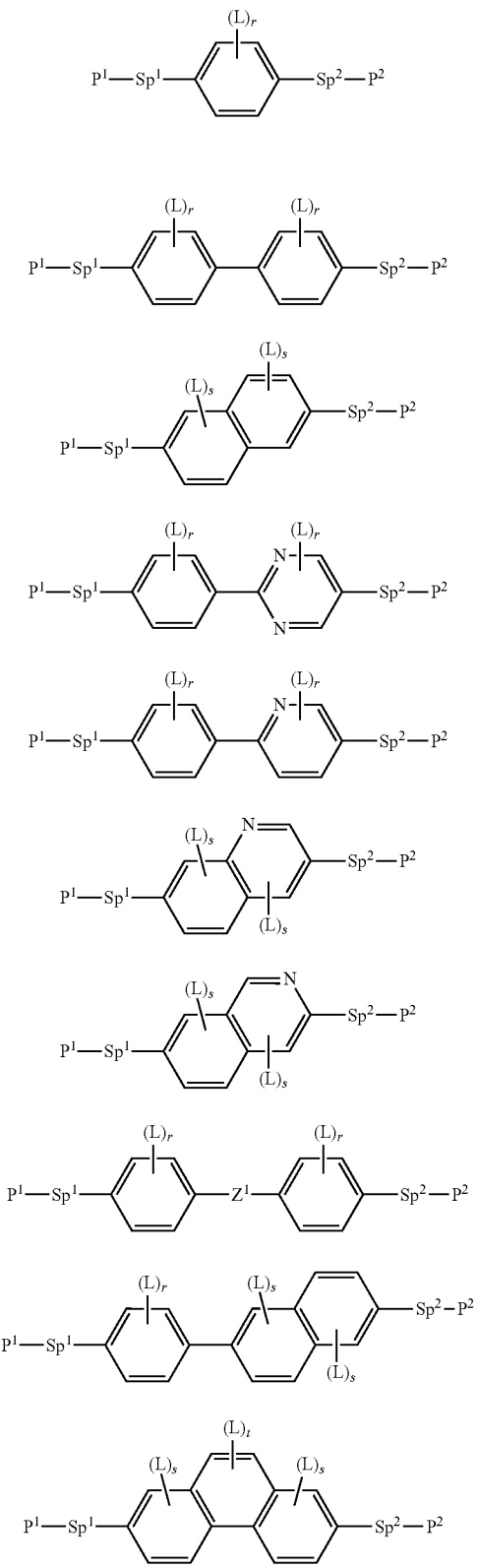
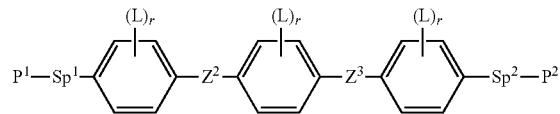
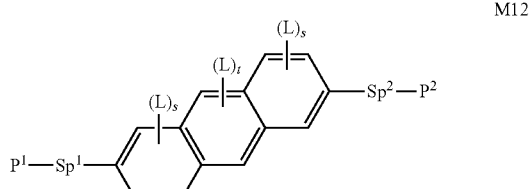
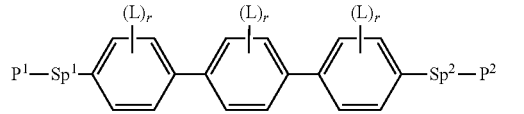
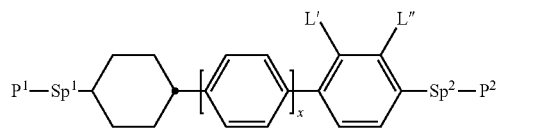
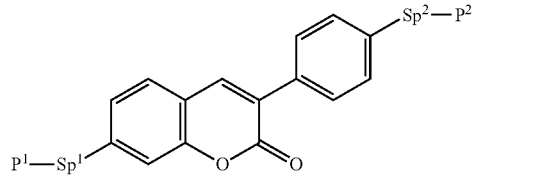
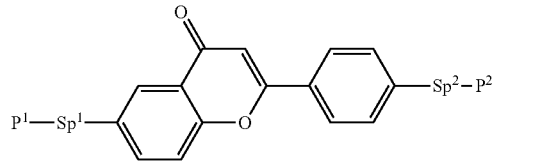
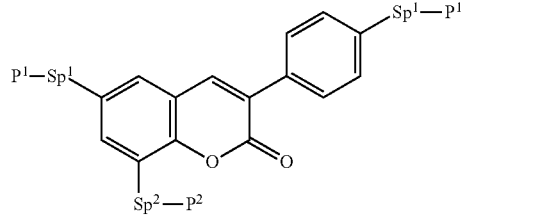
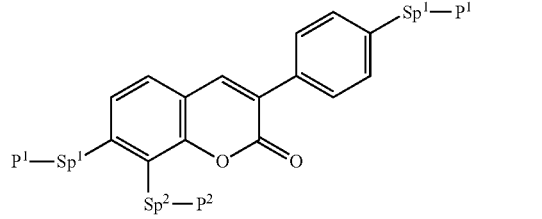

-continued

M19
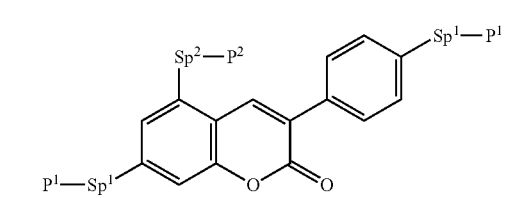

M20
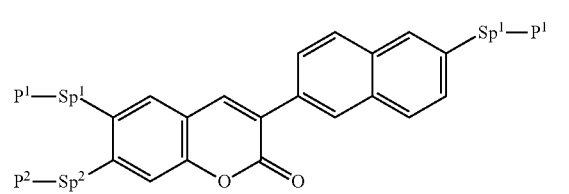

M21
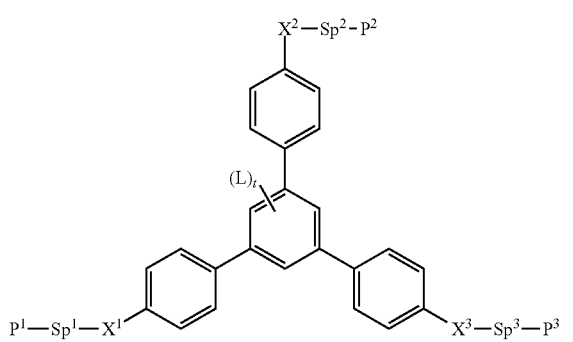

M22
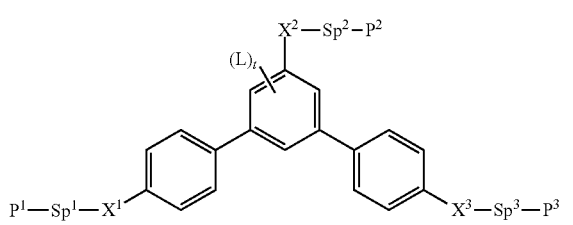

M23
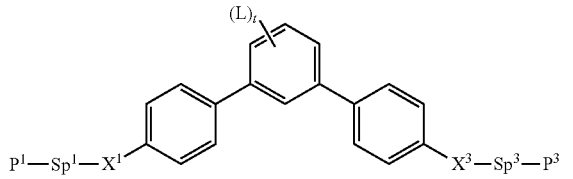

M24
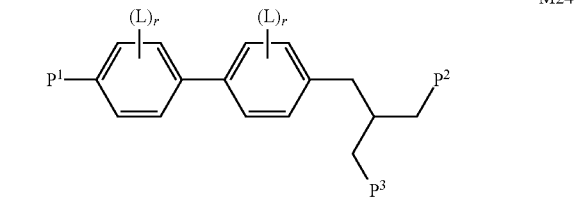

M25
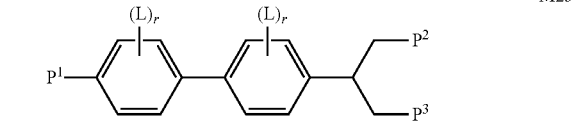

-continued

M26
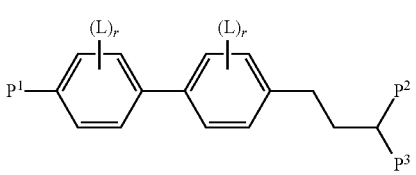

M27
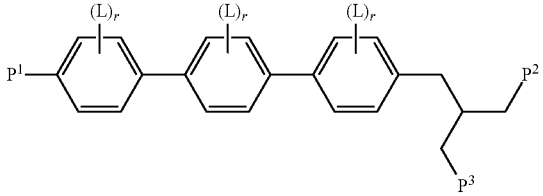

M28
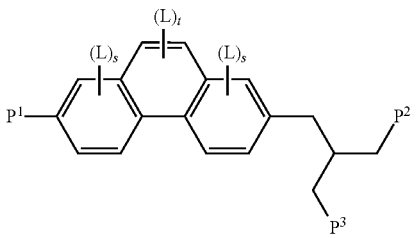

M29
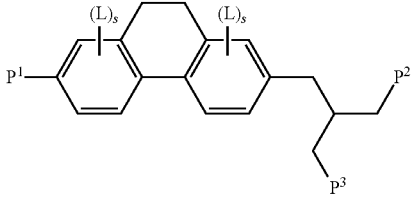

M30
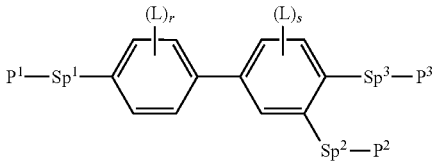

M31
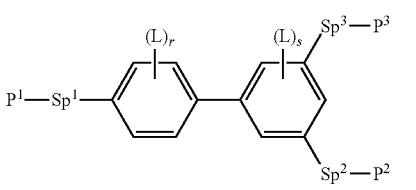

in which the individual radicals, on each occurrence identically or differently, and each, independently of one another, have the following meaning:

$P^1$, $P^2$, $P^3$ a vinyloxy, acrylate, methacrylate, fluoroacrylate, chloroacrylate, oxetane or epoxy group, $Sp^1$, $Sp^2$, $Sp^3$ a single bond or a spacer group where, in addition, one or more of the radicals $P^1$-$Sp^1$-, $P^2$-$Sp^2$- and $P^3$-$Sp^3$- may also denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ H, F, Cl, CN or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or $P^1$-$Sp^1$-, $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^1$ —O—, —CO—, —C($R^yR^z$)— or —$CF_2CF_2$—, $Z^2$, $Z^3$ —CO—O—, —O—CO—, —$CH_2O$—, —$OCH_2$—, —$CF_2O$—, —$OCF_2$— or —$(CH_2)_n$—, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having up to 12 C atoms, L', L" H, F or Cl, r 0, 1, 2, 3 or 4, s 0, 1, 2 or 3, t 0, 1 or 2, and x 0 or 1.

12. The display according to claim 1, wherein the liquid crystal medium comprises one or more chiral dopants.

13. The display according to claim 1, wherein the liquid crystal medium comprises one or more stabilizers and/or self-aligning additives.

14. A method of manufacturing a display according to claim 1, comprising:
  a) providing a first substrate and a second substrate, the first substrate being equipped with a first electrode layer and optionally with a first alignment layer, the second substrate being equipped with a second electrode layer and optionally with a second alignment layer,
  wherein the first and/or the second substrate are preferably equipped with fixing means, preferably a sealant material and/or spacers, fixing the first and second substrate at a constant distance relative to each other and with their planes parallel to each other,
  b) dispensing a layer of a nematic liquid crystal medium having positive dielectric anisotropy between the first and the second substrate, such that the liquid crystal medium is in contact with the first and second alignment layer if these layers are present,
  wherein the liquid crystal medium comprises,
    A) a liquid crystal component A comprising liquid-crystalline molecules,
    B) a polymerizable component B comprising one or more polymerizable mesogenic compounds,
    C) one or more chiral additives,
    D) optionally one or more further additives,
  wherein the ratio of the polymerizable mesogenic compounds in the liquid crystal medium is from 1 to <3%, and
  wherein the longitudinal axes of the liquid crystal molecules are oriented parallel or tilted relative to the planes of the substrates, and the chiral additive induces in the liquid crystal molecules of the liquid crystal medium a helical twist along an axis perpendicular to the substrates with a given pitch p, and
  wherein the layer of liquid crystal medium has a thickness d, and the ratio d/p is ≥0.5, and
  wherein the twist angle of the helical twist of the liquid crystal molecules induced by the chiral additives is >210°,
  c) applying a voltage to the first and second electrodes such that the twist angle of the helical twist of the liquid crystal molecules is reduced to <150°, preferably to a range from 60 to 120°,
  d) after applying the voltage or while applying the voltage, polymerizing the polymerizable mesogenic compounds of the polymerizable component B of the liquid crystal medium between the first and second substrate, preferably by exposure to UV radiation, thereby stabilizing the twisted nematic configuration of the liquid crystal medium with the reduced twist angle of step c), and
  e) optionally subjecting the liquid crystal medium to a second polymerization step, preferably by exposure to UV radiation, without applying a voltage to the first and second electrodes, thereby polymerizing any polymerizable compounds which have not reacted in step d).

15. The method according to claim 14, wherein the twist angle of the helical twist of the liquid crystal molecules between the first and the second substrate before application of a voltage in step c) is from 240 to 300°, and after application of a voltage in step c) is from 80 to 100°.

16. A liquid crystal medium comprising
  A) a liquid crystal component A comprising
    (a) one or more compounds selected from formulae A and B

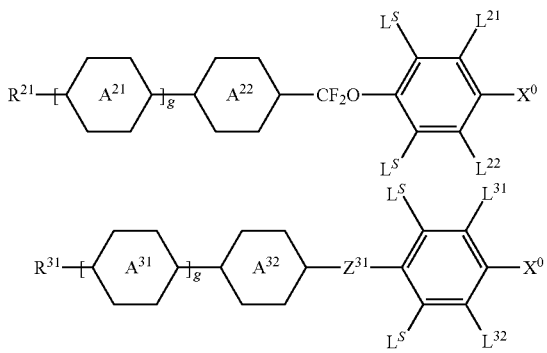

in which the individual radicals have, independently of each other and on each occurrence identically or differently, the following meanings:

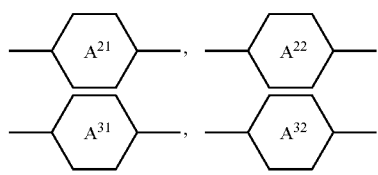

each, independently of one another, and on each occurrence, identically or differently

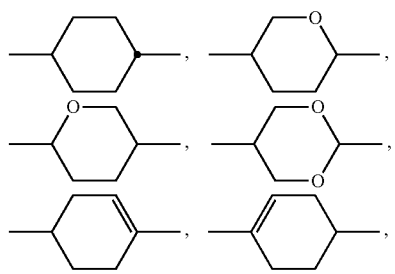

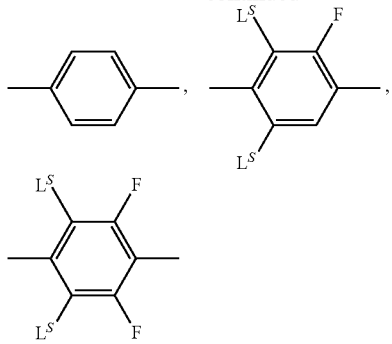

$R^{21}$, $R^{31}$ each, independently of one another, alkyl, alkoxy, oxaalkyl or alkoxyalkyl having up to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{31}$ —$CH_2CH_2$—, —$CF_2CF_2$—, —COO—, trans-CH=CH—, trans-CF=CF—, —$CH_2O$— or a single bond, $L^{21}$, $L^{22}$, $L^{31}$, $L^{32}$ each, independently of one another, H or F, $L^S$ H or $CH_3$, and g 0, 1, 2 or 3;

(b) one or more compounds selected from formulae C and D

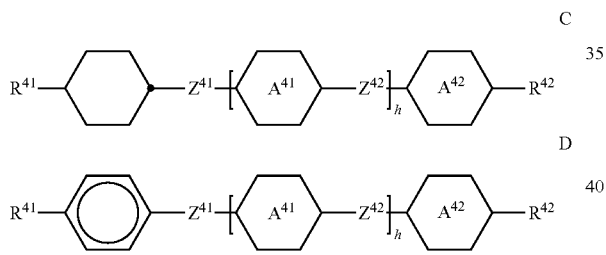

in which the individual radicals have the following meanings:

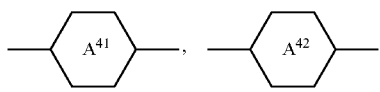

each, independently of one another, and on each occurrence, identically or differently

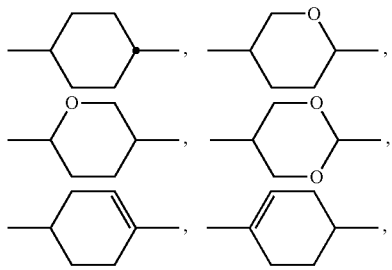

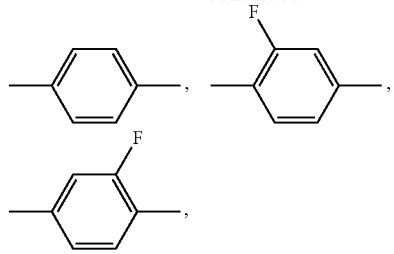

$R^{41}$, $R^{42}$ each, independently of one another, alkyl, alkoxy, oxaalkyl or alkoxyalkyl having up to 9 C atoms or alkenyl or alkenyloxy having 2 to 9 C atoms, all of which are optionally fluorinated, $Z^{41}$, $Z^{42}$ each, independently of one another, —$CH_2CH_2$—, —COO—, trans-CH=CH—, trans-CF=CF—, —$CH_2O$—, —$CF_2O$—, —C≡C— or a single bond, and h 0, 1, 2 or 3; and (c) optionally one or more compounds of formula E

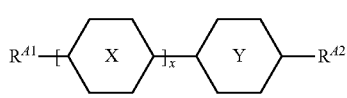

in which the individual radicals, on each occurrence identically or differently, each, independently of one another, have the following meaning:

X

H or

Y or $R^{41}$ alkenyl having 2 to 9 C atoms or, if at least one of the rings X and Y denotes cyclohexenyl, also one of the meanings of $R^{42}$, $R^{42}$ alkyl having 1 to 12 C atoms, in which, in addition, one or two non-adjacent $CH_2$ groups may each be replaced by —O—, —CH=CH—, —CO—, —OCO— or —COO— in such a way that O atoms are not linked directly to one another, and x 1 or 2;

B) a polymerizable component B comprising one or more polymerizable mesogenic compounds of formula I

in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN,

—SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp a spacer group or a single bond, $B^1$ and $B^2$ an aromatic, heteroaromatic, alicyclic or heterocyclic group, having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, $R^0$ and $R^{00}$ H or alkyl having 1 to 12 C atoms, m 0, 1, 2, 3 or 4, n1 1, 2, 3 or 4, L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F, Cl, P or P-Sp-, $Y^1$ halogen, and $R^x$ P, P-Sp-, H, halogen, straight-chain, branched or cyclic alkyl having up to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms;

C) one or more chiral additives; and

D) one or more polymerization initiators, and optionally one or more stabilizers and/or self-aligning additives;

wherein the concentration of the polymerizable mesogenic compounds in the liquid crystal medium is from 2 to 2.8% by weight, wherein the liquid crystal medium contains a photoinitiator, wherein the liquid crystal medium has a dielectric anisotropy from +4 to +15 at 20° C. and 1 kHz, and wherein the concentration of the chiral additives is selected such that the twist angle of the helical twist of the liquid crystal molecules induced by the chiral additives in the liquid crystal medium is 210-330°.

17. The liquid crystal medium according to claim 16, wherein the liquid crystal medium has a dielectric anisotropy from +4 to +8 at 20° C. and 1 kHz.

18. The liquid crystal medium according to claim 16, wherein the polymerizable mesogenic compounds are polymerized.

19. The display according to claim 1, wherein said display includes said first polarizer and said second polarizer, and said polarizers are oriented such that their transmission planes for plane-polarized light are at right angles.

* * * * *